(12) United States Patent
Kundu

(10) Patent No.: US 12,032,733 B2
(45) Date of Patent: Jul. 9, 2024

(54) USER CONTROLLED THREE-DIMENSIONAL SCENE

(71) Applicant: Malay Kundu, Lexington, MA (US)

(72) Inventor: Malay Kundu, Lexington, MA (US)

(*) Notice: Subject to any disclaimer, the term of this patent is extended or adjusted under 35 U.S.C. 154(b) by 0 days.

(21) Appl. No.: 18/100,485

(22) Filed: Jan. 23, 2023

(65) Prior Publication Data

US 2023/0236660 A1 Jul. 27, 2023

Related U.S. Application Data

(60) Provisional application No. 63/302,112, filed on Jan. 23, 2022.

(51) Int. Cl.
| | |
|---|---|
| *G06F 3/01* | (2006.01) |
| *G06T 7/50* | (2017.01) |
| *G06T 7/70* | (2017.01) |
| *G06T 13/40* | (2011.01) |
| *G06T 19/20* | (2011.01) |
| *G06V 40/10* | (2022.01) |

(52) U.S. Cl.
CPC ............. *G06F 3/011* (2013.01); *G06F 3/017* (2013.01); *G06T 7/50* (2017.01); *G06T 7/70* (2017.01); *G06T 13/40* (2013.01); *G06T 19/20* (2013.01); *G06V 40/10* (2022.01); *G06T 2207/10016* (2013.01); *G06T 2207/30196* (2013.01); *G06T 2219/2004* (2013.01)

(58) Field of Classification Search
CPC ............ G06F 3/005; G06F 3/01; G06F 3/011; G06F 3/012; G06F 3/013; G06F 3/014; G06F 3/017; G06T 7/70; G06T 13/40; G06V 40/00; G06V 40/10; G06V 40/11
USPC .......................................................... 345/7–9
See application file for complete search history.

(56) References Cited

U.S. PATENT DOCUMENTS

| | | | |
|---|---|---|---|
| 7,199,793 B2 | 4/2007 | Oh et al. | |
| 9,504,920 B2 | 11/2016 | Kareemi et al. | |
| 11,889,222 B2* | 1/2024 | Kundu | ............... G06T 7/194 |
| 2004/0239670 A1* | 12/2004 | Marks | ............... G06T 19/006 345/419 |
| 2009/0318223 A1 | 12/2009 | Langridge et al. | |
| 2013/0314421 A1 | 11/2013 | Kim | |
| 2016/0198097 A1 | 7/2016 | Yewdall et al. | |
| 2019/0333277 A1* | 10/2019 | Hariton | ................... A63F 13/65 |
| 2020/0110928 A1 | 4/2020 | Al Jazaery et al. | |
| 2021/0291056 A1* | 9/2021 | Chen | ..................... A63F 13/65 |
| 2022/0292825 A1* | 9/2022 | Fang | ................ H04N 21/21805 |
| 2022/0375156 A1* | 11/2022 | Likins | ..................... G06T 15/10 |

(Continued)

*Primary Examiner* — Ke Xiao
*Assistant Examiner* — Nelson Lam
(74) *Attorney, Agent, or Firm* — Eugene H. Nahm

(57) ABSTRACT

The present disclosure relates generally to a system and method for a user to control a virtual representation of themselves within a three-dimensional virtual world. The system and method enable utilizing a two-dimensional image or video data of user with extracted depth information to position themselves in a three-dimensional scene. It also provides a control system and method for a user to control the virtual representation of themselves using the output video as a visual feedback mechanism in a three-dimensional space including the virtual representation of themselves. A user interacts with other virtual objects or items in a scene or even with other users visualized in the scene.

20 Claims, 34 Drawing Sheets

(56) References Cited

U.S. PATENT DOCUMENTS

| | | | |
|---|---|---|---|
| 2023/0092282 A1* | 3/2023 | Boesel | G06F 3/04845 |
| | | | 715/849 |
| 2023/0130535 A1* | 4/2023 | Ma | G06T 19/006 |
| | | | 345/474 |

* cited by examiner

USER CONTROLLED THREE-DIMENSIONAL SCENE

TECHNOLOGICAL FIELD

The present disclosure relates generally to a system and method for a user to control a virtual representation of themselves within a three-dimensional virtual world.

BACKGROUND

Interacting with a virtual reality world currently requires using a virtual reality (VR) headset, utilizing specialized 3D sensors, typing on keyboard and computer, or swiping on a phone to control an avatar moving through and interacting with a virtual environment.

The present disclosure can be used to insert a user/actor's image or representation into a three-dimensional virtual world. The invention can then allow the user to see themselves within that virtual world and move in their own physical world in such a way so as to control their image's or representation's movement and interaction with objects in the virtual world they are viewing.

The present disclosure provides systems and methods that are useful for many situations where the actor needs to be on screen in real-time with other content, but in a way that does not overlap or occlude some objects in the virtual world. This is accomplished by inserting a representation of the actor into a "scene". Such a scene is composed of content at a multitude of different levels or layers of depth where, from the point of view of the viewer, some of the content is behind the actor and some content is in front of the actor and therefore not occluded by the actor.

A scene may be comprised of voxels (three-dimensional pixels) in x-y-z three-dimensional space, and the user's representation is inserted as a set of voxels included in the scene. The present disclosure provides system and method that enable the user(s) to interact in real-time with other objects or items in the scene or even with each other in the case of multiple users.

Often, green screens and virtual green screen technology are currently used to place a person's image on top of a background image or video. Much like a meteorologist on the weather segment of the evening news, the "weatherman" effect occludes the view of the subject material such that the person to has to move from side to side to be able to point out portions of the background without obstructing them.

This is particularly problematic for remote presentations. Today, the actor's video stream is typically displayed in a window completely separate from the content, thereby making it more difficult for the actor to point out content (with anything other than a mouse pointer) and more effectively communicate with the audience. If an actor is placed in front of content (such as by use of a chroma key green screen), the actor occludes some of the very content they are trying to present.

SUMMARY

The subject matter of this application may involve, in some cases, interrelated products, alternative solutions to a particular problem, and/or a plurality of different uses of a single system or article. The present disclosure thus includes, without limitation, the following example implementations.

The present disclosure relates generally to a system and method for a user to control a virtual representation of themselves within a three-dimensional virtual world. The system and method enable utilizing a two-dimensional image or video data of user with extracted depth information to position themselves in a three-dimensional scene.

Some example implementations provide a computer-implemented method for controlling a virtual representation of a user in a three-dimensional scene, the method comprises: receiving a two-dimensional video stream data of a user, using an imaging unit, wherein the two-dimensional video stream data captures the user at least partially; receiving a three-dimensional scene, wherein the three-dimensional scene includes data associated with at least one virtual object and its location within the three-dimensional scene; isolating a user representation of the user from the two-dimensional video stream data; identifying a location information of the user from the two-dimensional video stream, wherein the location information is identified based on the user's relative location to the imaging unit; adding the user representation to the three-dimensional scene by modifying data associated with a voxel comprising the three-dimensional scene, using the location information; and displaying the three-dimensional scene and the added user representation on a display unit, wherein the added user representation displayed on the display unit is controlled based on detecting changes to at least one of the user and the location information.

Some example implementations provide a computer-implemented method for controlling virtual representations of users in a three-dimensional scene, the method comprising: receiving a first two-dimensional video stream data of a first user, using a first imaging unit, wherein the first two-dimensional video stream data captures the first user at least partially; receiving a three-dimensional scene, wherein the three-dimensional scene includes data associated with at least one virtual object and its location within the three-dimensional scene; isolating a first user representation of the first user from the first two-dimensional video stream data; identifying a first location information of the first user from the first two-dimensional video stream, wherein the first location information is identified based on the first user's relative location to the first imaging unit; receiving a second two-dimensional video stream data of a second user, using a second imaging unit, wherein the second two-dimensional video stream data captures the second user at least partially; isolating a second user representation of the second user from the second two-dimensional video stream data; identifying a second location information of the second user from the second two-dimensional video stream, wherein the second location information is identified based on the second user's relative location to the second imaging unit; adding the first and second user representations to the three-dimensional scene by modifying data associated with voxels comprising the three-dimensional scene, wherein the data associated with the first user representation uses the first location information and the data associated with the second user representation uses the second location information; and displaying the three-dimensional scene, the added first user representation, and the added second user representation on a first display unit and a second display unit, wherein the first added user representation displayed on the first display unit is controlled based on detecting changes to at least one of the first user and the first location information, and the second added user representation displayed on the second display unit is controlled based on detecting changes to at least one of the second user and the second location information.

Some example implementations provide a system for controlling a virtual representation of a user in a three-dimensional scene, comprising: an imaging unit capturing a two-dimensional video stream data of a user; a storage unit having a computer-readable program instruction stored therein; and a processor, in communication with the storage unit, configured to execute the computer-readable program instruction to cause the system to at least: receive the two-dimensional video stream data of the user from the imaging unit, wherein the two-dimensional video stream data captures the user at least partially; receive a three-dimensional scene, wherein the three-dimensional scene includes data associated with at least one virtual object and its location within the three-dimensional scene; isolate a user representation of the user from the two-dimensional video stream data; identify a location information of the user from the two-dimensional video stream, wherein the location information is identified based on the user's relative location to the imaging unit; add the user representation to the three-dimensional scene by modifying data associated with a voxel comprising the three-dimensional scene, using the location information and the pose information; and display the three-dimensional scene and the added user representation on a display unit, wherein the added user representation displayed on the display unit is controlled based on detecting changes to at least one of the user and the location information.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE DRAWINGS

The accompanying drawings, which are incorporated in and constitute a part of this specification, illustrate aspects of the present disclosure and together with the description, serve to explain the principles of the present disclosure.

Figure 1:
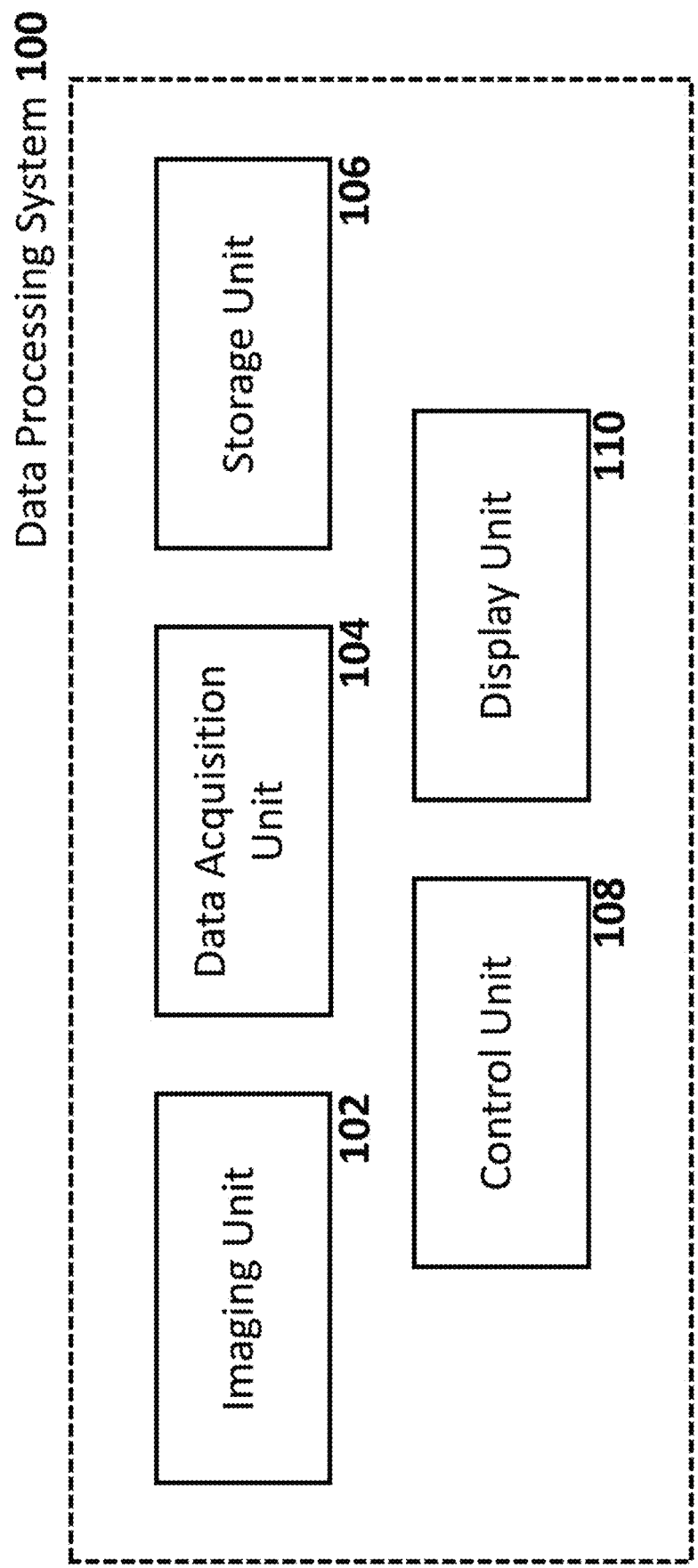
FIG. 1 illustrates a system according to some example implementations.

It should be noted that some details of the figures have been simplified and are drawn to facilitate understanding rather than to maintain strict structural accuracy, detail, and scale.

DETAILED DESCRIPTION

The detailed description set forth below in connection with the appended drawings or figures is intended as a description of presently preferred embodiments of the present disclosure and does not represent the only forms in which the present disclosure may be constructed and/or utilized. The description sets forth the functions and the sequence of steps for constructing and operating the present disclosure in connection with the illustrated examples.

In referring to the description, specific details are set forth in order to provide a thorough understanding of the examples disclosed. In other instances, well-known methods, procedures, components and materials have not been described in detail as not to unnecessarily lengthen the present disclosure.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It should be understood that if an element or part is referred herein as being "on", "against", "in communication with", "connected to", "attached to", or "coupled to" another element or part, then it can be directly on, against, in communication with, connected, attached or coupled to the other element or part, or intervening elements or parts may be present. When used, term "and/or", includes any and all combinations of one or more of the associated listed items, if so provided.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Furthermore, it should be understood that unless otherwise specified, the terms "data," "content," "digital content," "information," and similar terms may be at times used interchangeably.

Furthermore, it should be understood that unless otherwise specified, the term "real-time" refers to processing, displaying, capturing, detecting, identifying, or analyzing data without intentional delay, given the processing limitations of the system.

Various operations may be described as multiple discrete operations in turn, in a manner that may be helpful in understanding embodiments; however, the order of description should not be construed to imply that these operations are order dependent.

Spatially relative terms, such as "under" "beneath", "below", "lower", "above", "upper", "proximal", "distal", "behind", "in front" and the like, may be used herein for ease of description and/or illustration to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable. Such descriptions are merely used to facilitate the discussion and are not intended to restrict the application of disclosed embodiments.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

Some examples of the present disclosure may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer, controller or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed system may be practiced. It is to be understood, however, that those skilled in the art may develop other structural and functional modifications without departing from the novelty and scope of the instant disclosure.

The system may comprise one or more computers or computerized elements in communication working together to carry out the different functions of the system. The system and method contemplated herein further may comprise a storage unit, such as a non-transitory computer readable media configured to instruct a computer or computers to carry out the steps and functions of the system and method, as described herein. In some embodiments, the communication among the one or more computer or the one or more processors alike, may support a plurality of encryption/decryption methods and mechanisms of various types of data.

The computerized user interface may be comprised of one or more computing devices in networked communication with each other. The computer or computers of the computerized user interface contemplated herein may comprise a memory, processor, and input/output system. In some embodiments, the computer may further comprise a networked connection and/or a display screen. These computerized elements may work together within a network to provide functionality to the computerized user interface. The computerized user interface may be any type of computerized interfaces known in the art capable of allowing a user to input data and receive a feedback therefrom. The computerized user interface may further provide outputs executed by the system contemplated herein.

Storage unit or data contemplated herein may be in the format including, but are not limiting to, XML, JSON, CSV, binary, over any connection type: serial, Ethernet, etc. over any protocol: UDP, TCP, and the like.

Computer or computing device contemplated herein may include, but are not limited to, virtual systems, Cloud/remote systems, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. Examples include, but are not limited to, Picture Transfer Protocol (PTP) over Internet Protocol (IP), IP over Bluetooth, IP over WiFi, and PTP over IP networks (PTP/IP).

Imaging unit or video capturing devices contemplated herein may include, but are not limited to, various types of two-dimensional and three-dimensional cameras, such as, webcams, mobile phone cameras, depth sensing imaging units (including, but not limited to, stereoscopic cameras, multiple cameras used together, 2D cameras complemented with lidar, cameras on mobile phones with depth sensing technology, and the like), DSLR, non-SLR digital cameras (e.g., but not limited to, compact digicams and SLR-like bridge digital cameras (also known as advanced digital cameras), and SLR-like interchangeable lens digital cameras), as well as video recorders (e.g., but not limited to, camcorders, 2D analog cameras and 2D IP cameras, 3D cameras, and the like; a device that can provide a video feed of any duration, such as a DVR; a portable computing device having a camera, such as a tablet computer, laptop computer, smartphones); and the like. The position or location of the image unit may vary as well. The imaging unit may be facing to capture a front of an actor, a face of an actor, a side view of an actor, a top view of an actor, a rear view of an actor, a perspective view of an actor, and the like. Similarly, the imaging unit can zoom in and out to vary the captured area of the actor or an object.

In some embodiments, the system may utilize a display positioned away from the user such that the user's motion in using the system is not encumbered by any wearable devices. Similarly, the system may include an imaging unit that is positioned away from the user such that the user's motion is not limited by any such wearable device.

The image or video files contemplated herein may be any digital image format capable of being interpreted by a computer or computing device. Examples of image files contemplated herein include, but are not limited to JPEG, GIF, TIFF, PNG, Bitmap, RAW, PNM, WEBP, and the like.

The present disclosure provides a system and method for enabling a user to be represented within a three-dimensional scene and to control the movement and interaction of their representation within the three-dimensional scene by use of an imaging unit (including a two-dimensional imaging unit). More specifically, the present disclosure provides a system and method for adding the representation or image of user (such as isolated from a two-dimensional video stream captured by an imaging unit) to a three-dimensional scene by modifying voxels of that scene, and then enabling that representation to interact with virtual objects in the three-dimensional scene (including representations of other users) in response to changes in location, poses, and/or gestures of the actual user. The final resulting three-dimensional scene can be viewed using a display unit.

The present disclosure also generally provides a system and method for generating a multilayer scene. More specifically, the present disclosure provides a system and method for injecting or inserting a data feed (for example, one or more images, a video stream, a live video stream), such as a video capturing an actor (a person digitally imaged or captured by an imaging unit), into the multilayer scene to produce a video (e.g., a composite video) approximating a three-dimensional space having depth by showing the actor in front of one or more layers of the multilayer scene and behind other layers of the multilayer scene. The present disclosure describes a system and method that can be practiced in receiving multiple media input (such as, images, videos, and the like) to create a displayable scene in which the displayable scene includes multiple layers of graphical or visual data. The final output video of the multilayer scene can be viewed using a display unit.

Among other things, the system displays, injects, and/or positions the data feed in varying degrees of depth (i.e., each of the layers of the multilayer scene, including in front of, behind, or in between the one or more layers of the multilayer scene) such that the data feed, such as a data feed representing an actor, coexists, is placed, or is displayed on a display without obstructing at least some portion or one or more of the layers of the multilayer scene. In addition, the system enables the injected data feed to be interacting with at least a portion of the one or more layers. For example, an actor or a user can be captured as the data feed and the motion of the actor can cause a virtual interaction with an object that is presented in or by another layer of the multilayer scene on which the actor image or video feed is injected. Such merging of multilayer scene and data feed is displayed on a display as an output video or an output image. As a non-limiting example, the object can appear as a solid object, an opaque object, a translucent object, a transparent object, or an object displayed with any varying degree of transparency or translucency by the display.

In referring to the detailed description of the present disclosure, the examples of the system and method primarily presents displaying an actor data feed (i.e., data feed representing an actor, such as a user being captured by an imaging unit, such as a video stream of a user) into a multilayer scene. It should be noted that some details of the figures have been simplified and are drawn to facilitate understanding rather than to maintain strict structural accuracy, detail, and scale. Specifically, a video stream of a person (i.e., the user, the actor, and the like) is described with a simplified drawing or representation in place of an actual photo, video, or other types of data recording of the recorded subject or object. This is to readily demonstrate the functions of the present disclosure with clarity. The visual representation contemplated herein primarily is geared towards actual recording of a person, an object, or other visible things. Simplified characterizations of such in the drawings are not literal demonstrations of the present disclosure in actual implementation but representative.

The words "user" and "actor" are used interchangeably in this specification and claims.

The terms "actual" or "physical" are meant to mean "non-virtual" or "corporeal" or "in real life" as opposed to "virtual".

The words "add" and "position" are used interchangeably in this specification with respect to the user, actor, or actor layer. Regarding "adding to" or "positioning in" a voxel-based three-dimensional scene, "add" or "position" is understood to comprise modification of the data or values for a set of voxels (three-dimensional pixels in x-y-z space) within the three-dimensional scene.

The term "Multilayer" is also understood to mean "multi-depth" and "three-dimensional".

"Pose" and "gesture" are very closely related as complementary features of a human body. "Pose estimation or recognition" is the recognition or identification of the shape or posture of the human body and can be understood to include position and orientation of both large body parts such as arms and legs as well as finer details such as fingers and facial points and eyes. Gesture recognition involves the further interpretation of pose information. For example, the pose information of hand indicating an extended forefinger with other fingers curled may be interpreted by gesture recognition to be a classic pointing gesture. When "pose estimation" or "pose recognition" or such is mentioned, it is understood that it may be followed by a step of "gesture recognition". Likewise, when "gesture recognition" is mentioned, it is understood that it is often proceeded by a step of "pose estimation". A commonly known pose estimation technique uses convolutional neural networks and heatmaps to estimate the pose of the user.

Referring now to FIG. 1, the system for displaying data in a multilayer scene, hereinafter also referred to as a data processing system 100, comprises an imaging unit 102, a data acquisition unit 104, a storage unit 106, a control unit 108, and a display unit 110. Such system component units represent software units executing on a processor or a processing circuitry of a computer system, one or more hardware components executing the method described herein, or any combination of the two thereof. While FIG. 1 illustrates the system component units grouped as a single system, such association is not limited to form a single physical hardware unit (such as individual units formed on a single computing device), but also represent functional associations of the system units collectively performing the methods described herein. The imaging unit 102 captures data feed, such as image(s) and video(s). In some examples, the imaging unit 102 records or captures images or videos of an actor (or a user). The data acquisition unit 104 controls and receives data captured by the imaging unit 102. The control unit 108 processes and practices the method described herein using the storage unit 106. The display unit 110 outputs resulting data post processing as an output video.

Figure 2:
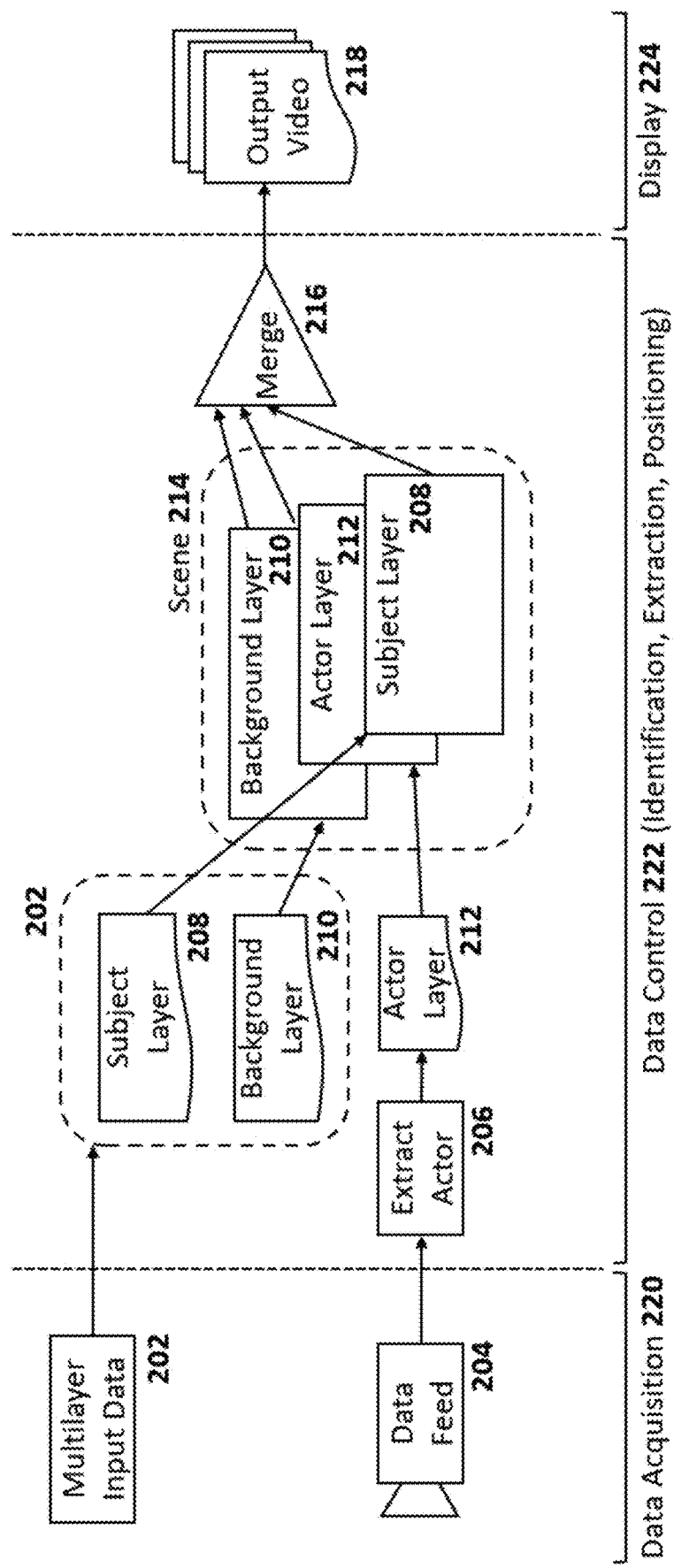
FIGS. 2 and 3 are flowcharts illustrating various steps in a method of generating a multilayer scene, according to various example implementations of the present disclosure.
Figure 3:
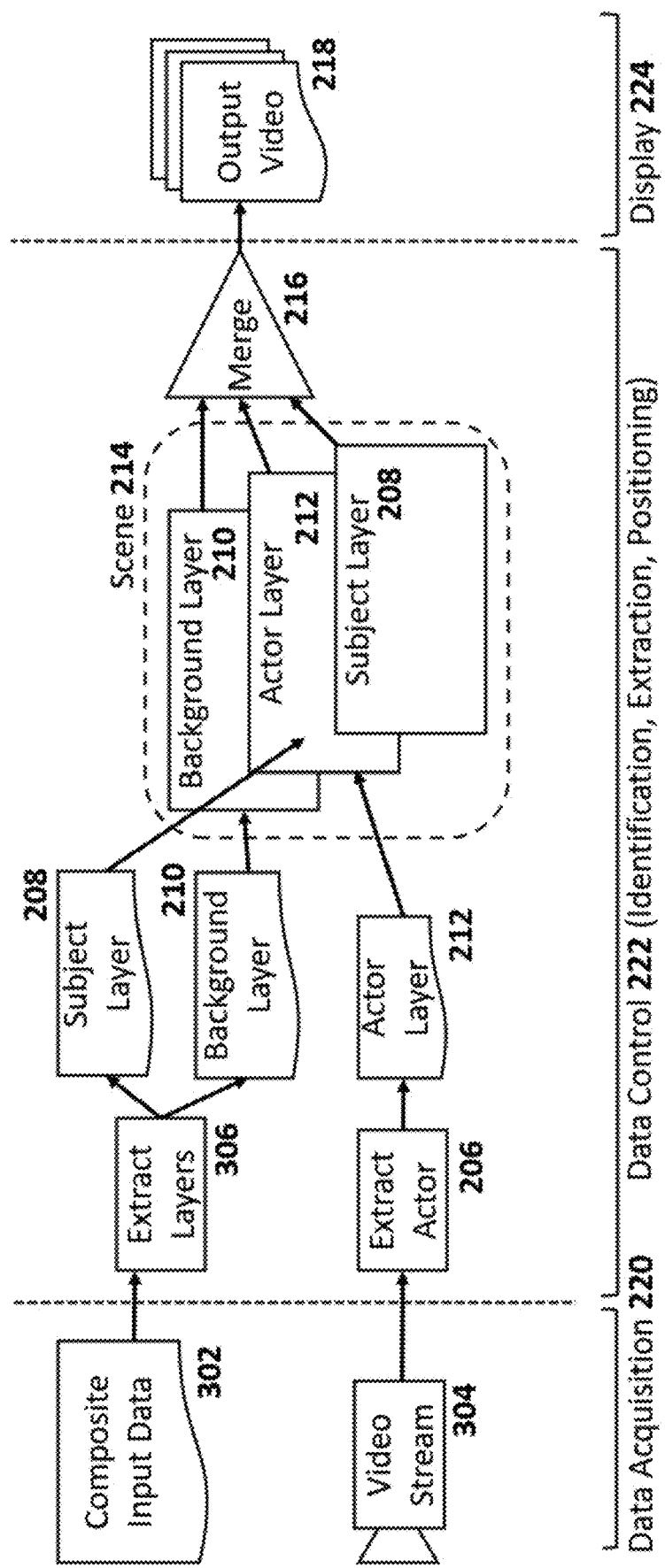

FIGS. 2 and 3 describe the method with which various data types (such as, data feed 204 and multilayer (three-dimensional) input data 202) are processed by the present system to display an output video 218 including a multilayer scene. While the process is described in a sequential manner, different input data can be processed individually or parallelly without one of the input data being dependent to the process or progress in which the other data feed is processed. As described in FIG. 2, the system (also may be referred to as data processing system 100) receives a data feed 204 and a multilayer (three-dimensional) input data 202 via the data acquisition unit 104 of the data processing system 100. The data feed 204, such as a video stream 304, is acquired using the imaging unit 102. During the data acquisition phase 220, the input data (such as, multilayer (three-dimensional) input data 202 and composite input data 302) are acquired by the data acquisition unit 104. The data control unit 108 identifies the various types of input data and data captured by the imaging unit 102, and its scene layers 202, extracts, and merges them during data control phase 222. Finally, the display unit 110 presents the multilayer scene 214 rendered as the output video 218. In some examples, the input data is three-dimensional input data 202 contained in the memory or a data storage unit of a computer. In some examples, the input data is multilayer input data 202 comprising at least a set of separate but coordinated input scene layers 202. The multilayer input data 202 having the coordinated input scene layers may be time-synchronized input data with multiple layers (i.e. multilayer input data). For example, the multilayer input data comprises a background layer 210 video feed and a subject layer 208 video feed that are time-synchronized. In some examples, the scene layers of the multilayer input data 202 may be coordinated by association of various objects captured in the input data. For example, the background layer 210 can comprise an object that is associated with or correlated with another object captured by the subject layer 208, and vice versa.

In some examples, the input data is a composite input data 302 comprising various data, such as a fixed image, slide, video, and the like. As shown in FIG. 3, the composite input data 302 is processed to extract a background layer and a subject layer (i.e., extract layers 306). As such, an extraction of layers 306 can be necessary when the input data does not contain layered data, such as the multilayer input data 202.

In some embodiments, as described in FIG. 2, the system could likewise receive a multilayer input data 202 that comprise multiple scene layers, such as a background layer 210 and a subject layer 208. In this example, the multilayer input data 202 contains two layers. The multilayer input data 202 can be a collection of the background layer 210 and the subject layer 208. A multitude of such layers enhances the three-dimensional effect and detail of the multilayer (three-dimensional) input data 202 scene. Similarly, the multilayer input data 202 can be two separate input data of a background layer 210 and a subject layer 208.

From the data feed 204, such as a video stream 304, the system extracts the images (or a collection of images, such as a video clip) capturing one or more actors (i.e., extract actor 206). These imaging unit-captured data feed 204 (such as the video stream 304) includes at least a part of the actor, which is processed by the system in order to isolate the portion of the data feed that includes at least a part of the actor. In some examples, the extraction or isolation or segmentation of the actor can use chroma key green screen, virtual green screen technology, skeletal/human pose recognition/estimation, neural networks trained to isolate the actor within an image or video stream, and the like. A various known image processing and video processing techniques can be applied to extract or isolate the actor from the data feed 204 or the video stream 304. The extracted actor representation is then added into the actor layer 212 comprised of a non-transparent region including the isolated actor and a transparent region not including the isolated actor. In some embodiments, the extracted actor representation is added into the three-dimensional virtual scene by modifying the data associated with the appropriate three-dimensional locations or voxels (three-dimensional or "volumetric" pixels) within the three-dimensional virtual scene. See three-dimensional scene 1302 in FIG. 13A and FIG. 13B, for example.

Once the actor layer 212 is identified from the data feed 204, such as the video stream 304, and the multiple layers 202 are identified from the multilayer input data 202 or the composite input data 302, the actor layer 212 which includes the isolated actor 206, is added in front of the background layer 210 and behind the subject layer 208, thereby generating a scene 214 that comprises three layers (i.e. multilayer scene). In other words, the actor layer 212 is added between the background layer 210 and the subject layer 208. Such a collection of at least the three layers, the background layer 210, the actor layer 212, and the subject layer 208, depicting visual or displayable data forms a multilayer scene 214. A multilayer scene refers to one or more layered visual representation of data, such as image(s) and video(s). The background layer 210, the actor layer 212, and the subject layer 208 are rendered/merged 216, for example flattened, to render the output video 218, then displayed 224 using a display unit 110. In some examples, flattening of the layers in the scene 214 can be done such that any region of the resulting output video 218 or image is made up of the video or image from the forwardmost layer of that same region where that forwardmost layer of the region is non-transparent. In case the forwardmost layer of the region is semi-transparent, that region of the output video 218 or image is made up of a visual combination (e.g., the colors of layers are averaged, mixed, or otherwise visually combined) of the forwardmost layer and recursively the flattened layer(s) behind it. The display unit 110 may be a monitor, a projector mobile phone display, three-dimensional display, augmented reality glasses, virtual reality headset, display presented by other wearables, or any other devices that display image(s) or video(s) for visual presentation.

Figure 13A:
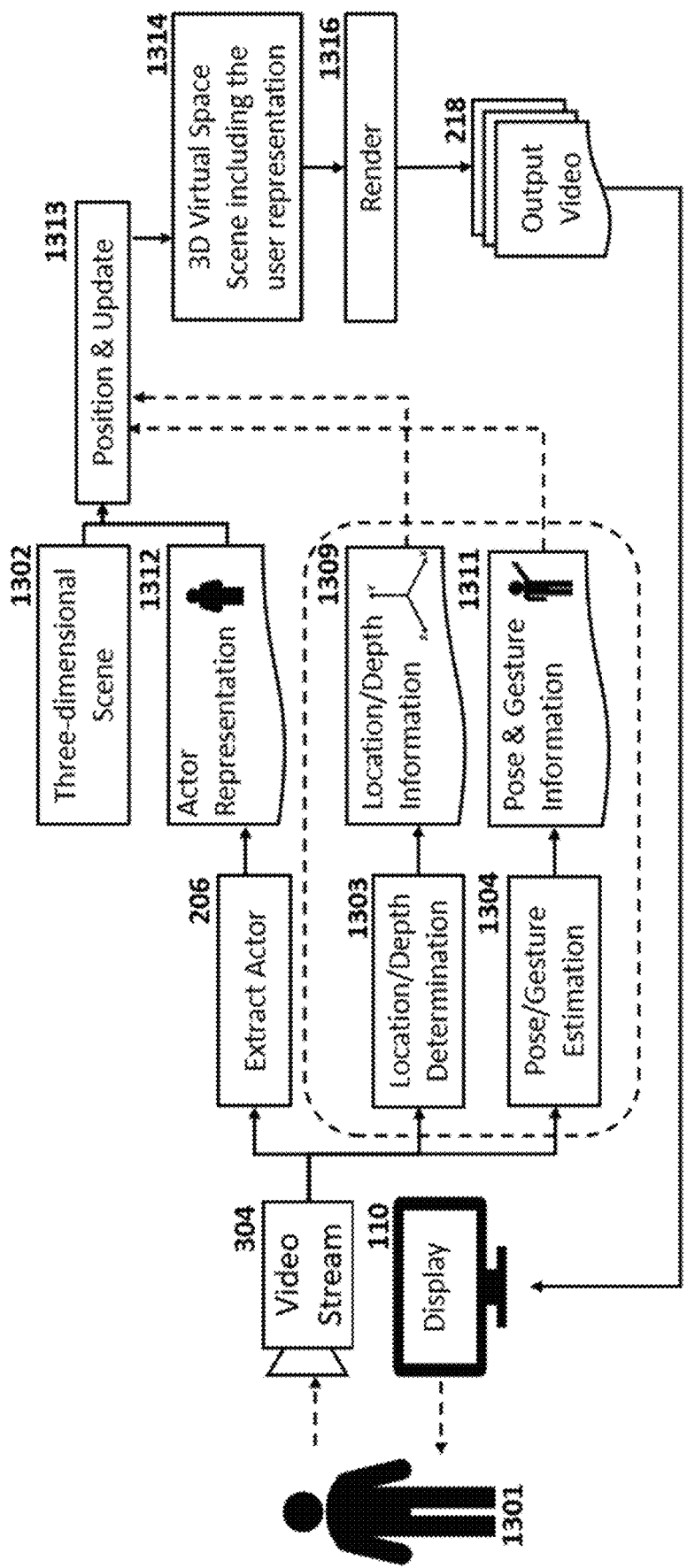
FIG. 13A through 29 illustrate various example implantations according to the system and method of the present disclosure.
Figure 13B:
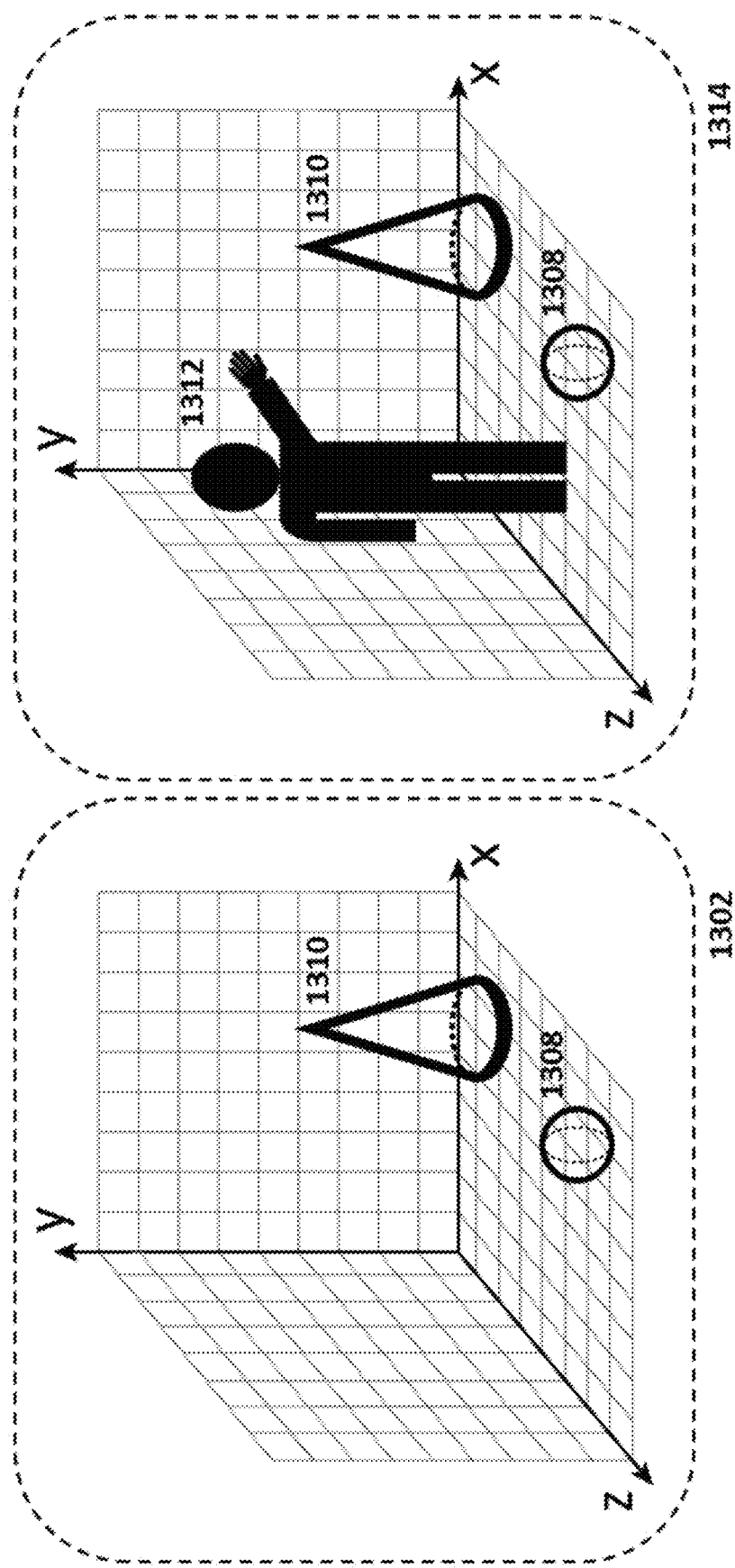

In some embodiments, as described in FIGS. 13A and 13B, the system could receive a three-dimensional input data 1302 (also referred to as "three-dimensional scene") that comprise objects (including interactive or passive and movable or fixed, including fixed passive features of the environment such as slopes or hills) at multiple locations within three-dimensional space, such as the further back objects 1310 and further forward objects 1308. In this example, the three-dimensional input data 1302 contains objects at two different locations within the three-dimensional space. The three-dimensional input data 1302 can be a collection of objects 1308 and 1310 located within the three-dimensional space. Such objects at a multitude of locations enhances the perceived richness and detail of the three-dimensional input data 1302. Similarly, the three-dimensional input data 1302 can be sparsely populated with very few objects as well. Amongst other properties, three-dimensional objects 1308 and 1310 can have different levels of transparency and opacity—which will be taken into account during rendering 1316. The three-dimensional input data 1302 can be stored in the storage unit 106. The components of the data processing system 100 are in communication directly or indirectly via various communication protocols.

From the data feed 204, such as video stream 304, the system extracts 206 the images (or a collection of images, such as a video clip) capturing one or more physical actors 1301. These imaging unit-captured data feed 204 (such as the video stream 304) includes at least a part of the actor, which is processed by the system in order to isolate the portion of the data feed that includes at least a part of the actor. In some examples, the extraction or isolation or segmentation of the actor can use chroma key green screen, virtual green screen technology, skeletal/human pose recognition/estimation, neural networks trained to isolate the actor within an image or video stream, and the like. A various known image processing and video processing techniques can be applied to extract or isolate the actor from the data feed 204 or the video stream 304.

Once the extracted actor representation 1312 is identified from the data feed 204, such as the video stream 304, and the three-dimensional scene 1302 is available, the extracted actor representation 1312 is then positioned 1313 into the three-dimensional scene 1302. The positioning is done by modifying the data or values of the appropriate voxels (or three-dimensional pixels) within the three-dimensional space/scene thereby generating a three-dimensional virtual scene/space 1314 that comprises the various objects plus the actor representation. In other words, the actor representation 1312 is positioned amongst the three-dimensional scene objects such as 1308 and 1310.

The positioning and updating step 1313 optionally (as denoted by the dotted lines in the figure) may also involve taking as input additional actor information, including but not limited to, location/depth information 1309 (information about the actor's physical location with respect to the camera, including depth or distance as well as lateral and vertical position, in other words x,y,z coordinates relative to the camera) and pose and/or gesture information 1311 about the actor's physical pose and/or gesture, identified from the video stream 304. The location/depth information 1309 can be determined 1303 based on the user captured in the video stream 304. The pose and gesture information 1311 can be identified 1304 based on the user captured in the video stream 304.

As part of updating, in step 1313, the system may also take as input and utilize the additional actor information so as to update the scene 1302 based on location, pose, or gestures of the actor 1301. For example, by utilizing location/depth information 1309 and/or pose & gesture information 1311, the positioning & updating step 1313 involves determining if and how the virtual actor makes contact with interactive objects within the three-dimensional scene so as to trigger corresponding actions. Upon actions being triggered, in step 1313, the system updates the three-dimensional scene accordingly to reflect the action (such as visual state change, etc.). For example, in one embodiment, if the virtual location and pose of the virtual actor indicates that the virtual actor is making contact in the three-dimensional virtual space with a button that changes color upon being pressed, then in step 1313 the system considers the button pressed, trigger and execute the corresponding action, and update the virtual three-dimensional space or scene to reflect that the button has changed color. As another example, in another embodiment, if the physical actor is determined to be making a pinching gesture with their fingers as if holding a pen, then in step 1313 the system maps the physical location of the physical actor to corresponding virtual location of the virtual actor within the virtual three-dimensional space where the recognition of the pinching gesture (i.e., the pen gesture) causes the system in step 1313 to update the virtual three-dimensional space to show writing or drawing in the virtual location of the hand (or virtual pen being held by the hand) of the virtual actor in the virtual three-dimensional space. As such, certain visually recognizable changes of the user 1301, such as the additional actor information described above, is utilized by the system to cause positioning, or updating as described by step 1313. In other words, the user can control the actor representation 1312 by introducing visually recognizable changes to the system, via the video stream 304 data input, using the output video 218 provided by the system.

In some embodiments, the imaging unit or the camera is positioned to capture the user fully to provide a full view of the user included in the video stream.

In some embodiments, the imaging unit or the camera is positioned to capture at least a part of the user self to provide a partial view of the user included in the video stream.

A three-dimensional scene refers to a three-dimensional space with one or more objects at multiple depths or distances from a point of view. The further back objects 1310, the actor representation 1312, and the closer forward objects 1308 are rendered (step 1316), such as by a 2D projection (such as orthographic, oblique, perspective, etc.) to render the output video 218, then displayed 224 using a display unit 110. The display unit 110 may be a monitor, a projector, augmented reality glasses, virtual reality headset, display presented by other wearables, or any other devices that display image(s) or video(s) for visual presentation. In some embodiments, such as where the display device 110 is capable of receiving three-dimensional content, the rendering 1316 may leave the generated three-dimensional scene 1316 substantially unaltered in passing it through directly to the display device 110 to be displayed.

The computer program instructions may be stored in computer-readable media that can direct the system, its components, or other programmable data processing apparatus to function in a particular manner, such that the instructions stored in the computer-readable media constitute an article of manufacture including instructions and processes which implement the function/act/step specified in the flowchart and/or block diagram provided herein. These computer program instructions may be provided to a processor of the system, such that the instructions create means for implementing the functions/acts specified in the flowchart and/or block diagram block or blocks. In the following description, reference is made to the accompanying drawings which are illustrations of embodiments in which the disclosed system may be practiced. The system of the present disclosure is configured to specifically carry out the methods contemplated in this disclosure. It is to be understood, however, that those skilled in the art may develop other structural and functional modifications without departing from the novelty and scope of the instant disclosure.

Figure 16:
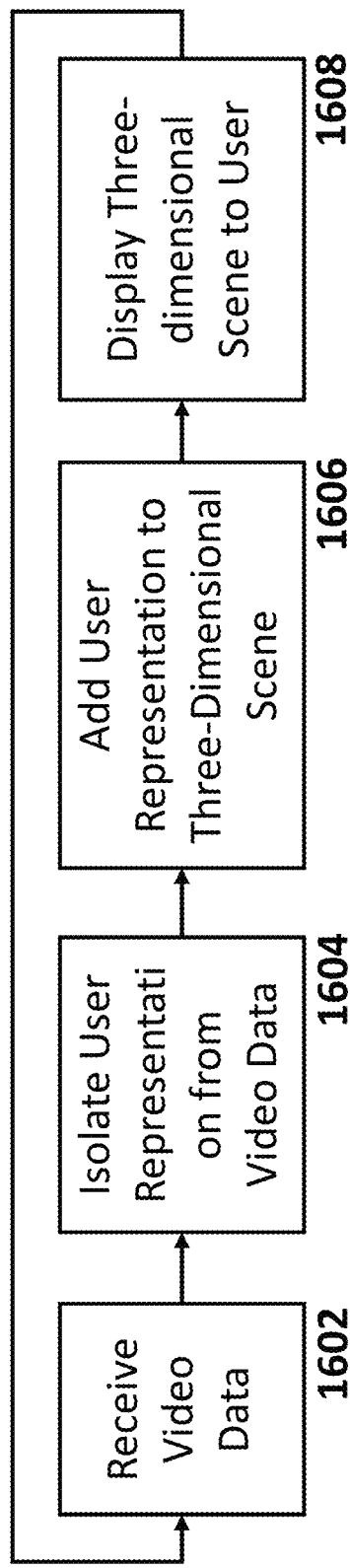

In some embodiments, as shown in FIG. 16, the system behaves as a user control mechanism enabling the physical user to control their virtual self (i.e., the virtual user or user representation produced on the display) within a virtual three-dimensional world, as well as interact with objects in that virtual world, by displaying to the physical user a realtime representation of the virtual user as seen within the virtual world. To the extent that user sees objects with which they want to interact, the user can move their physical body (or make gestures to similar effect) in the physical world such that their virtual user representation similarly moves its body to take such action within the virtual world.

As shown in FIG. 16, in some embodiments, the user control mechanism operates as follows:

In step 1602 the system receives video data such as a frame of video (containing an image of the actual user) from an imaging device. The imaging device may be a two-dimensional or three-dimensional camera or multiple cameras. Types of cameras include, but are not limited to, webcams on laptops and cameras on mobile phones (including the "front facing" or "selfie" camera on a mobile phone).

In step 1604 the system isolates a user representation from the video data received in Step 1602. In some embodiments, the isolation is done by means of human body segmentation or "selfie segmentation" as is commonly used by video conferencing software to isolate or segment the user's image from the image of their surrounding actual environment so as remove and replace it with a more desirable background.

Once the user's image is isolated, some embodiments of the system may use all or some of this image as the user representation (also referred to as "virtual user" or "virtual user representation"). In some embodiments, the virtual user representation may be entirely the "in real life" image of the physical user. In other embodiments, the virtual user representation may be in part the "in real life" image (for example, only the face) while other parts of the virtual user may be virtual (such as the body of an avatar) or augmented (such as wearing virtual clothing or holding virtual objects). And, in some embodiments, the virtual user may be entirely virtual such as a virtual avatar (including, but not limited to, an avatarized representation of the physical user). In some embodiments, the user representation may be flat (like a paper cutout) or with a fixed thickness. In other embodiments, it may be rounded or more similar to an actual human body. In some embodiments, such as an avatarized user representation, the user representation may be based on a multitude of images captured of the user, either in an explicit training step (such as the user being required to stand before the camera in a "T-pose" and possibly rotate) or by capturing a multitude of images during the normal course of the user using the system.

After receiving the user representation in step 1604, in step 1606 the system then adds the user representation or virtual user to a three-dimensional scene. The three-dimensional scene, also referred to as "virtual world/scene/space" or "three-dimensional space", is a three-dimensional space that may also contain various features such as objects, environmental features (such as hills, mountains, trees), other virtual users, etc. The three-dimensional scene/space may be a three-dimensional representation made up of voxels (i.e., three-dimensional or "volumetric" pixels) and/or vectors with x-y-z coordinate locations and held in computer memory. The three-dimensional scene may be static or dynamic. In some embodiments, it may be produced by a virtual reality application such as a game.

In some embodiments, step 1606 may involve adding the virtual user representation to the three-dimensional scene on a "frame-by-frame" basis, thereby allowing the physical user to control the virtual user by the actual physical user's own frame by frame movement or actions. However, as exemplified in FIG. 20B and FIG. 20C, in some embodiments, rather than adding and re-adding the virtual user representation again for each and every frame, Step 1606 may include step 1606a of instantiating and adding the virtual user representation once initially as an object in the three-dimensional scene, and then proceed to update the virtual user representation object in the three-dimensional scene on subsequent iterations (step 1606b) which may correspond to subsequent "frames". In this way, the virtual user representation object is added and instantiated only once (or less frequently than every frame) and updated (as frequently as every frame) rather than re-instantiated and re-added every frame.

Upon receiving the three-dimensional scene (such as by a pointer to the computer memory in which it is stored) which now includes the virtual user or user representation, the system in step 1608 then proceeds to display the three-dimensional scene back to the physical or actual user. This realtime feedback to the user enables them to continue to control their virtual self with within the virtual three-dimensional world. In some embodiments, displaying is done via a two dimensional display, such as a 2D monitor. In such a display, the user is able to see their image within the virtual world. (When displaying on 2d monitor, the three-dimensional scene (which includes the user representation) is first rendered by typical means of two-dimensional projection such as orthographic, oblique, perspective, etc.) In other embodiments, displaying may be done via a three-dimensional display device.

After step 1608, the process loop repeats beginning a new iteration with step 1602 so as to continue to provide control and visual feedback to the user for controlling its virtual self within the three-dimensional virtual world.

Figure 21:

FIG. 21 illustrates an example applying the steps described in FIG. 16. The user is physically standing in front of a camera in her actual room. In step 1602 the system receives a first frame of video from the camera. Upon receiving that video, in step 1604 the system isolates the user's image from the video by means of human body segmentation and proceeds to use this this image as part of the user representation. More specifically, in this embodiment illustrated in FIG. 21, in step 1604, the system uses three copies of the user's body image (with a fixed offset of position and scale) as the user representation. Given an "empty" (i.e., without virtual user representation) three-dimensional scene or space of a virtual dance hall, the system in step 1606 proceeds to add the user representation (e.g., for this particular example, with three copies of the user's current body image from the most recent frame of video from the camera. For clarity, any number of copies of the users current body image, including a single copy, can be used as the user representation.) to the three-dimensional scene of the virtual dance hall. In step 1608 the system renders the three-dimensional scene to a 2D image and then displays the image on a display unit, such as a monitor screen, for the user to see. Seeing what her current virtual user representation looks like within the virtual world, the user adapts her body position and pose ever so slightly. As she does, the process loop repeats starting over again at step 1608 which receives the next frame of video with the user's adapted pose and location (i.e., visually recognizable changes of the user). Based on this latest frame of video as input, the process proceeds again through step 1604 isolating the user image and producing a user representation (with three images of the user's body), step 1606 adding the latest user representation to the empty virtual scene, and step 1608 displaying the latest 2D rendering to the user reflecting what the virtual user now looks like in the virtual three-dimensional space.

Figure 17:
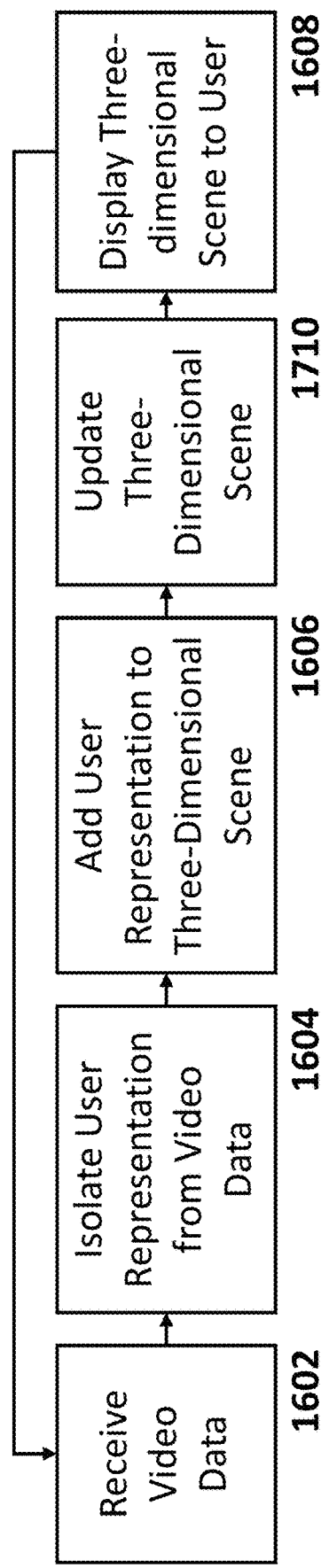

As shown in FIG. 17, some embodiments may additionally include step 1710 for updating the three-dimensional scene. In some embodiments, step 1710 involves updating the three-dimensional scene apart from the virtual user representation. In some embodiments, step 1710 involves updating the three-dimensional scene, including updating or modifying the virtual user representation.

At Step 1710, the system enables the three-dimensional scene to be dynamic. In some embodiments, in step 1710 the system updates the scene based on the passage of time, or randomly over time. For example, without step 1710 in the process, the virtual user can be added to the virtual space of a static dance hall which never changes. With step 1710 as part of the process, the virtual dance hall can have a spinning disco ball and a floor made up of tiles pulsating with different colors. In some embodiments, the three-dimensional scene may update based on external inputs such as the weather outside, the stock market, or signals sent from a keyboard or game controller.

Figure 18A:
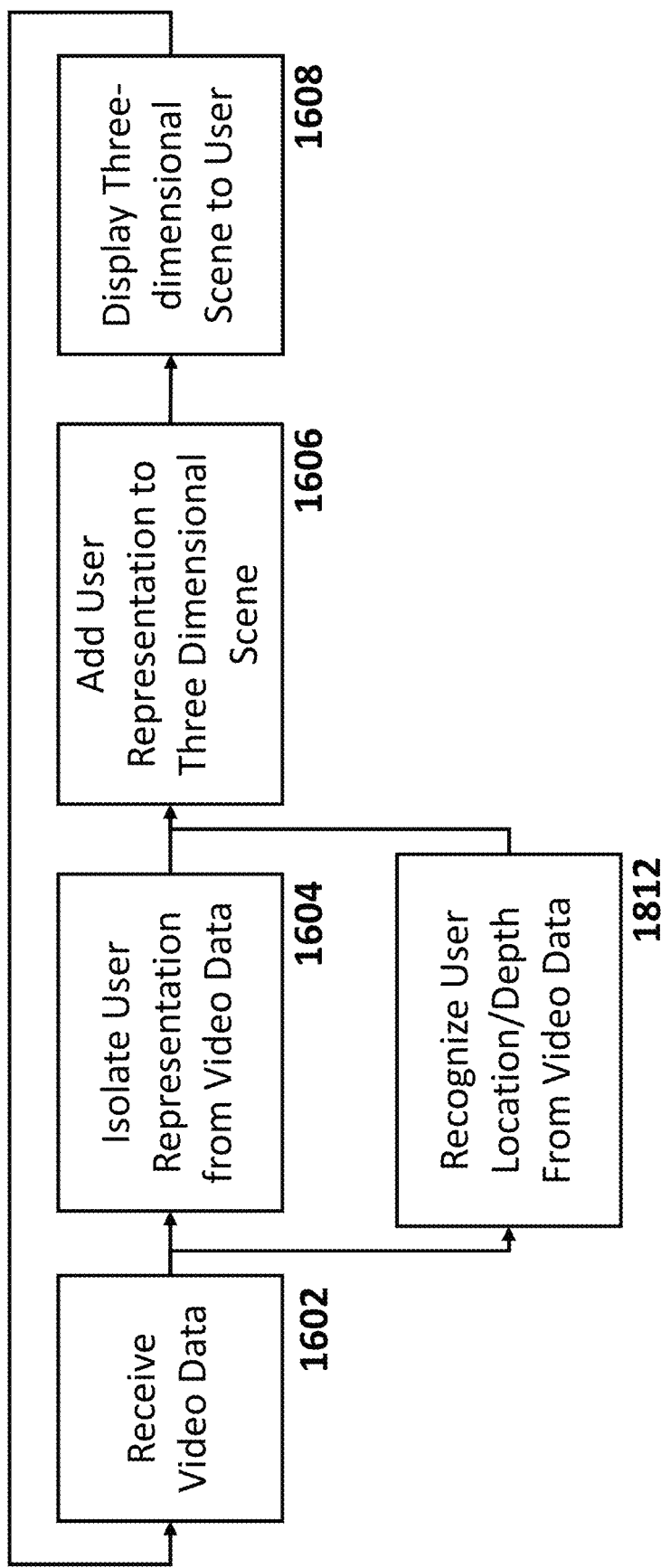

As shown in FIG. 18A, some embodiments may include the step 1812 of recognizing the user's physical location. Location may include, but is not limited to, one or more of lateral or "x" location, vertical or "y" location, depth or "z" location, as well as rotation or orientation with respect to all three axes. In some embodiments the location is determined with respect the camera or imaging unit. In other embodiments the location is determined with respect to the room or physical space within which the user is located. The location may be determined by techniques for human body tracking, depth estimation, etc.

Regarding depth estimation, in some embodiments, a depth-sensing imaging unit (including, but not limited to, time of flight (TOF) cameras/sensors, stereoscopic cameras, multiple cameras used together, 2D cameras complemented with lidar, cameras on mobile phones with depth sensing technology, and the like) may be used to extract depth information from a scene captured by the imaging unit. In other embodiments, the imaging unit, such as a two-dimensional camera, may be used in conjunction with recognition of depth cues in the scene in order to extract depth information from the scene. Examples of depth cues include the distance between detectable features on the human body, such as distance between both eyes or various joints of the body. Such features appear larger when closer to the camera and smaller when further from the camera and in this way may help to estimate depth or "z" distance from the user.

After producing the location information in step 1812, the system in step 1606 may utilize this information to determine exactly where to position the user representation or virtual user when adding it to a three-dimensional scene. In one embodiment, the physical actor shifting to the left by one meter (as determined in step 1812) may cause the system in step 1606 to add the virtual user to position shifted to the left in the virtual space. In another embodiment, however, the same leftward shift by the physical user may cause the system in step 1606 to add the virtual user representation to the right (instead of left) indicative of a "mirror" effect, or in another embodiment add the user in a completely different area within the three-dimensional space as may be indicative of a "wormhole" or "teleport" effect.

Changes in the location and orientation provided by the system in step 1812 can be referred to as "shifts". In some embodiments, step 1606 may involve "mapping" certain types of shifts of the actual physical user to specific corresponding types of shifts by the virtual user representation. In some embodiments, left-to-right shift by the user may result in left-to-right shift by the virtual user representation, while in other embodiments it may be the opposite. In some embodiments, the user shifting forward toward the camera or imaging device may shift the virtual user representation forward, and vice versa. Alternatively, in other embodiments, user shift toward the camera (i.e., change in depth or "z" distance) may be ignored completely (i.e., mapped to no corresponding virtual shift), thereby leaving the virtual user representation to only be able to shift left and right but not forward and backward. Change in orientation or rotation may likewise be mapped in a various ways or completely ignored. As can be seen, mapping of location and/or shift between the physical world of the actual user and virtual world of the user representation may be as varied as the specific embodiments being implemented.

Figure 19:
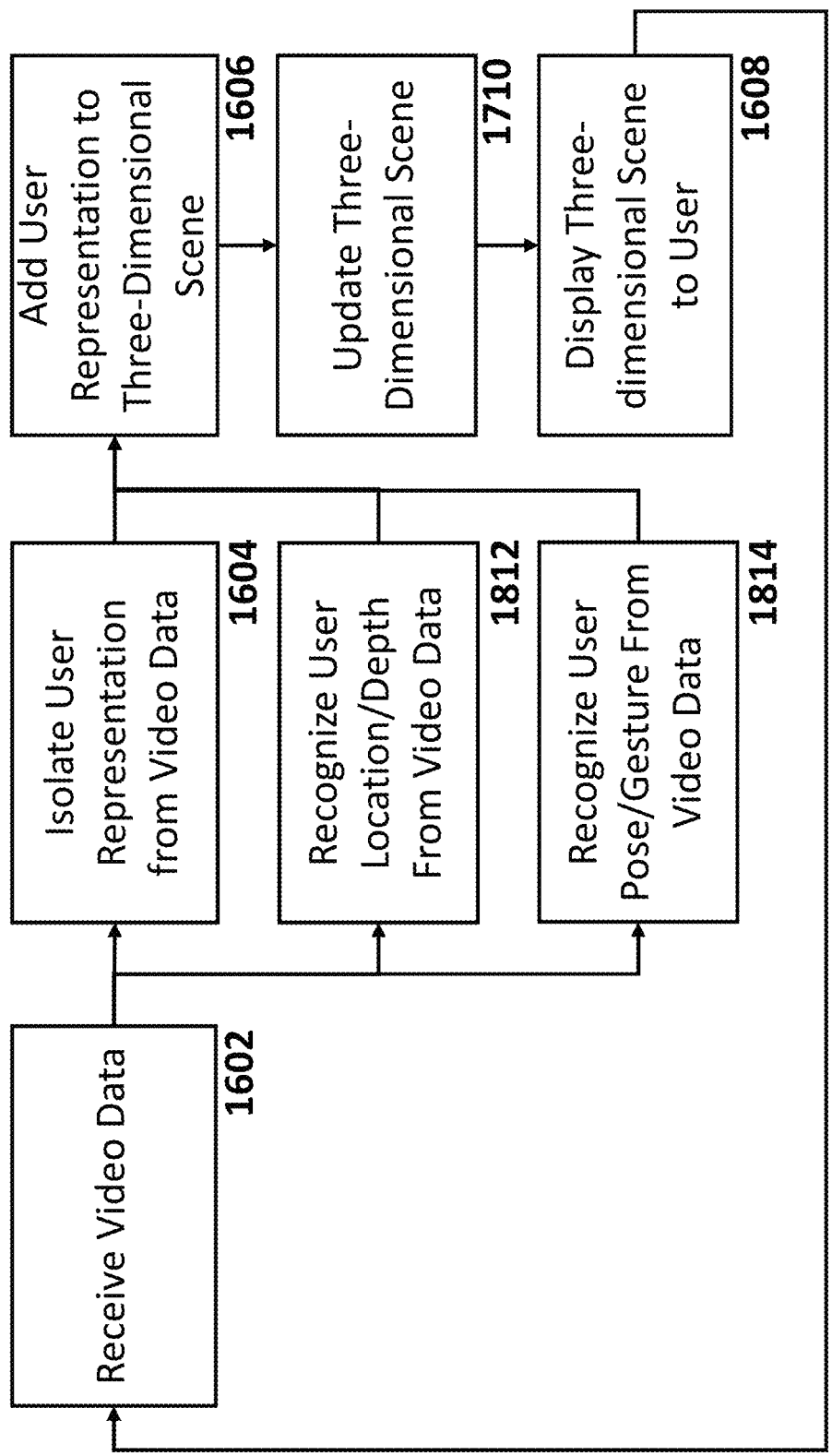
Figure 22:
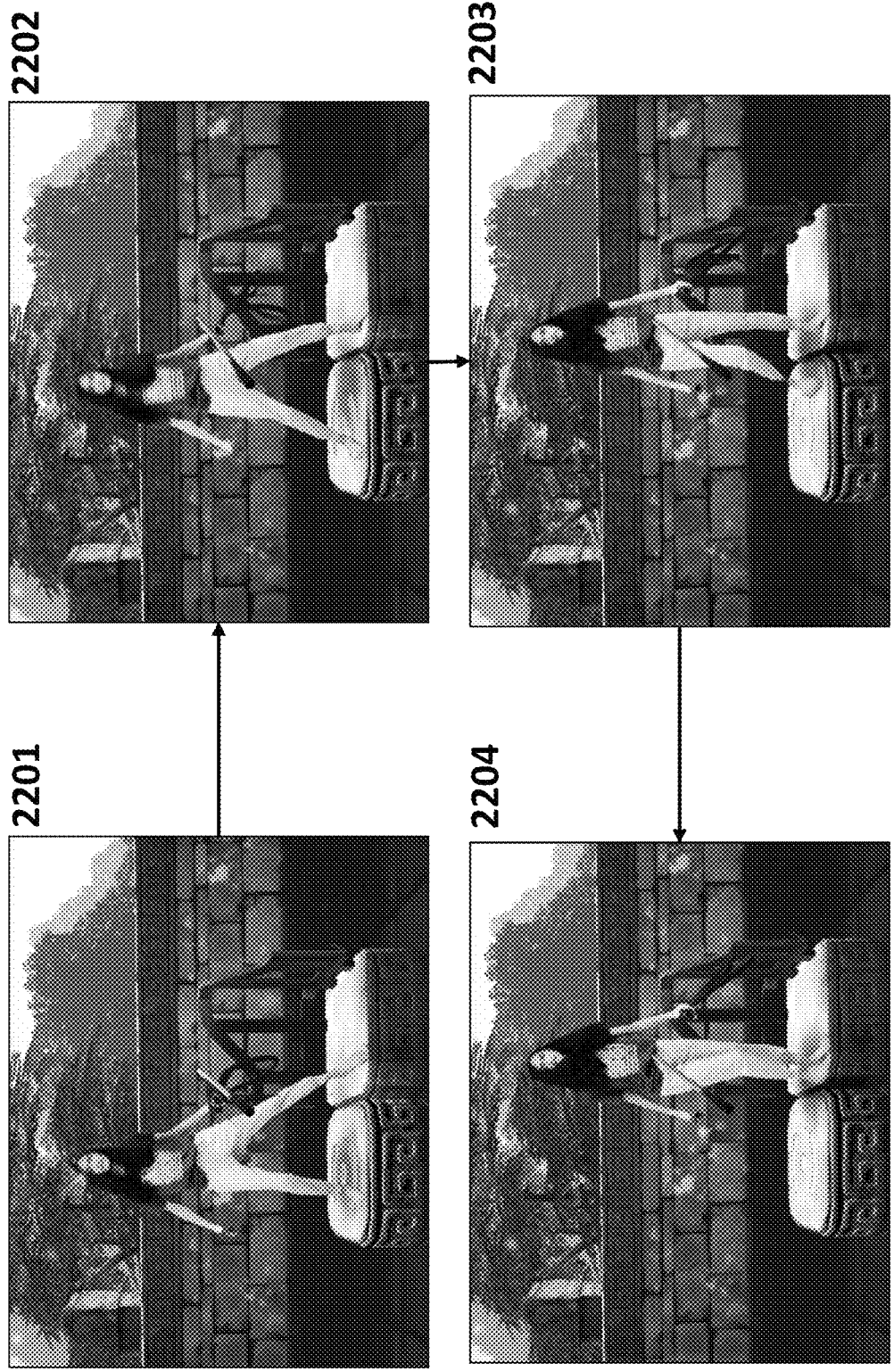

FIG. 22 shows an example embodiment of a user playing a virtual reality game. In the following description of FIG. 22, the steps presented in FIG. 19 are correlated to the particular example of FIG. 22. In the display of her laptop or mobile phone, for example, the user sees her virtual self within the virtual world. As can be seen in the four snapshots shown in FIG. 22, seeing her virtual self on the screen, the user calibrates and controls her virtual self's motions frame by frame to carefully step from one virtual stone on the left to another on the right without mistepping and falling into the water.

Regarding the first snapshot 2201: The user sees on the display that her virtual self needs to step over to an adjacent stone. The actual user physically extends her first foot. In step 1602 the system receives a first frame of video (captured by the front-facing "selfie" camera of the user's laptop or mobile phone) showing the actual user in her actual room. In step 1604 the system isolates or segments the user image from the image of her in her room and proceeds to use that user image as the user representation. In step 1812 the system determines the physical location, including depth, of the actual user within her actual room. Upon mapping that physical location to the corresponding virtual location within the virtual scene, in step 1606 the system then adds her image (i.e., the user representation) to just on top of the left stone in the virtual three-dimensional scene. And then the system in step 1608 renders three-dimensional scene from a 3d representation to a 2d image to be displayed on the user's laptop or mobile phone screen. And the next iteration of the process loop is ready to start again at step 1602.

Regarding the second snapshot 2202, the user having received the positive feedback of her seeing in the 2D image via the display unit that the virtual user has extended her foot in the right direction and place (as shown in the first snapshot 2201), the actual user proceeds to put her physical foot down such that her virtual user now has her feet firmly planted on both stones (as shown on the second snapshot 2202). This happens by the actual user putting her physical foot down, the system in step 1602 capturing that image, in step 1604 isolating and segmenting that image from the rest of her room, in step 1812 determining her actual location, including depth, in step 1606 adding the virtual user representation (her image) to the appropriate location (just above the gap between the two stones), and in step 1608 rendering and displaying the updated three-dimensional scene as the second snapshot 2202. And the next iteration of the process loop is ready to start again at step 1602. This is an example of the user controlling their virtual self by utilizing the displayed scene as feedback. As the user moves, the system causes the corresponding movement to be reflected in the virtual self shown on the display.

With the positive feedback that she appears to be successfully crossing from one step to the other, over the course of the next two snapshots 2203 and 2204, the process loop (as described in FIGS. 16-19) can continue to repeat and iterate and we see the virtual user (as controlled by the physical user) first shift her weight to the right stone 2203 and then bring both feet to the right stone 2204. This is an example of the user controlling their virtual self by utilizing the displayed scene as feedback. As the user moves, the system causes the corresponding movement to be reflected in the virtual self shown on the display.

Figure 18B:
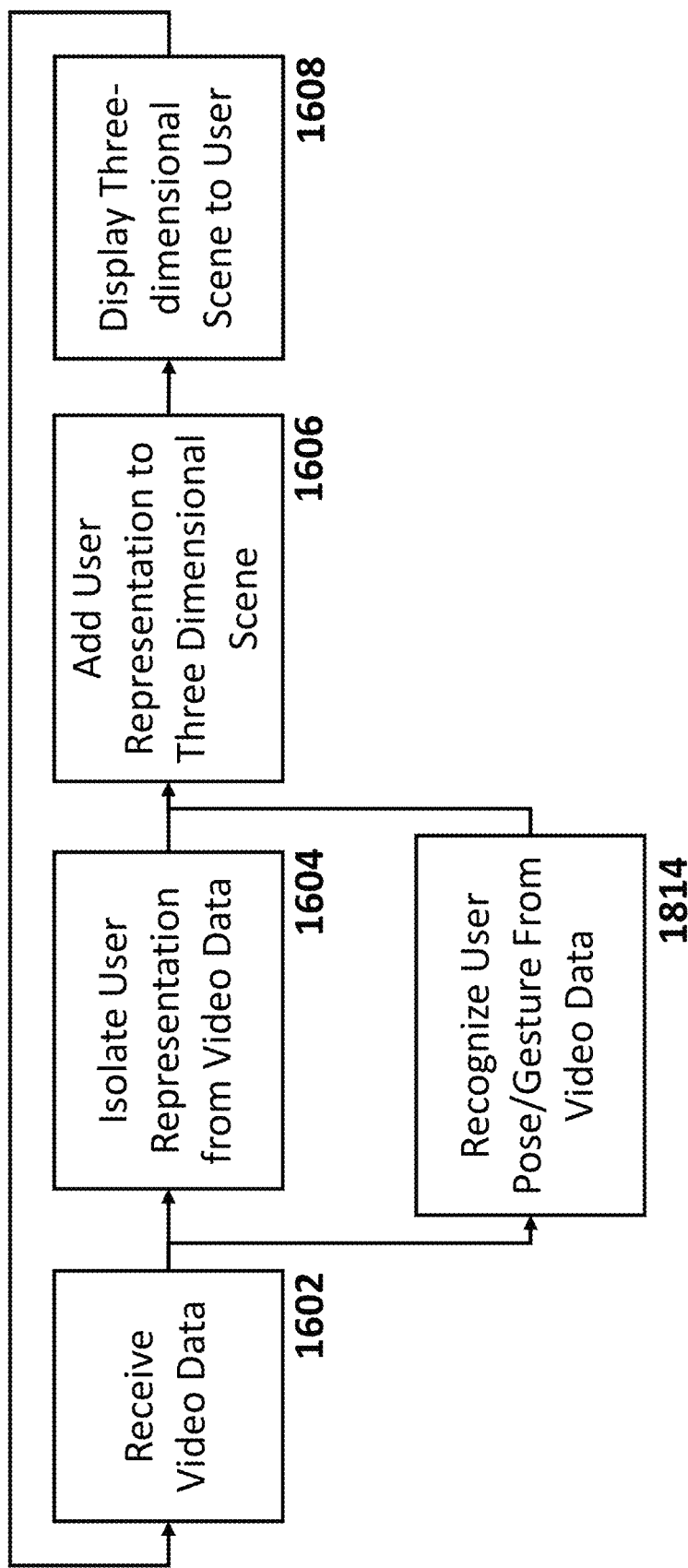

As shown in FIG. 18*b*, some embodiments may include the step 1814 of recognizing the user's pose or gesture from their image from the video data. Pose estimation can be performed by a variety of well documented techniques. Gesture recognition, also well documented, can be used to interpret the pose information to recognize various gestures of interest.

After recognizing pose and/or gesture information in step 1814, the system in step 1606 may utilize this information to determine exactly where to position the user representation or virtual user when adding it to a three-dimensional scene. For example, a user alternately bending each knee may be recognized by the system in step 1814 as making a walking gesture with their legs. In response, in some embodiments, for each consecutive video data (i.e., video frame) being processed by the repeating loop of the process, the system in step 1606 may add the virtual user shifted forward from its previous virtual location for each iteration of the loop (i.e., for each video frame), thereby shifting the position forward as if the virtual user was walking through the virtual three-dimensional scene. In another embodiment, the user being recognized by the system in step 1814 to have made a jump-like gesture may be added upward from its prior location for the next few consecutive iterations of the loop so as to show the virtual user jumping upward within the virtual three-dimensional scene. In another embodiment, the user's facial gesture or expression being recognized by the system in step 1814 as a frown may cause the system in step 1604 to produce a user representation with a blue tint, whereas the system in step 1814 recognizing a smile may cause the system in step 1604 to produce a user representation with a yellow tint.

Figure 20A:
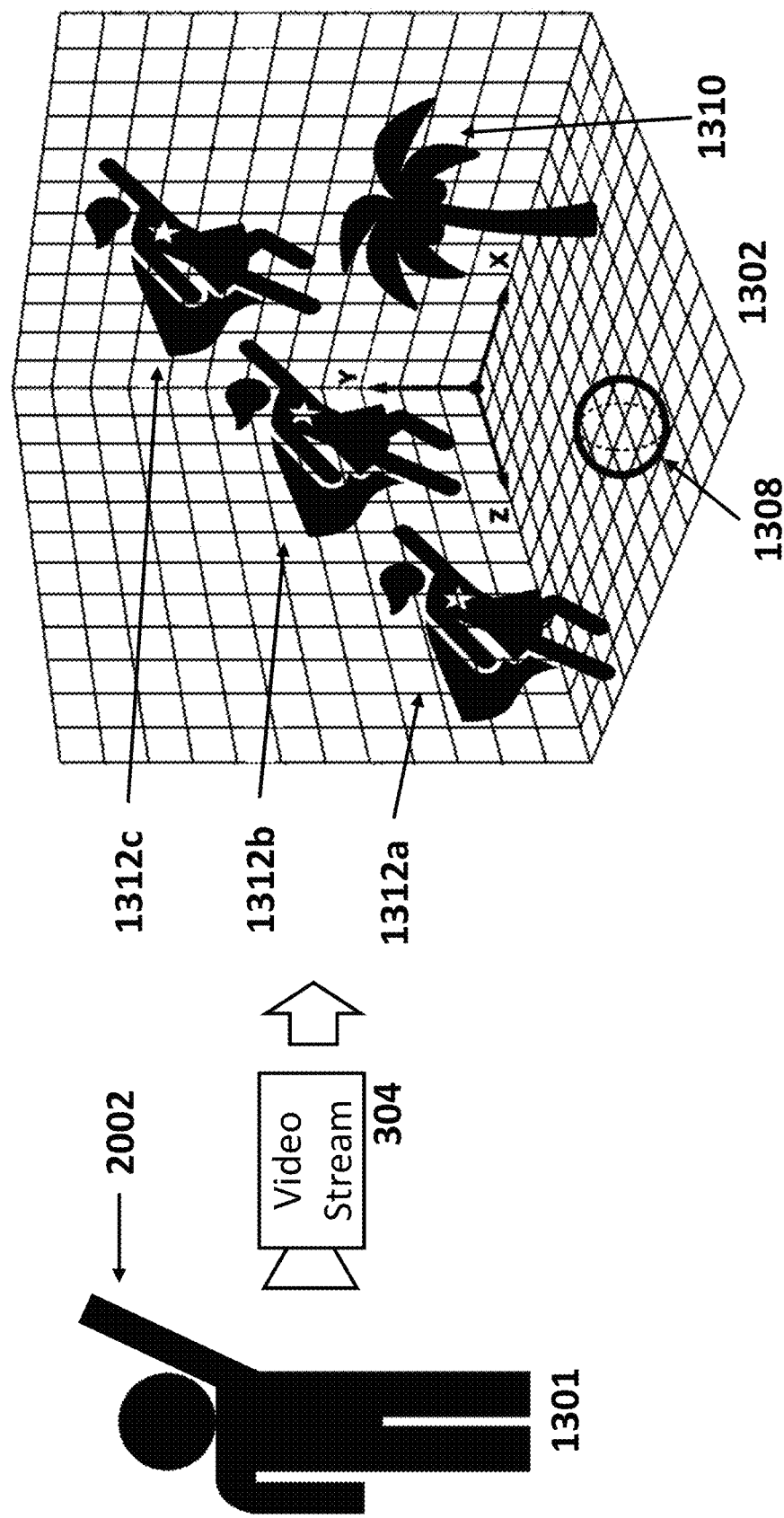
Figure 20B:
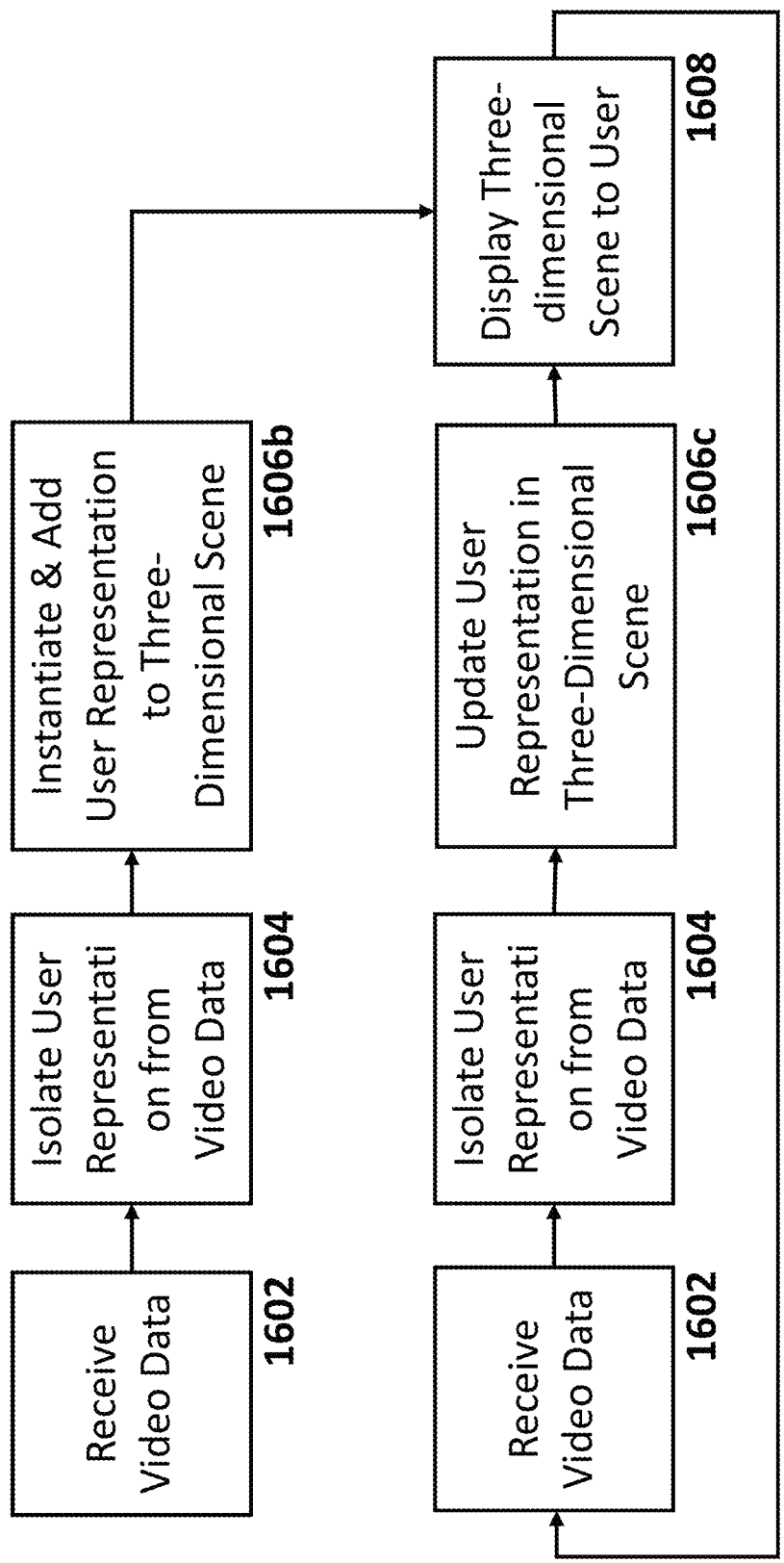
Figure 20C:
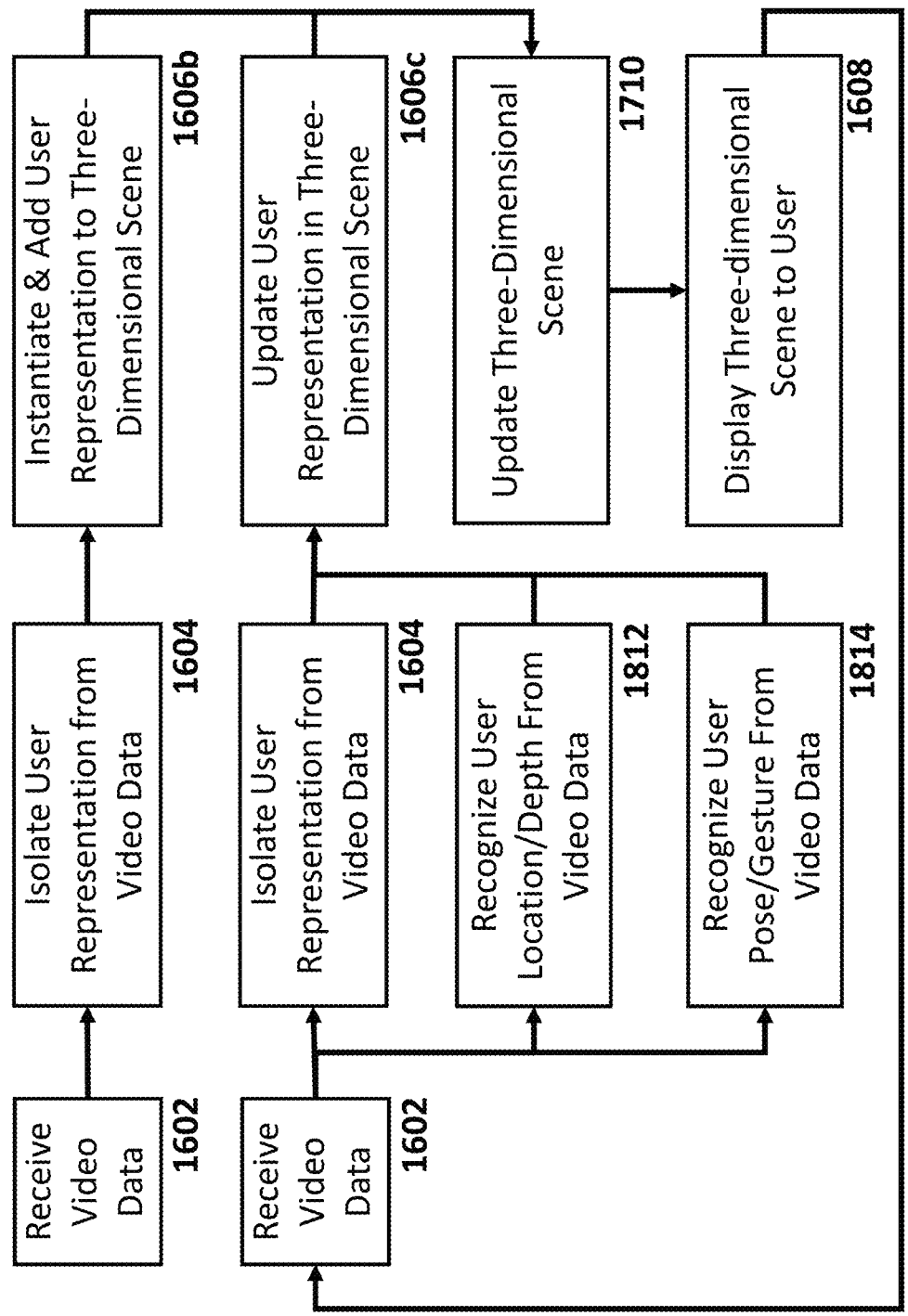

In another embodiment, as shown in FIG. 20A, a user 1301 with an outstretched arm 2002 may be recognized by the system in step 1814 as having a superhero flight pose, using the video stream 304 captured by the imaging unit 102. In response, the system in step 1604 outputs a user representation 1312 with the user's actual image wearing an augmented virtual superhero cape, for example. Then, over consecutive iterations, first iteration 1312*a*, second iteration 1312*b*, and third iteration 1312*c*, of the process loop, the system in step 1606 will iteratively add the virtual user representation incrementally upward and forward each pass of the loop (1312*a* 1312*b* 1312*c*) so as to move the virtual user representation 1312 as if flying within the three-dimensional scene 1302. The three-dimensional scene 1302 may include the three-dimensional scene objects such as 1308 and 1310. This is an illustrative example of a user's pose/gesture and the detection of such pose/gesture by the system triggering or causing a programmed corresponding action or a predefined action.

As shown in FIG. 19, the various optional steps may be brought together as well. In some embodiments, as part of updating the three-dimensional scene, step 1710, the system continuously or continually monitors the interaction or collision between all virtual users and all objects in the three-dimensional scene and also maintains/updates the state of each of these as well. For some objects, such as the spinning disco ball from the example mentioned earlier, step 1710 may include the system continuously updating it to keep it moving. For some passive objects, such as a wall, step 1710 may include a step of preventing a virtual user from being able to walk through it. For interactive objects, step 1710 may include a step of monitoring and detecting the interaction between the virtual user (or other objects) and the object to trigger and execute any necessary actions.

Figure 28:
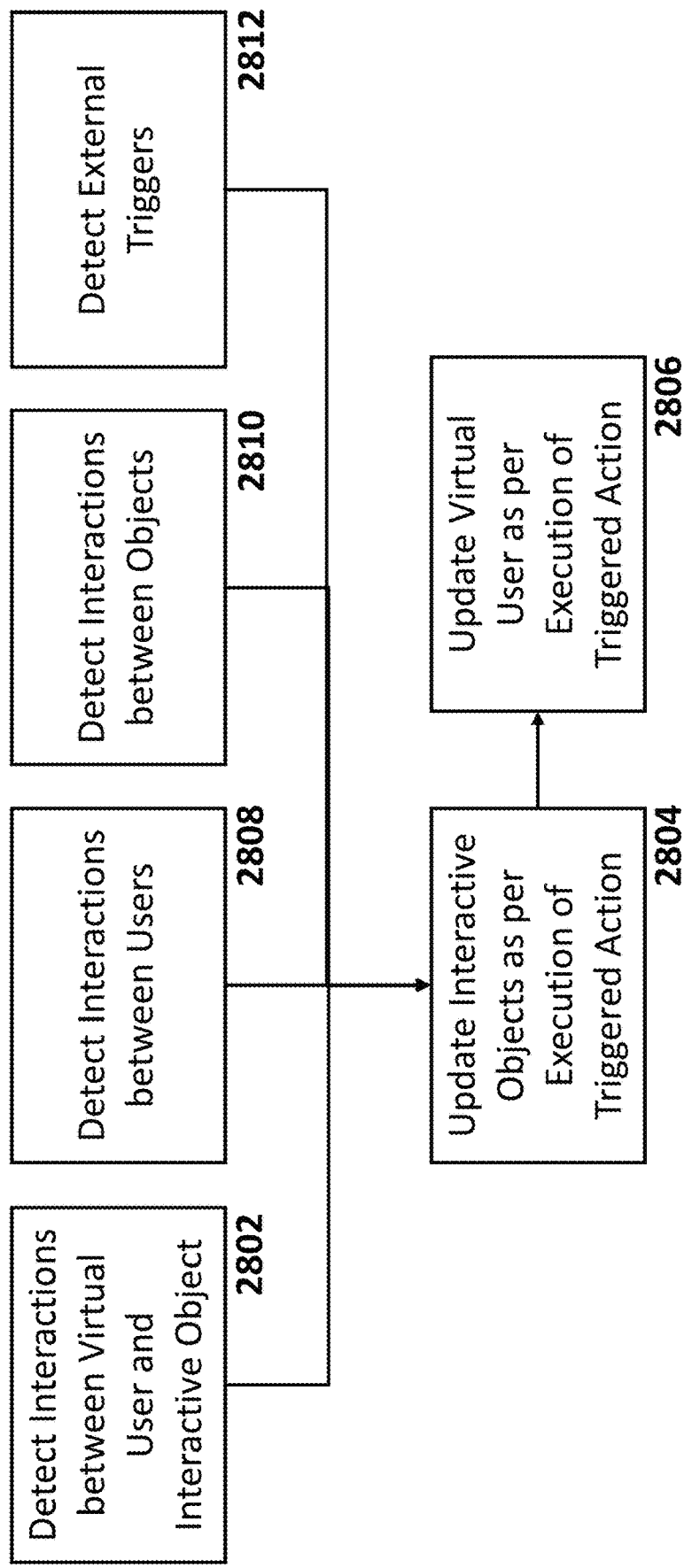

In some embodiments, the process step of updating the three-dimensional scene (step 1710) may be implemented as shown in FIG. 28. The system detects interactions between virtual users (or user representations) and interactive objects (step 2802), the interactions between multiple virtual users (step 2808), interactions between objects (step 2810), and external triggers (step 2812) such as the passage of time, weather, button presses, game controller inputs, etc. Upon the system detecting such interaction and/or triggering of actions related to the interactive objects, and then executing those triggered actions, the system in step 2804 updates the objects accordingly, and in step 2806 updates the virtual users accordingly. Virtual users (or user representations) are themselves also considered objects. Interactions between objects therefore includes interactions between virtual users and objects. Similarly, it includes interactions between virtual users.

In some embodiments, step 1710 may include the step of utilizing the location (including depth) and/or orientation data from step 1812 to update the three-dimensional scene. In step 1710 the system may do so by utilizing the location of the physical user and/or the virtual location of the virtual user representation to detect the triggering of an interactive object and then execute the associated action. In one embodiment, for example, consider a situation in which the virtual user representation is standing in front of a virtual automatic sliding door within the virtual three-dimensional scene. When the system, in step 1812, detects that the actual physical user has shifted forward within their physical space (i.e., a change in depth information), the system, in step 1606, adds the virtual user to the three-dimensional scene one step forward from where they were before. Upon detecting the virtual user now being immediately in front of the virtual automatic sliding door, the system, in step 1710, determines the sliding door interactive object to be triggered, and therefore executes the associated action which is for the doors to slide open. As such, the system in step 1710 updates the three-dimensional scene by sliding the virtual doors open.

In other embodiments, the system, in step 1710, may utilize the pose and/or gesture information provided from the system in step 1814 to update the three-dimensional scene. For example, in one embodiment of a virtual whiteboard application, a long left to right swipe gesture with an open palm might be recognized (over the course of consecutive video frames) by the system, in step 1814, as an "erase-all" gesture. As the system provides information of the occurrence of the "erase-all" gesture, the system, in step 1710, proceeds to update the virtual three-dimensional scene by removing any virtual writing or drawing which may have been done. This removal is done by returning the voxels ("voxel" refers to three-dimensional or "volumetric" pixels) involved in the writing back to their original "unwritten" state.

Continuing with the example of a virtual whiteboard, consider the case where the system, in step 1814, determines that the physical user is making pinching gesture with their fingers as if holding a pen. In this example scenario, the system, in step 1812, also determines the physical location of the physical user within its physical space. With the steps 1812 and 1814 carried out by the system, the system, in step 1606, maps that physical location to a virtual location within the three-dimensional virtual space where it adds the virtual user representation. The recognition of the pinching gesture (i.e., the pen gesture) by the system, in step 1814, causes the system, in step 1710, to update the virtual three-dimensional space to show writing or drawing (i.e., by changing the color of the appropriate voxels) in the virtual location of the hand (or virtual pen being held by the hand) of the virtual user in the virtual three-dimensional space.

Figure 29:
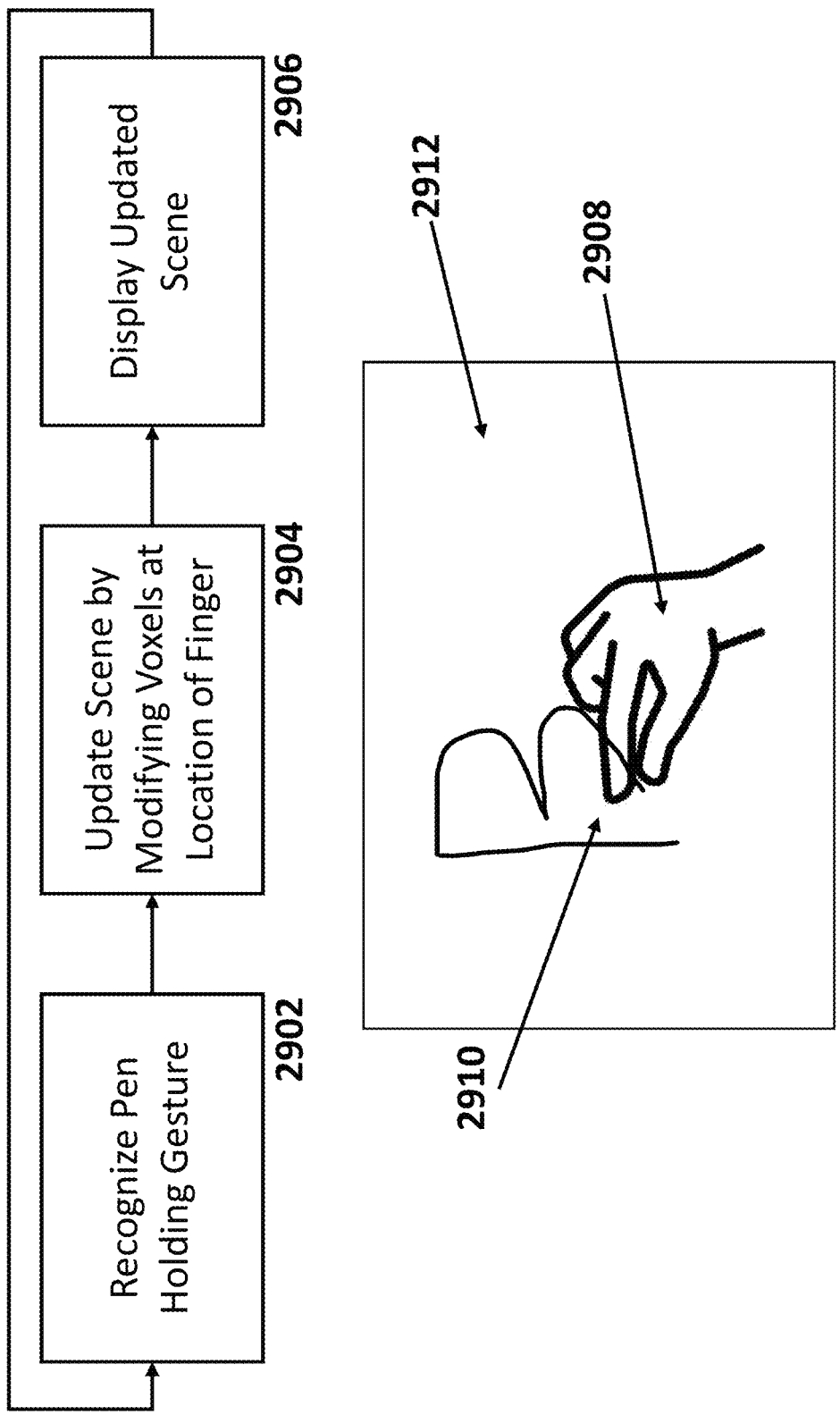

FIG. 29 shows a process flow for one embodiment of a virtual whiteboard system 2912. In step 2902, the system recognizes a pen holding gesture 2908 (such as pinched fingers) being made by the user. In step 2904, the system updates the scene by drawing or modifying the colors of the voxels (or pixels in a 2D case) at the three-dimensional location of the fingers 2910 of the user representation. In step 2906, the system displays the updated scene. The process of FIG. 29 may repeat.

As another example, if the virtual location and pose of the virtual user indicates that the virtual user is making contact, in the three-dimensional virtual space, with a button, the system detects the button being pressed, then triggers and executes a corresponding action. Such corresponding action, for example, can be changing the color of the button in response to it being pressed by the actor (i.e., by recognizing the user's location and pose indicative of making contact with the virtual button). The virtual three-dimensional space or scene is updated to change the color of the button.

In some embodiments, the system, in step 1710, may update the virtual user itself. In one embodiment, a virtual user who strays too close to a virtual land mine (interactive object), might trigger a corresponding action programmed, which can be where the interaction with it causing it to explode in the virtual three-dimensional world. Such an explosion may cause damage to other objects near it. In order to represent the explosion effect, in this example, the system, in step 1710, to updates the appearance and other properties/attributes (such as geometry, rotation, health, armor, speed, strength, etc.) of the nearby objects within the three-dimensional scene. One such affected object could also be the virtual user representation itself. In such a case, the system, in step 1710, may present an update to the virtual user representation 1312 by animating throwing the virtual user representation back from the explosion location and placing the virtual user in a lying down position (even though the actual physical user is still standing). Eventually, in the next iterations of this presentation of a series of such three-dimensional scenes, the system, in step 1710, may update the virtual user to stand up again, but the system, in step 1710, may update the representation to appear bloody or hurt. Additionally, perhaps one arm of the virtual user representation is no longer moveable (no matter what the pose of the actual user). The system, in step 1710, may also change a property of the virtual user representation slowing down the speed at which it can move as it is now injured.

Figure 23:
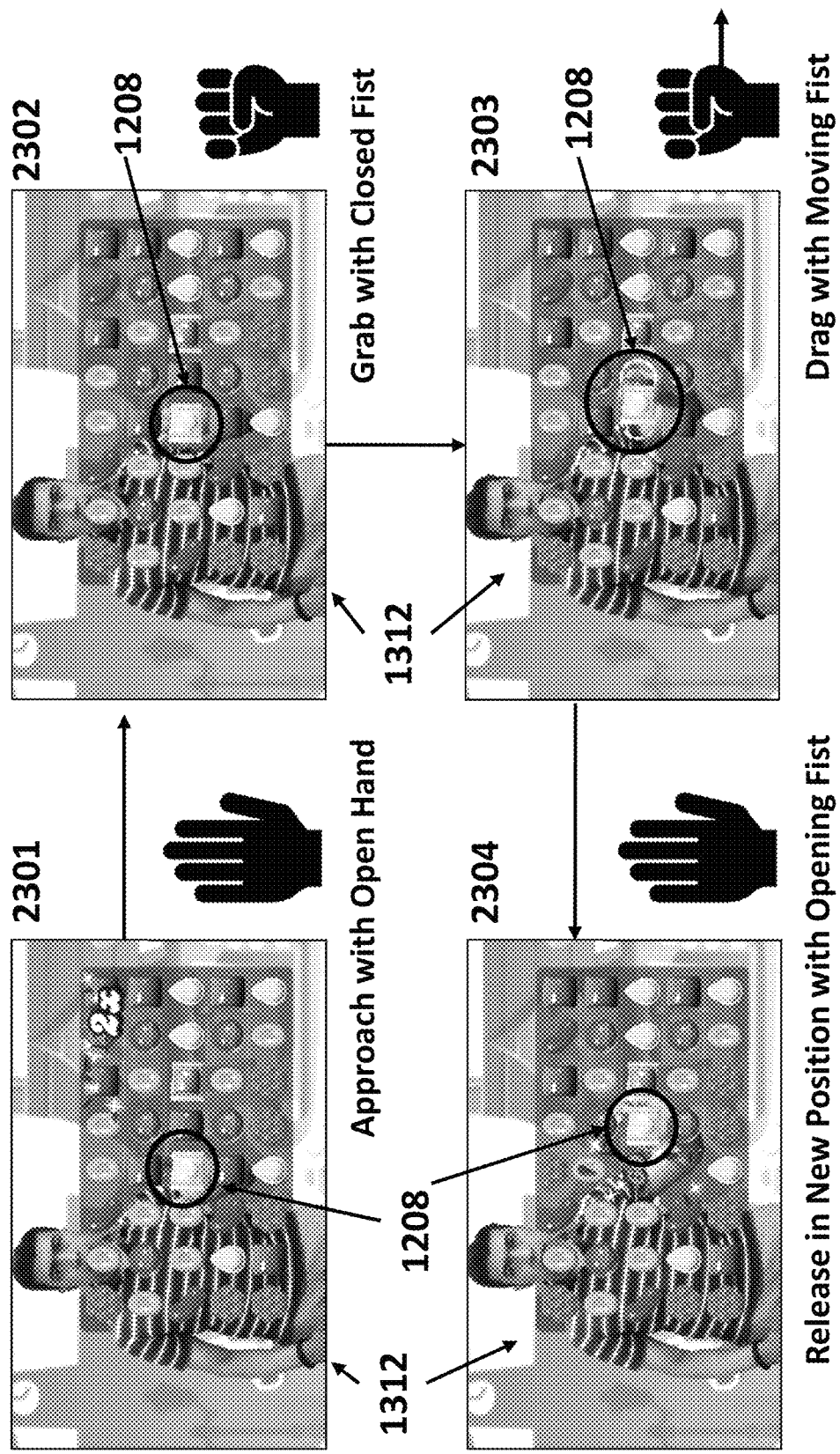

FIG. 23 shows an example embodiment of a user utilizing gestures to grab and move an interactive object 1208, in this example a piece of candy as part of a game played in a virtual scene. In the first snapshot 2301, the user approaches the yellow rectangular piece of candy (the interactive object 1208) with an open hand. The system captures a frame of the video feed of the actual user in his physical room from the imaging unit, such as a camera of a mobile phone. The system then isolates or segments from that frame the user image which it proceeds to utilize as the user representation 1312. The system recognizes the pose or gesture of the user's hand as being an open hand indicative of the beginning of a "grab" gesture. The system adds the user representation 1312 (i.e., the user image with the open hand) to the scene. The system does not detect any object interaction yet, so it does not update the scene any further. The system renders and displays the image 2301 to be seen by the user on the screen of his mobile phone. And the process loop is ready to start its next iteration.

Regarding the second snapshot 2302, the user sees, on the display, that the open hand of his virtual self is behind the interactive object 1208, and the actual user then proceeds to physically close his fist. In this example, the user is able to control the virtual representation of himself 1312 by using the scene shown on the display as a positive feedback. The system captures the video frame of the actual user in this pose. The system isolates the most recent user body image (i.e., with the closed fist). The system recognizes the closed first (followed by the open hand previously) as indicative of a "grab" gesture. The system adds the most recent user representation (i.e., the user image with the closed first) to the scene. Although the system detects an object interaction (i.e., the grab), this embodiment may not require the candy to be redrawn as a result, so no further updating of the scene is done. The system renders and displays the image 2302 to be seen by the user on the display of his mobile phone. And the process loop is ready to start its next iteration.

Regarding the third snapshot 2303, with the feedback that his virtual self 1312 has grabbed the correct piece of candy, the actual user proceeds to move his first to the right. The process proceeds as before. The system identifies the moving first as a "drag" gesture. The system therefore updates the scene this time to show interactive object 1208 being dragged to the right. The system displays the scene to the user, before the process loop proceeds to begin the next iteration.

Regarding snapshot 2304, with the visual feedback that his virtual self has successfully dragged the virtual piece of candy 1208 to its desired final position, the actual user opens his fist. The image 2304 is displayed showing the user's virtual user representation 1312 having released the piece of candy (an interaction object 1208) in its final desired location. This is an example of a user's gesture/pose triggering a programmed action of an interactive object 1208.

Figure 24:
Figure 24:
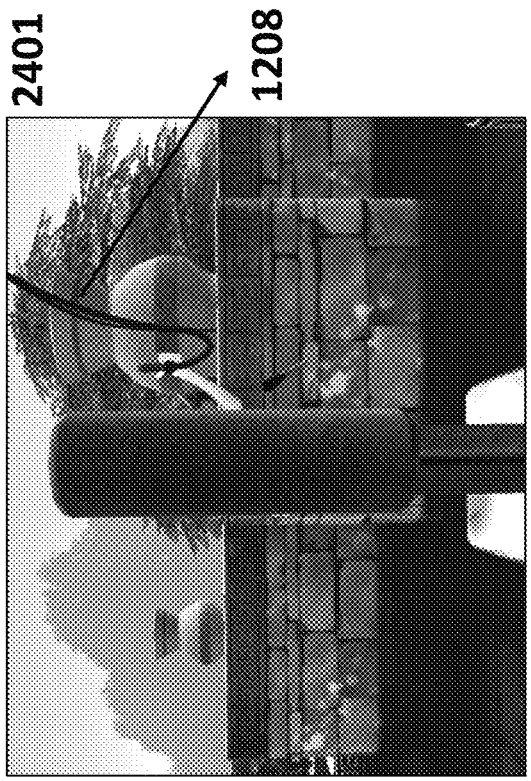
Figure 24:
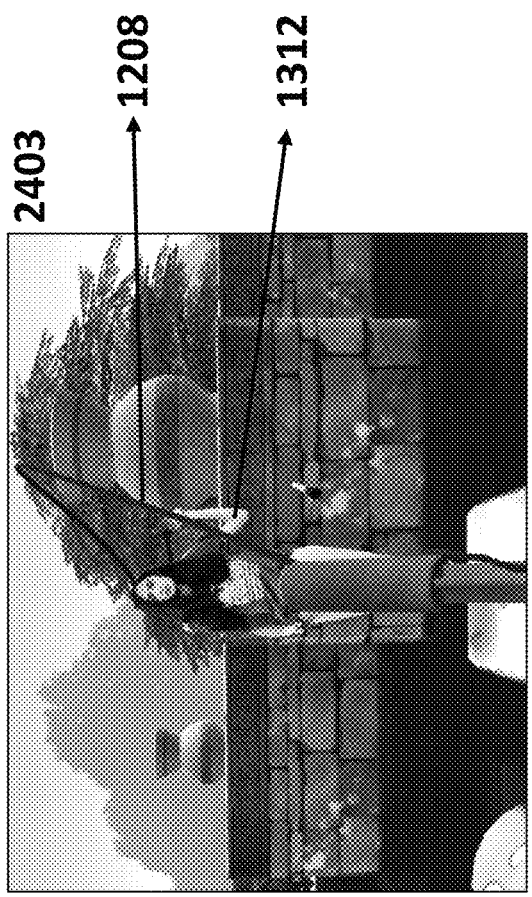

FIG. 24 shows another example of an embodiment in which the user is able to control and use one interactive object to trigger an action by another interactive object. In snapshot 2401, although most of the body of the user representation is occluded by the handle (an interactive object 1208) appearing in the center of the snapshot, the raised arm can be seen in the act of casting (or whipping) a virtual whip (an interactive object 1208) being held in its hand. The virtual whip is being drawn and updated by the system on every iteration of the process loop. In snapshot 2402, the whip 1208 can be seen to have wrapped itself around the handle in the center of the snapshot. The system detected the contact interaction between the whip and the handle and updated the scene to show the whip wrapped around the handle. Then, in snapshot 2403, upon the user making the gesture of pulling the whip 1208 back, the virtual user 1312 pulls the virtual whip 1208 back thereby pulling down the virtual handle. With the system having recognized the gesture, the system updated the scene to reflect the whip pulling down the handle.

While the descriptions of FIGS. 16-19 above discuss embodiments involving a three-dimensional virtual space, it should be noted that some embodiments implement the same or similar concepts utilizing a two dimensional virtual space.

In some embodiments, the point of view of each virtual user is from a third person perspective facing the front of the user. In some embodiments the point of view (from which the rendering of the three-dimensional scene is done) moves with the virtual user staying a fixed distance in front of them. In other embodiments, the point of view is stationary. And, in other embodiments, the point of view's distance from the user and angle of viewing varies by situation.

In some embodiments, the view of each virtual user is from a third person perspective from behind the user. In such cases the user representation may use or display a back-side (or "from-behind") image or representation of the user. In some embodiments, such a representation may be extracted from a stored body representation similar to that described in the discussion of body cutoffs and FIG. 15. In some embodiments, such as for applications or games that require a behind-view of the user, some embodiments may utilize an explicit image capture step involving asking the user to show their back side to the imaging device in order to capture back view for enabling the system to have a back view representation of the user. The back view can then be used as the user representation seen by the user in the display of their virtual self in the virtual world.

Multiple Persons and Multiple Users

In some embodiments, multiple virtual users can be added to, participate in, and interact with the same virtual three-dimensional scene.

In some embodiments, multiple users may access the system remotely from different locations on the network. In such cases, some of the steps of the process loop example embodiments shown in FIGS. 16-19 may take place on the cloud, on user's local device, or a combination. Likewise, the steps of the process loop may take place in differing orders.

Figure 25:
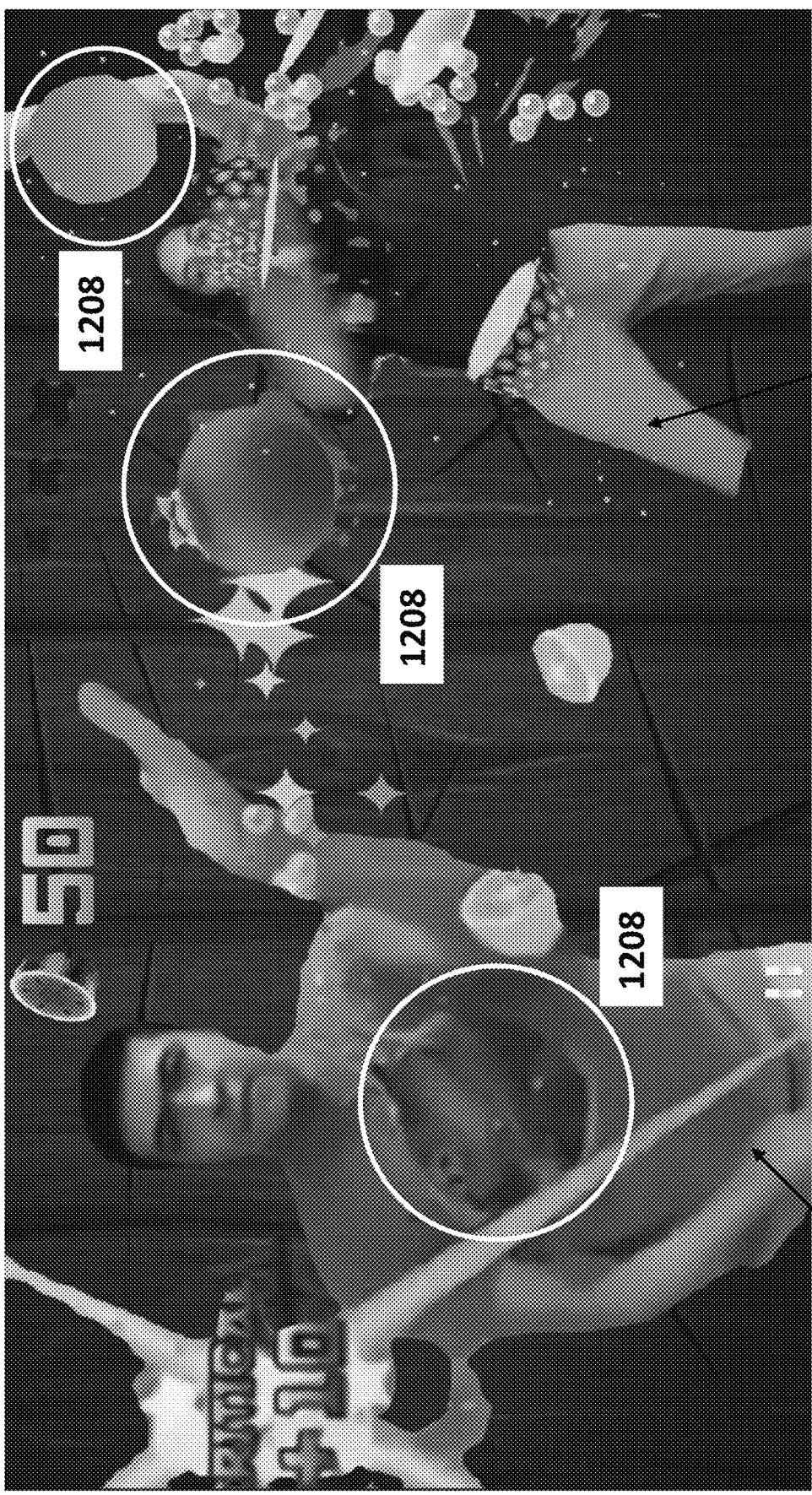

FIG. 25 shows an example of multiple users remotely being added to and participating in a game in the same virtual space. In embodiments such as this one, the view of each virtual user is from a third person perspective facing the front of the virtual user. In embodiments such as this one, the virtual user representation is a mirrored image of the actual user as it often feels more natural and intuitive for people to see their mirror image (e.g., when the actual user moves their actual left hand, they will see move the virtual hand which appears on the left from their perspective, even though it is technically the virtual user's right hand from the virtual user's perspective). By their user representations incorporating their respective faces, each user can see the actual expressions on each other's faces while also communicating with them through audio passed through the system amongst nearby virtual users. This gives users an enhanced of sense of co-presence. Plus, each user being able to see their own facial expression allows them to also see how others would see them. In addition, such sense of co-presence can be enhanced by displaying to each of the users a virtual scene containing both users on a display.

In some embodiments, multiple users may access the system locally through the same imaging device. In some embodiments, any user-specific steps described herein may be performed individually for each user.

Figure 26:
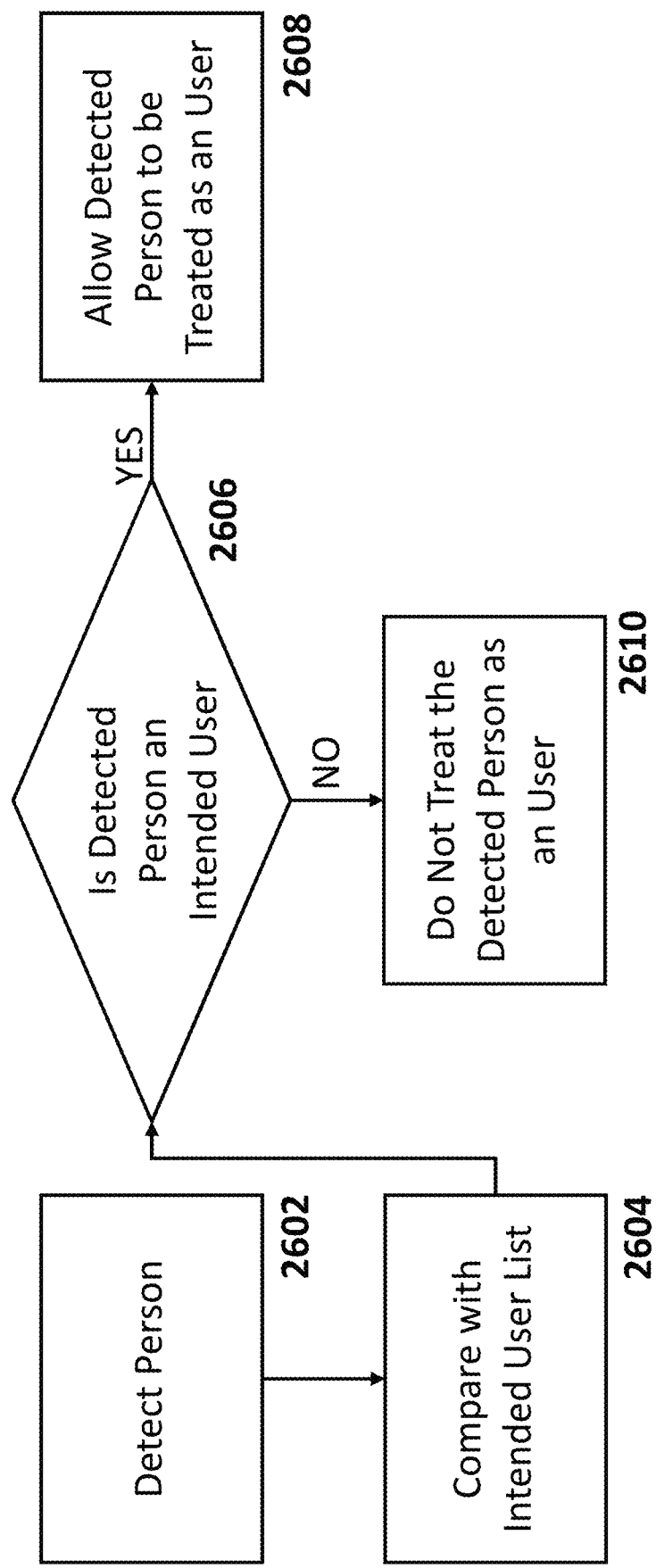

To prevent extraneous or unintended people (such as passersby or onlookers appearing in the camera view) from being treated as intended users, the system can filter any people detected in the image. In some embodiments, a person filter method such as shown in FIG. 26, is executed for each person detected in the video data (or video frame). The system in step 2602 detects the person(s) appearing in the video frame. For each person detected, the system in step 2604 compares the person against a list of intended users. In some embodiments, the list of intended users contains at least partial body images of intended users. The comparison can be done well known image comparison methods such as face comparison, feature comparison, color histogram comparison, and the like. In some embodiments, the intended users list may be populated by means of an explicit intended user registration process such as might be prompted by the user interface before beginning any use of the system. In other embodiments, the intended users list may be populated implicitly by taking images of the most recent and/or most common reoccurring user(s). Once the comparison is done in step 2604, the system in step 2606 determines whether the detected person is in fact an intended user. If so, then the process to proceeds to step 2608 whereby the detected person and their image is allowed to proceed as a user and thereby have their user representation isolated and added to the virtual scene. If not, then the process to proceeds to step 2610 where by the detected person and their image is not allowed to proceed as a user and have their user representation isolated or added to the virtual scene. After the filter process has been successfully executed on all detected persons, no unintended person should be included in the virtual three-dimensional scene or show up in the display of that scene.

Figure 27:
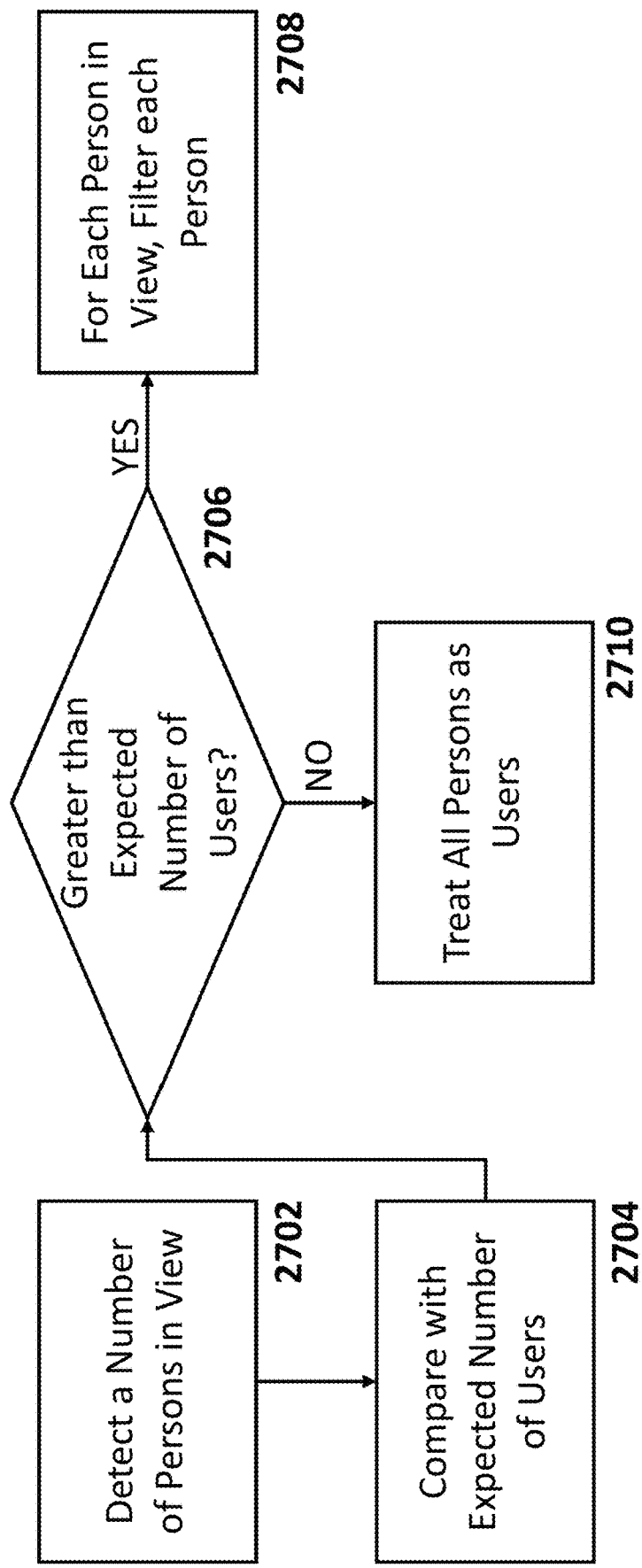

As shown in FIG. 27, some embodiments may only apply the person filter when the number of detected persons is greater than the number of expected persons. The system in step 2702 detects the number of persons in the video image. The system in step 2704 compares that number against the number of users expected. In some embodiments, the number of expected users may be predetermined by the application—e.g., a one-player game would only expect one user. In other embodiments, the number of expected users may be received explicitly by a user interface presented to the user(s) at the beginning of the application. The system in step 2706 considers the result of step 2704 to determine whether the detected number of persons exceeds the expected number of users. If yes, then an per-person filter process like described in FIG. 26 is run for each detected person. If no, then all detected persons are allowed to be treated as users.

Figure 4:
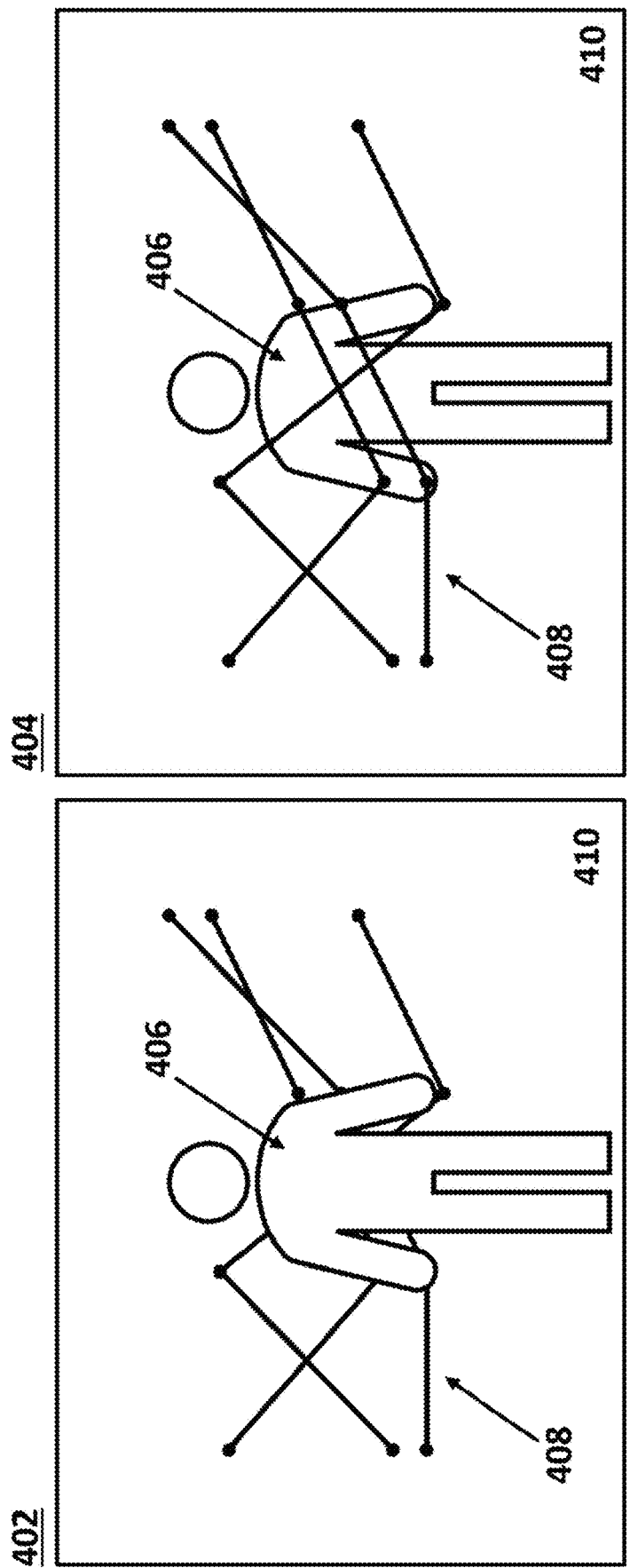
FIG. 4 through 9 illustrate example implementations according to the system and method of the present disclosure.

FIG. 4 shows example scenes 402 404 from an output video presentable using a display unit. In scene 404, the subject layer is overlayed in front of the actor layer. The actor 406 is presented in the actor layer where the subject 408 of the subject layer is unobstructed by the actor. The background layer 410 is presented behind the actor layer. As shown, each of the scene layers can include transparent portions such that the output video plays a rendered multi-layer scene depicting the actor 406 and the subject 408 of the subject layer over the background layer 410. In this example, the subject layer is showing the subject 408, a graph positioned in front of the actor layer, where the actor layer is shown with the isolated or extracted actor 408. The background layer 410 is positioned behind all other layers. The scene 402 shows a scene prior to employing the actor layer in between the subject layer and the background layer 410. In this scene, the virtual actor 408 of the actor layer is not positioned in between the subject layer and the background layer 410. In some examples, the background layer 410 and the subject layer are extracted from a composite input data. In some examples, the background layer 410 and the subject layer are sourced from a multilayer input data.

In some examples, a three-dimensional effect (e.g., an output video with multiples layers presented with each layer having variation in depths relative to one another) is achieved by identifying multiple layers from a composite input data. The composite input data can be analyzed to identify a background layer and a subject layer. Each frame of the output video is composed of at least one background layer behind the actor, at least one actor layer in front of the at least one background layer, and at least one subject layer in front of the at least one actor layer. In other words, the output video comprises at least three differently layered scene, i.e., a multilayer scene. Similarly, the output video may comprise one or more scenes having three or more different layers where the layers are positioned or stacked (i.e., a depth position within the layers/stack of layer) to create the three-dimensional effect. While the example implementations of the present disclosure, demonstrated in the drawings, primary show the multilayer scene with three layers in a scene (e.g., the background layer, the actor layer, and the subject layer), a plurality of layers can compose the multilayer scene. For example, a plurality of layers can be positioned between the background layer and the subject layer, thereby creating the three-dimensional effect or varying degrees of depth (i.e., varying depth positions of the layers). In another example, the multilayer scene can comprise multiple layers of background layers to create a varying degree of depth in the background, such as placing an image (or a frame of a video) of a mountain further behind an image of a tree. Similarly, multiple layers can be introduced in the scene subject layer. In other words, the multilayer scene may comprise a multitude of background layers, a multitude of actor layers, and a multitude of subject layers. With multitude of layers comprising the multilayer scene, a visualization effect of achieving a three-dimensional effect is enhanced.

Figure 5:
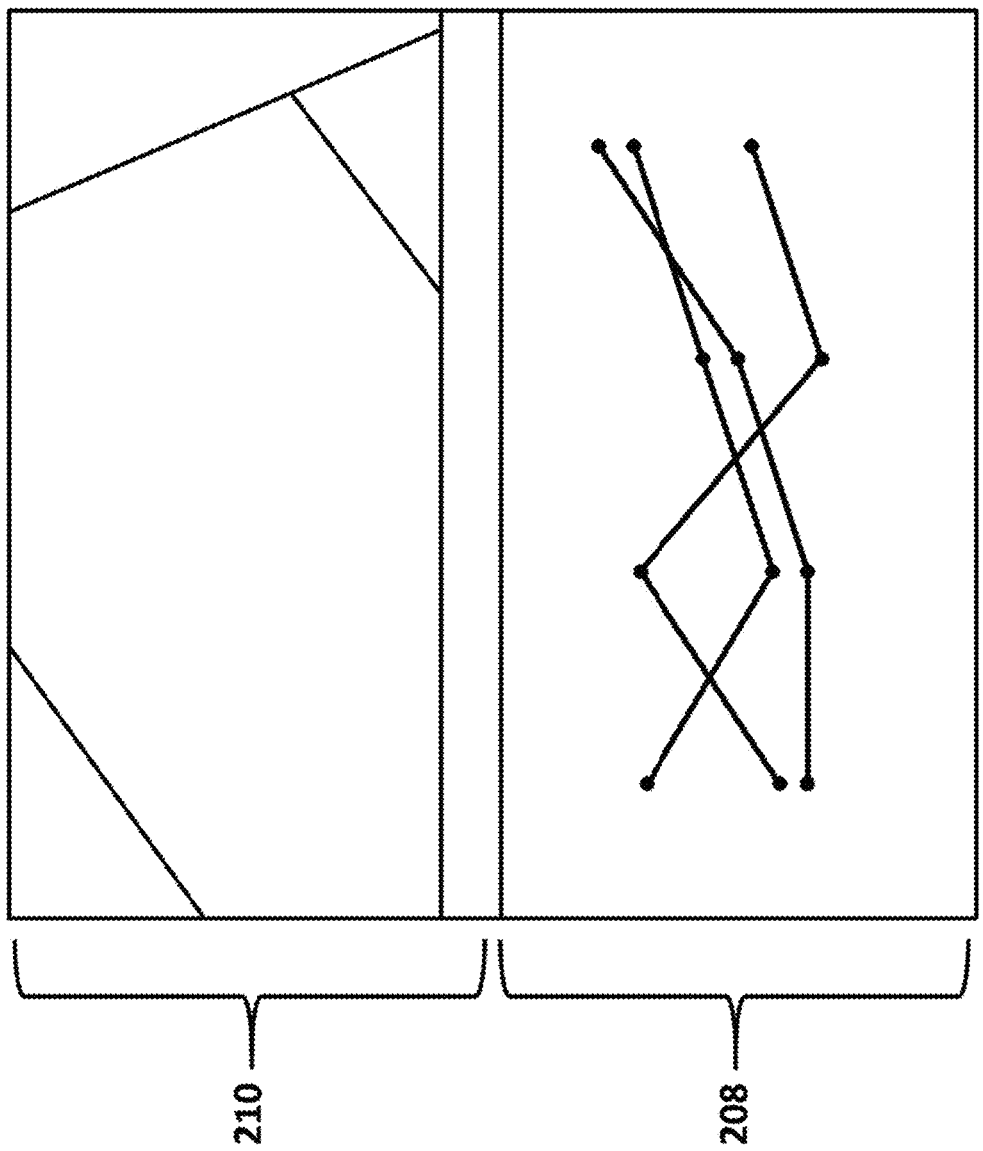

Slide reconfiguration using presentation software. The layers of the multilayer input data can be identified in a few different ways. In one example, a presentation software (such as Powerpoint or Google Slides) can be configured such that a slide is a multiple (corresponding to the number of layers it contains) of its typical size. As described in FIG. 5, the slide is configured to be double its typical size to include the subject layer 208 and background layer 210 on the same slide. One half is used as the background layer 210, and the other half is used as the subject layer 208. Because this is made through the use of the presentation software itself, each half retains all the functionality (such as animations, etc.) available through the presentation software. The subject layer can utilize a specific color to indicate transparency in regions of the layer, and lack of the specific color in regions of the layer indicating opacity or translucence. The opaque or translucent regions indicate subjects (i.e., subject material of interest) in the subject layer. In this example, the graph is shown as the subject material of interest in the subject layer. And the background layer provides aesthetical design elements.

Figure 6:
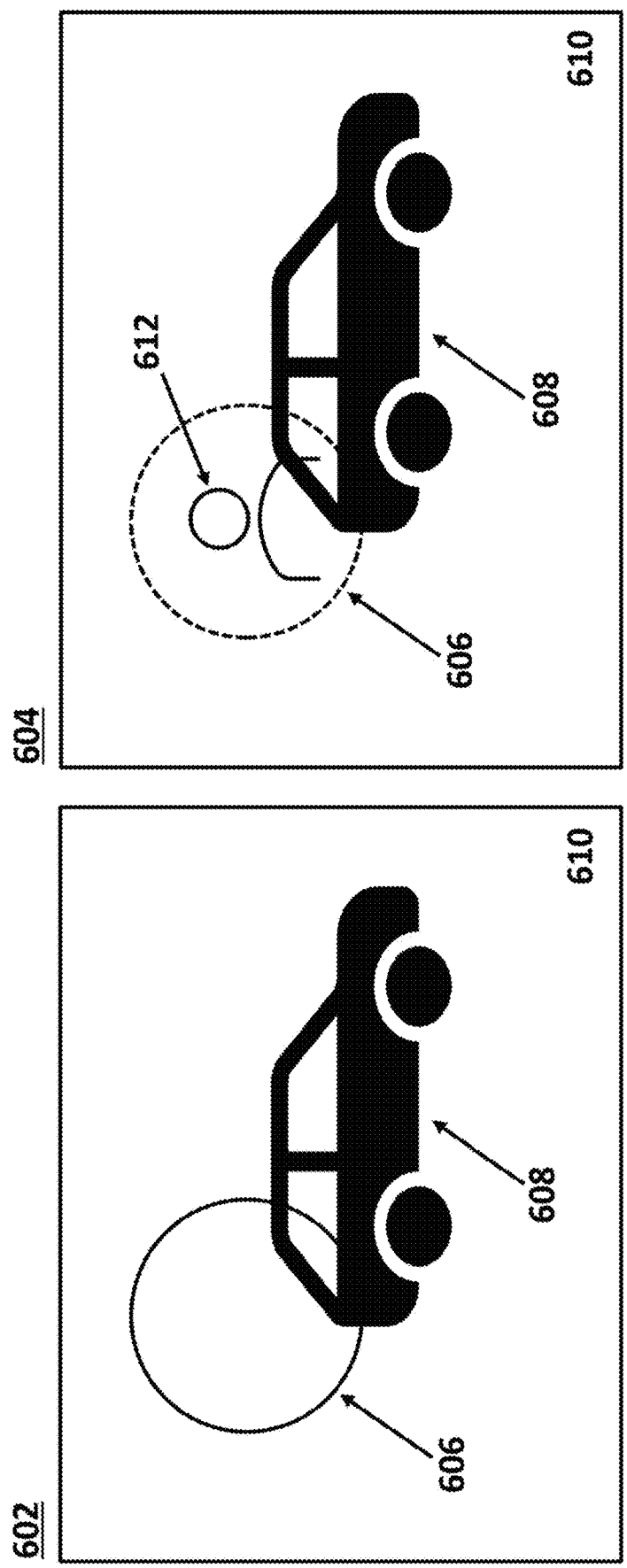

In some examples, using the presentation software, a typical sized slide is used in conjunction with at least one predetermined automatically recognizable placeholder data location that indicates the placement of the actor layer. As shown in FIG. 6, the placeholder data location 606 is inserted into the slide and added in front of any content assigned to the background layer 610 and behind any content assigned to the subject layer 608. The placeholder data location may also be sized and shaped on the slide to indicate the regions of the actor layer to which the actor layer is to be added. Once the placeholder data location 606 is designated within the actor layer, the resulting output video has a multilayer scene including the actor layer 612 positioned within the designated placeholder data location 606. Upon display, the actor layer is displayed in place of the placeholder image. In some examples, the substitution of the actor layer in place of the placeholder image occurs during the positioning or stacking of the layers prior to the rendering of the output video or image. In some examples, the image or a frame of the output video is rendered containing the placeholder image, and upon the system identifying the placeholder image, the visible portions of the placeholder image are then substituted with the corresponding portions of the actor layer 612.

User Interface of Presentation Software. In some examples, a user interface of a presentation software (such as, Powerpoint or Google Slides) is utilized, redesigned or modified to include the actor layer on a scene. The actor layer can be positioned on the slide and positioned in front of or behind the other subjects of the subject layers or other layers using the presentation software options such as "Send backwards", "Send to back", "Bring forwards", and "Bring to front". In some examples, a user interface is implemented to enable a user to manipulate slides already produced using a presentation software (such as, Powerpoint or Google Slides). The user interface displays the subjects or objects on the slide in a way that clarifies which are on which layers of the slide (i.e., which objects are in front of or behind others). The user interface then allows the user to choose where amongst those layers they would like to place the at least one actor layer—i.e., in front of which layer or behind which layer or in between which layers. In some examples, automated layering is used. Automated layering involves using automated means to distinguish the background layer from the subject layer and insert the actor layer in between them.

Artificial intelligence and deep learning techniques can be employed for the system to identify the background layer and the subject layer. In some examples, artificial intelligence or deep learning can be employed for the recognition of the background layer and the subject layer. In some examples, this is accomplished by annotating a training set of data, such as images, videos, slides, screen shares, and the like (i.e., potential composite input data 302) to identify and extract which layers of the data should be in which layer depth position, such as the background layer and the subject layer. A neural net is then trained using the training set to create a classifier. The classifier is then applied to the composite input data to identify scene layers comprising the background layer and the subject layer. The actor layer can then be inserted in between the two layers.

In another example, the system uses the presence or non-presence of a feature to determine which regions of the composite input data are assigned to which layers. For example, with a composite input data of floating balloons against the sky and utilizing a feature classifier trained to identify balloons, the regions of the composite input data with balloons present are assigned to the subject layer while the regions with balloon non-presence (i.e., images of the sky) are assigned to the background layer. Similarly, other feature classifiers with non-binary outputs can be thresholded or otherwise utilized to assign regions of input data (e.g., composite input data and multilayer input data) to a plurality of layers.

An expert systems approach can be employed for the system to identify the background layer and the subject layer. The expert systems approach employs a set of rules for distinguishing the background layer from the subject layer. In some examples, particular types of content may be prioritized to be assigned to the subject layer which is further in front and therefore less likely to be obstructed. By way of an example, text content can be prioritized to be assigned as the subject layer so that it is positioned in front of the actor layer, thereby not obstructed by the actor layer. Other regions of the image can then be assigned to the background layer.

Similarly, multiple scene layers of a multilayer input data can be ranked to determine the order or layer/depth position in the multilayer scene based on the types of the content. For example, a text with certain keywords may be ranked higher than others or be prioritized. A particular type of images, colors, shapes, data type, size or other features may indicate a higher rank or higher priority over others.

In some examples, two different regions from the same layer input data (e.g., a scene, a layer, an image, a video feed, and the like) can be positioned to two different layer positions (i.e., the depth position when the layers are stacked). One of the two different regions can be positioned to the background layer while the other region can be assigned to the subject layer. In some examples, application-specific knowledge is taken into account in assigning some regions of the input data (e.g., a scene, a layer, an image, a video feed, and the like) to the background layer while other regions are assigned to the subject layer. For example, for a spreadsheet application (e.g., Excel or Google Sheets), the system can assign the gridlines to the background layer while the numbers and text in the spreadsheet cells are assigned to the subject layer. Therefore, with the actor layer added in between the background layer and the subject layer, the actor will stand in front of the gridlines but not obstruct the content of the cells themselves. By way of another example, the system may deprioritize a region of the input data specific to menu operation, such as the toolbars at the top of an application window, such that they are assigned to the background layer. This enables the content of interest within the subject layer to be presented without being obstructed by a region that are typically not relevant to the presentation. FIG. 4 shows an example where the graph (i.e., subject content of interest) is overlayed in front of the actor.

The position of the layers (i.e., the depth position within the layers, for example, a subject layer and a background layer) in a scene can be determined based on the location of the content within or on the layer. By way of an example, the content of the data toward the top of the scene is deprioritized and assigned to the background layer while content toward the middle or bottom of the scene is prioritized to be in the subject layer. This enables the actor to be able to stand and present content which is occluding the actor's lower and possibly middle section without the actor's head being obstructed by the content located higher up in the scene.

The system may employ user assisted layering. This involves utilizing the automated layering approaches discussed above to provide a default "suggested" or "recommended" layering order to give the user a starting point from which they can proceed to further alter or customize the layering using a user interface.

The layers of the multilayer scene are positioned and presented in varying degrees of depth, such that the data feed, such as a video stream representing an actor, coexists, is positioned, and/or is displayed on a display unit without obstructing at least some portion or one or more of the layers of the multilayer scene. In some examples, location information such as depth information is extracted from the input data and used to position layers relative to each other. The depth information can be extracted from the input data or the data feed. Once depth information related to the scene has been extracted, portions of the scene are positioned in different layers in accordance to their distance (depth) from the camera. These portions are assigned to one of the layers defined in the scene. Background layers and subject layers are both instances of the layers within the scene. The actor layer can be added in between the layers in the scene (or, likewise, the actor representation can be added at a particular depth within a three-dimensional space) in accordance with the distance of the at least one actor from the camera. As such, the actor can be seen to be moving back and forth among image portions displayed in the various layers of the scene or depths of the three-dimensional space. And the actor can interact with the subjects or content positioned in any of these layers or depths.

In some examples, a depth-sensing imaging unit (including, but not limited to, stereoscopic cameras, multiple cameras used together, 2D cameras complemented with lidar, cameras on mobile phones with depth sensing technology, and the like) is used to extract depth information from a scene captured by the imaging unit. In some examples, the imaging unit is used in conjunction with recognition of depth cues in the scene in order to extract depth information from the scene. Such depth information can be identified from the data feed capturing the actor (e.g., a video stream) and the multilayer (three-dimensional) input data. Different portions or regions of a single scene can be assigned with differing depth level which defines the positioning of the portions or regions within the layers or various depths of the three-dimensional scene.

The system extracts an image of the actor from the video stream or the data feed using various techniques including, but not limited to, use of chroma key green screen, virtual green screen technology, skeletal/human pose recognition/estimation, neural networks trained to isolate the actor within the image.

As an illustrative example of embodiments utilizing neural networks, the neural network is trained using a training set of images containing annotated human (i.e. actor) faces and body parts. Once trained, the neural network is used as a classifier by which it can tag, in a binary matter, which regions of the image are most likely part of a human face or body parts. The identified regions are considered the image of the actor which can be extracted from the video stream or the data feed capturing the actor on a frame by frame basis.

The system described herein additionally employs scaling of the input and defining layering order. In some examples, more than one actor is displayed in the same scene with a shared space. The space can be a virtual space (such as virtual dance floor) or an actual physical space such as one of the actor's living room that is captured by the imaging unit. By way of an example, when displaying more than one actors in the shared space, scaling and normalization of the image capturing the actors provides proportioning of the actors' image size captured in the video stream or the data feed such that they are similar in size on the display. This can be done by applying feature recognition on the actors and normalizing the scale. Where the shared space is the actual physical space of an actor, that actor can be used as a reference for scaling and normalization of another actor presented on the display such that the two actors are sized proportionately to the same scale.

As described above, in some embodiments, depth information is extracted from the data feed and used to place layers relative to each other according to their distance (depth) from the camera. In some examples, when combining more than one actor into a shared space, the distance between the imaging unit (e.g., a camera) of the actor can be used to modulate the scale of that actor when added into a local space of another actor. More specifically, the actor is made larger when coming closer to the camera and made smaller when moving further from the camera. Furthermore, the depth or layer position of the actor can be determined based on a dynamic distance between the imaging unit and the actor. As the actor moves closer to the camera, the depth position of the layer capturing that actor can be assigned toward the front of the layers in a multilayer scene (or, said another way, the actor representation can be added more forward in a three-dimensional space or scene). Similarly, as the actor moves further away from the camera, the depth or layer position of the layer capturing that actor can be assigned further behind among the layers in a multilayer scene (or, said another way, the actor representation can be added further back in a three-dimensional space or scene).

More examples of modulating size and dynamic positioning of layers are presented below. In some examples, characteristics (such as size, shape, sharpness, brightness, orientation, presence/non-presence, or other characteristics) of features identified on objects (including actors or objects on other non-actor layers) by means such as feature recognition are used as depth cues enabling such dynamic positioning. In some examples, the relative sizes of the actors (as determined by comparing the size of features identified on the actors) are used as such depth cues. In one example, when actor A is standing closer to the camera capturing actor A than actor B is standing to the camera capturing actor B, actor A is displayed proportionally larger in size and be added in a depth/layer that is more forward in comparison to actor B's displayed size and depth/layer position on the display (e.g., the output video). In another example, when actor A is standing further from the camera capturing actor A than actor B is standing to the camera capturing actor B, actor A is displayed proportionally smaller and be added in a depth/layer that is further away from the front in comparison to actor B's displayed size and layer position on the display (e.g., the output video). In some examples, such functionality will allow two or more actors to take a virtual (i.e., the two or more actors are not present in the same physical space) selfie or a photo together where the first actor can step further away from the camera allowing that actor to extend the arm across the back of the second actor such that the second actor occludes most of the arm except for the hand which reappears extended just past the second actor's shoulder.

Figure 7:
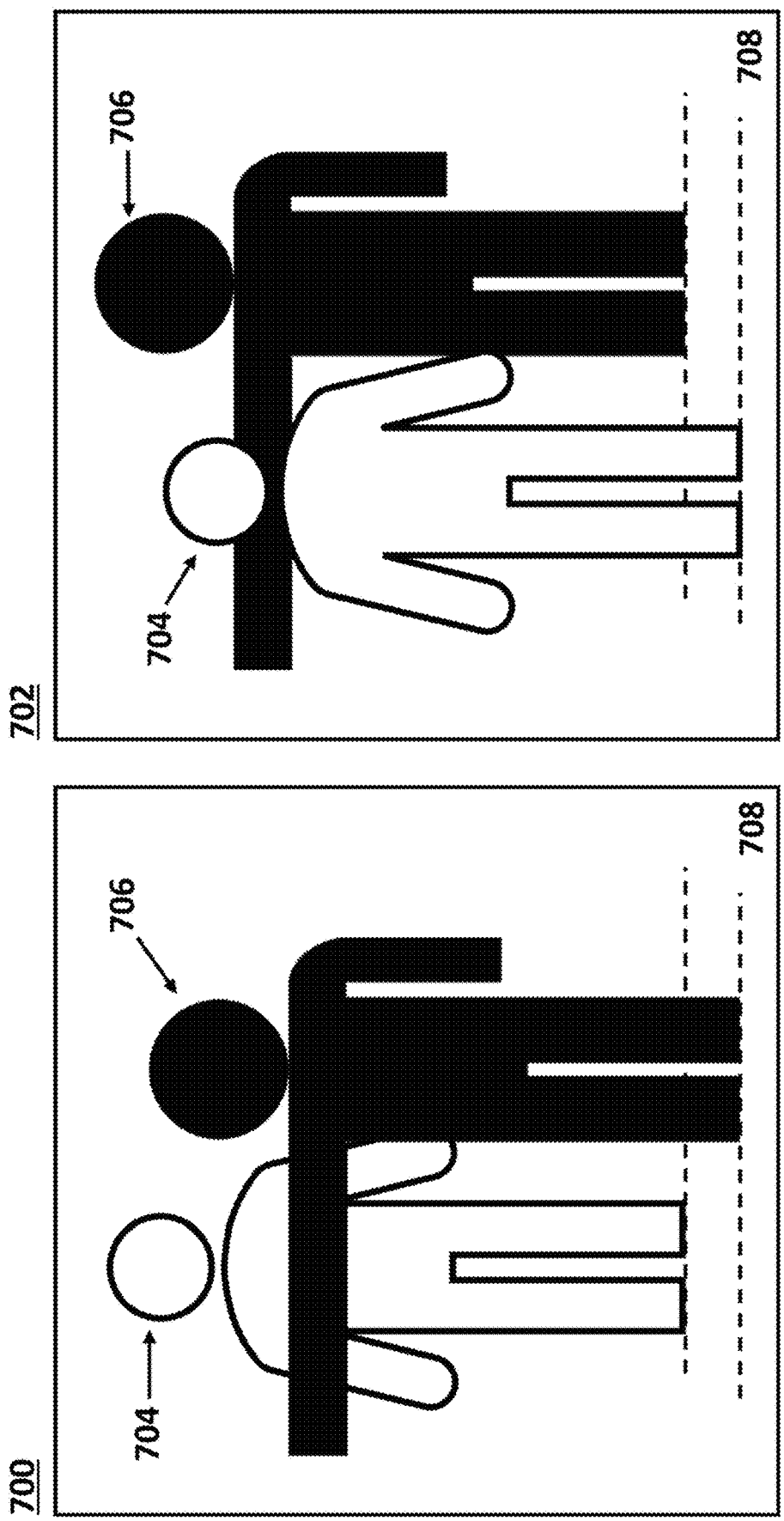

FIG. 7 illustrates an example depth-based layering/positioning for engagement between two or more actors. The background layer 708 is identified and positioned the furthest to the back of the layers. The first actor is extracted from the first data feed or the first video stream and identified by the system. The second actor is extracted from the second data feed of the second video stream and identified by the system. Based on each of the distance between the actors and the cameras (e.g., imaging units) the depth/layer positions between the first actor layer/representation and the second actor layer/representation are determined. The scene 700 shows the first actor layer/representation 706 being added ahead of the second actor layer/representation 704. In this case, the distance between the first actor 706 and the camera recording the first actor is less than the distance between the second actor 704 and the camera recording the second actor 704. The output video 702 shows the first actor layer 706 being added behind the second actor layer 704. In this case, the distance between the first actor 706 and the camera recording the first actor is greater than the distance between the second actor 704 and the camera recording the second actor. Thus, a part of the first actor's arm is occluded by the second actor in this scene 702. In another example, the depth-based layering/positioning for engagement between two or more actors can identify the distance each of the actors travel from their initial position to the next position. In other words, the depth-based layering/positioning can be based on the camera recording the traveled distance by each of the actors instead of the distances between the actor and their corresponding cameras.

As an alternative to automated dynamic ordering of the layers, a manual user interface may be used as well. In some examples, by use of a trigger (including, but not limited to, a remote control, voice or speech trigger, gesture, or key press), an actor can move their own layer forward or backward to alter the positioning of the layers within the scene. As an example, this approach would solve the selfie or photo layering problem described earlier without having to move closer or further from the camera.

Just as size or scale can be modified, so too can the lateral position of the actor within the output video. In some examples, the lateral position of the actor within its actor layer is controlled simply by identifying the location of the actor within the actor's own local space. As an actor moves sideward (e.g., left or right) within the actor's own local space in front of their own camera, so too will the actor within the actor layer presented in the output video. Alternatively, the position of the actor within its layer is not a direct representation of the actor's location within the actor's own local space.

In some examples, the position of the actor within its actor layer of the multilayer scene is fixed in place. While the actual actor portrayed by the display unit is in motion, the actor's position within the layer is fixed in position within the output. For example, the actor captured in the actor layer of the multilayer scene in FIG. 6 may move around the field of view of his camera, the images of his face in each video frame are extracted using basic face tracking methods and positioned in the fixed position on the output video.

Figure 8:
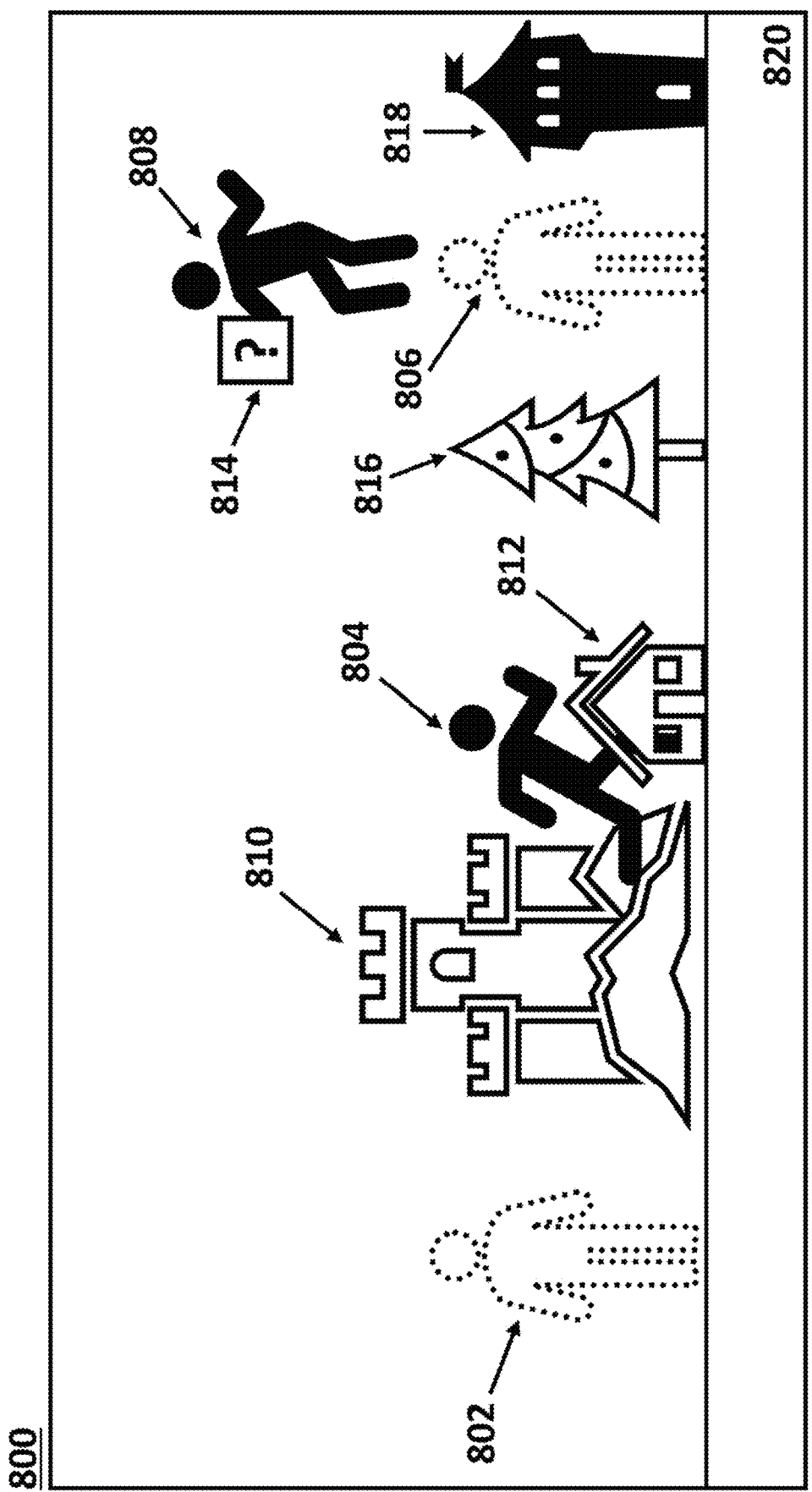

In some examples, changes in the lateral or vertical positioning of the actor within its actor layer are triggered by recognition of gestures performed or exercised by the actor. The gesture performed by the actor (i.e., a user or a person captured by a camera) is captured by the imaging unit. By way of an example, such gesture recognition includes the system recognizing a mock running pose of the actor which, in turn, triggers the position of the actor within its actor layer to change. In other words, the gesture performed or exercised by the actor, which is captured by the imaging unit, is identified by the system. In turn, the lateral or vertical position of the actor depicted within its actor layer (i.e., a graphical representation of the actor recorded by a camera) changes. FIG. 8 illustrates another example of gesture induced action (e.g., a motion, a movement, or a change, in the visually representation). In FIG. 8, this feature of the present disclosure is provided in an application of a video gaming environment where the actor's image or video is portrayed, using the imaging unit, while the actor is playing a video game. In this scene 800, the running gesture of the actor captured by the imaging system is recognized by the system which enables the position of the actor within its actor layer to run, as demonstrated by the initial position of the actor 802 and the gesture induced action showing the actor depicted in this scene 800 running 804. The scene 800 shows the actor's position within its actor layer prior to the system recognizing the running gesture, at 802, and after, at 804. A subject of the subject layer (e.g., a house 812) is shown occluding the actor image due to the subject layer being positioned in front of the actor layer and a subject of the background layer (e.g., a castle 801, a tree 816, a tower 818) is shown behind the actor layer. Similarly, a mock jumping gesture by the actor, being recorded by the imaging unit, can cause the position of the virtual actor within its actor layer to vertically jump on the screen at 808 from position 806, even when the physical actor in its physical space (i.e., non-virtual/real space) may not have actually left the ground. Again, a subject (e.g., a question mark box 814) is shown in a layer on top of the actor layer, thus occluding the jumping virtual actor represented in the actor layer. Scene 808 also depicts how the system can be utilized to have more than two actors represented in a multilayer scene on the same layer's depth position within the scene. Two actors 808 804 are represented in this scene 800. In this scene 800, the question mark box 814 can be an interactive object, the detail of which is provided below.

Figure 9:
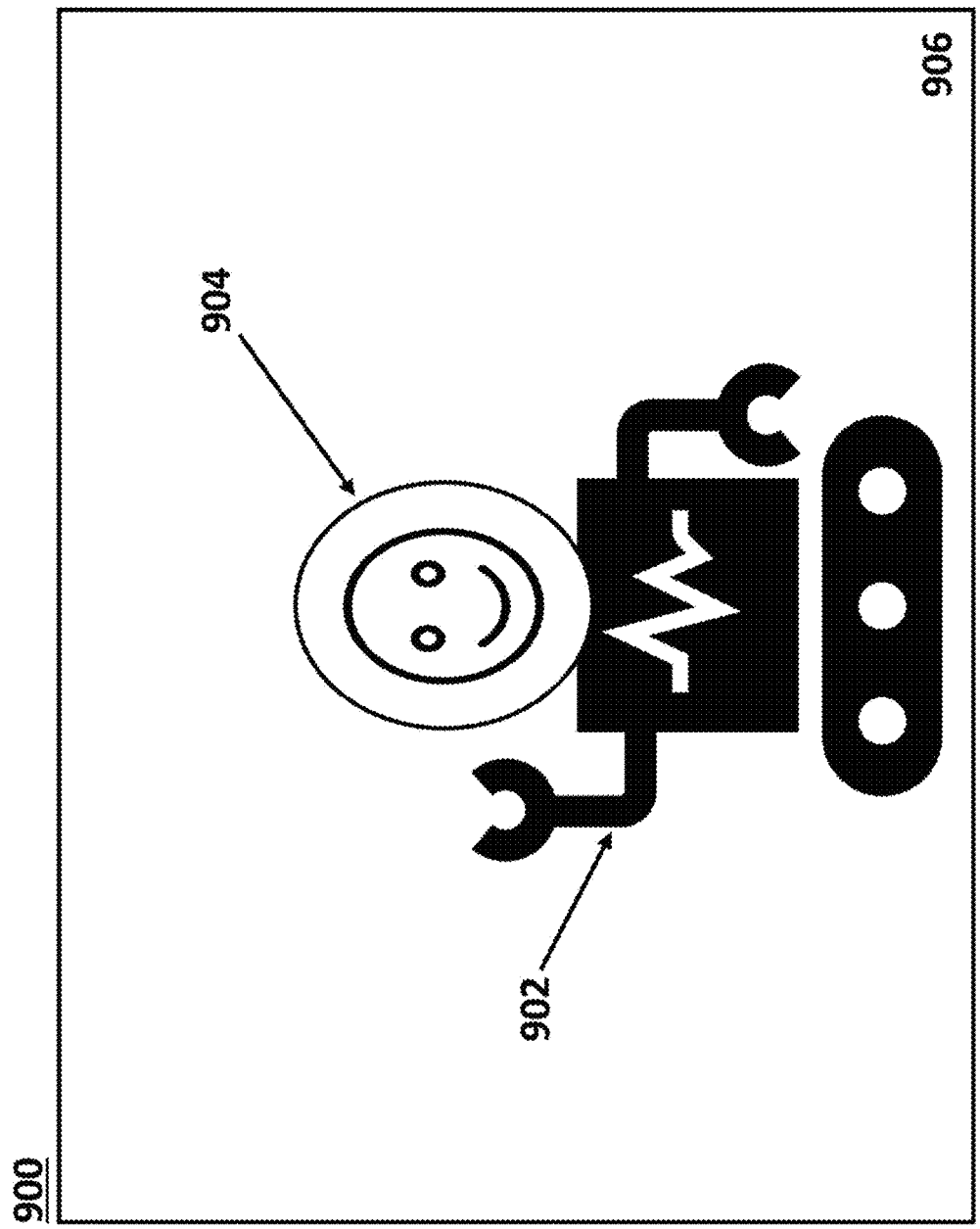

In some examples, a partial actor image (such as the face, head, or bust) may be extracted from the actor to be portrayed as the actor in the actor layer. Non-limiting example of such feature includes, as shown in scene 604 of FIG. 6, displaying the actor's bust extracted from the video feed in a fixed position within the actor layer during a presentation. As shown in FIG. 6, as the actor moves around the field of view of his camera, the images of his face in each video frame are extracted using basic face tracking methods and positioned in the fixed position on the multilayer scene of a presentation. In another example, as shown in FIG. 9, the actor's face 904 extracted from the video stream is affixed to a virtual character or an avatar 902 added on the actor layer. This scene 900 comprise a background layer 906, a subject layer (showing the avatar 902), and the actor layer (showing the actor 904). Such virtual character may be controlled by the actor in a video game setting employing the gesture and motion recognition techniques, inter alia, described herein. The image of the actor's face in each video frame are extracted using basic face tracking methods and positioned in place of the face of an avatar. It is to be understood that while a partial actor image is separately discussed herein, an image or graphical representation of the actor is not limited to capturing the entire actor with the imaging unit but includes any portions of the actor's body captured by the imaging unit.

The present disclosure provides a feature in which the system enables the actor to be interacting with a subject (also herein referred to as an object, e.g., a graphical object contained in the subject layer) viewable using the display unit. Such an object can be interacted by the actor via the actor within the actor layer. The physical actor can enable such interaction using gesture recognition and motion recognition features of the system. Interaction, as described herein, refers to the actor image displayed in the multilayer scene to be making contact with (also referred to as having a "collision" with), controlling, or otherwise causing the object to be triggered by the actor image's presence, gesture, or motion around or about the object image displayed in the scene.

Objects can be located in any scene layers of the multilayer scene (i.e., background layer, subject layer, or actor layer). Some objects can be interacted with by the at least one actor. These are referred to as interactive objects. An interactive object is a virtual object depicted in a scene within at least one of the multiple layers that composes the multilayer scene. An interactive object, as described herein, is a virtual object placed or created in a scene that is independent (i.e., is separable from the actor) from the actor and with which interaction triggers some action such as a visual state change. In terms of interaction among the subject, object, or actors portrayed in the layers of a scene, the interactive objects include a whole or at least a portion of the actor images themselves. For example, when there are virtual interactions between the two actors in a scene, such interactions are established using a similar manner where the third-party actor(s) (i.e., the other actor(s) to the one actor) is treated as an object.

Figure 10:
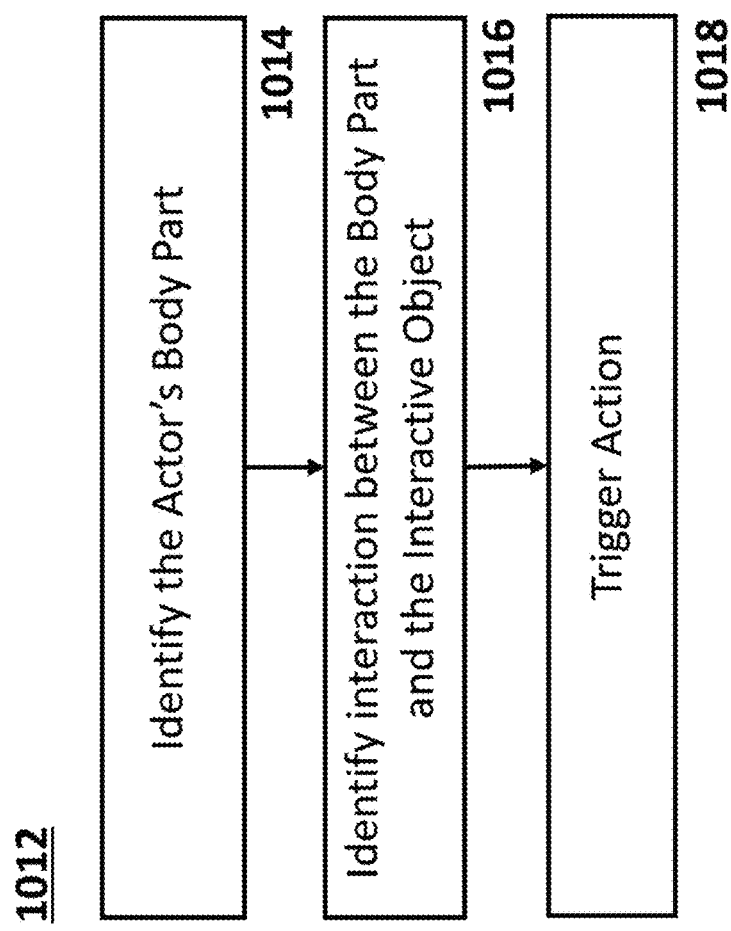
FIGS. 10 and 11 illustrate example implementations of the actor interacting with an interactive object, according to the system and method of the present disclosure.
Figure 10:
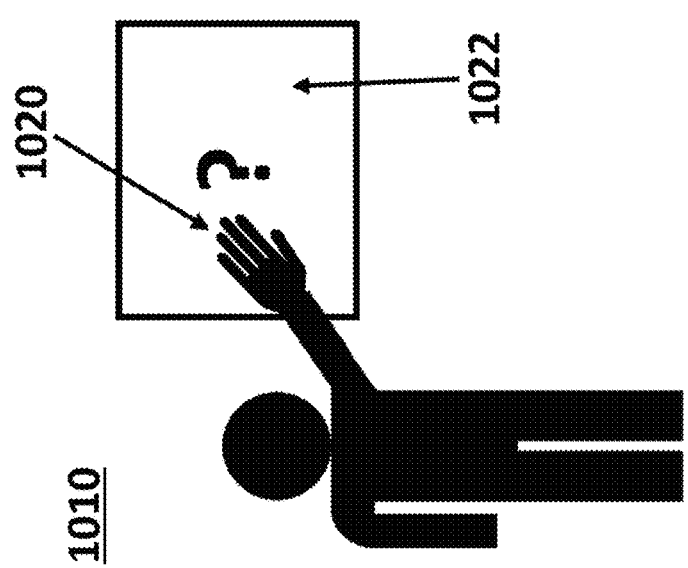

In some examples, recognition of the movements or motions of the actor is used to cause interaction with the interactive object. The recognition of the motion or movement of the actor can be done using video recognition approaches, such as You Only Look Once (YOLO), a real-time object detection method, human pose estimation (including based on skeletal-based, contour-based, and/or volume-based models), and the like. Similarly, the actor's body part (hand, foot, head, etc.) can be tracked by object recognition approaches such as YOLO, human pose estimation (including based on skeletal-based, contour-based, and/or volume-based models), etc. As shown in FIG. 10, when the location of an actor's body part 1020 in the scene 1010 overlaps or makes contact with the interactive object 1022, an action is triggered. An action in this context refers to certain visible or audible changes within the scene displayed in the display unit. The triggered action may be a display of certain animation, providing a certain sound, and the like. In some examples, the interaction causes such action to take place where a change in the visual state of the interactive object (and/or the actor image itself) is observed from the scene. Examples of such changes include certain prescribed animation, movement, change in color, deformation, change in state, and the like. The process 1012 demonstrates the process of actor interaction-caused action. At step 1014, the system identifies a certain actor's body part that is assigned to be in interaction with the interactive object. Once the actor's body part 1020 (in this example, a hand), within the output video or a scene therefrom, interacts with the interactive object 1022 by making contact with the interactive object 1020 (i.e., the actor's body part 1020 is overlapping, at least partially, with the interactive object 1022), the interaction between the body part and the interactive object 1022 is identified at step 1016. In response to which, an action is triggered by the system at 1018. In some examples, an interaction between the actor and the interactive object can be presented, using the display unit, with the video or the image of the physical actor (e.g., the actual game player sensed by the imaging unit) being presented within the composite video output. Such graphical representation of the actor enhances the user's experience of this feature, for example in a video game setting. Gesture-induced action of FIG. 8 also is a type of triggered action. As described in FIG. 8, gesture changes (in this example, a pose change) of the actor 802 from a standing pose to a running gesture by the actor resulted in the actor on the scene to cause an action of the actor in the scene to run 804. The imaging unit 102 captures the actor, the game player, making a gesture. The data acquisition unit 104 then acquires such information, in response to which the control unit 108 causes the actor within the scene to take the corresponding action. In the examples demonstrated in FIG. 8, an interactive object is not taking part in the gesture-induced action.

Figure 11:
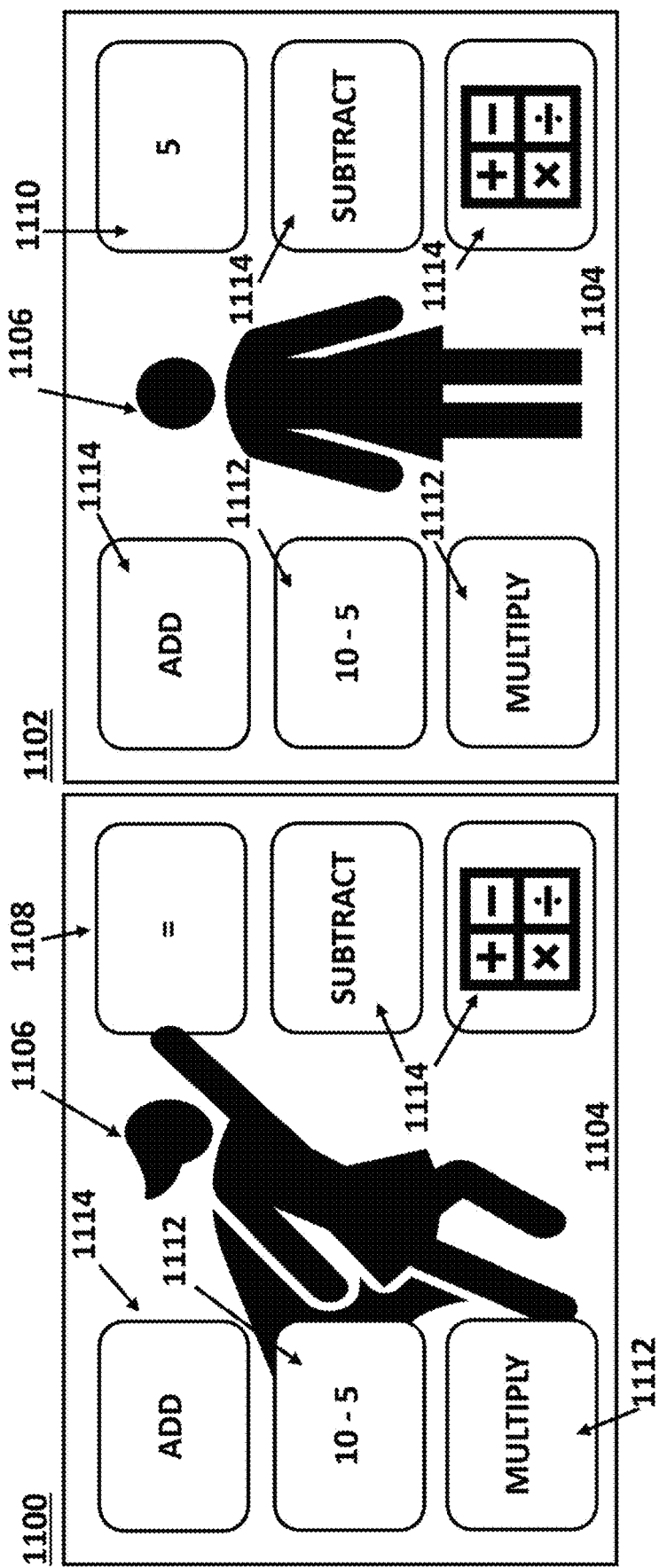

In some examples, such interaction feature can be used by the actor to trigger an animation in a presentation slide from software such as Powerpoint or Google Slides. In some examples, a student (i.e., the actor) in a virtual classroom (i.e., the scene) can virtually touch a virtual flashcard (i.e., the interactive object) to cause it to flip over (i.e., the triggered or caused action). In some examples, the action is a change in some other state, such as the increasing of a score in a video game. Obviously, many different types of objects and actions may be combined. An exemplary interaction is demonstrated in FIG. 11. In the scene 1100, a multilayer scene, captured in FIG. 11, the actor 1106 is interacting with an interactive object 1108 within the scene. The actor 1106 is added on the actor layer between the subject layer and the background layer 1104 in this multilayer scene 1100. In scene 1100, the actor 1106 can interact with the interactive objects of the subject layer and the background layer, such as 1108 1114 1112. In this scene 1100, the interactive objects (or also referred to as subjects of the subject layer) 1112 are positioned (i.e., position of depth with respect to the stacked layers in a scene) in the subject layer, while the interactive objects 1108 and 1114 are positioned in the background layer, where all objects in this scene are interactable by the actor. In one example, the interaction can be an action, such as pointing a finger at the interactive object, thus triggering an action. This is an example of gesture-based interaction where the body part of the actor (the finger in this example) is identified to have certain gesture detected. Such gesture is detected by the system using the imaging unit. Alternatively, similar to the example implementation demonstrated in FIG. 10, the actor's body part making contact with (and therefore interaction with) or overlapping with the interactive object 1108 can trigger an action to be taken by the interactive object 1108. This is an example of contact-based interaction. Other example includes proximity-based interaction where the actor getting closer to the interactive object above a certain threshold distance causes the action to be demonstrated by the interactive object. At scene 1102, an action is triggered. In this example, a calculating function is triggered, and graphical presentation of the calculated result is the action. A change in the visual state of the interactive object is observed from 1108 to 1110 in the scene. As shown in FIG. 11, the system and method of the present disclosure can be applied in an educational setting to enhance the student's learning ability by adding an interactive element to the learning process.

By way of an example, the actor can make a swiping motion with their hand from left to right to advance the scene to the next scene in a presentation or right to left to change the scene to the previous slide. Likewise, in another example, the actor can form a gesture with their hand mimicking the holding of a writing instrument. The recognition of this gesture then triggers drawing onto virtual space of the slide in the scene as if the actor were holding a virtual writing instrument. In a gaming example, the actor's gestures may be recognized and used to trigger actions such as running, jumping, throwing a virtual basketball, swinging a virtual golf club, or casting a magic spell, stepping on an interactive object, kicking, pulling, punching, and the like. These and other application of the presently disclosed system and method can be realized to enhance a user's experience of the intended purpose of the video-enabled interactive exercise.

In some examples, more than one actor may be involved. One actor may be able to interact with another actor; two or more actors may be able to collaboratively interact with an interactive object; and two or more actors may be able to each interact with various interactive objects. For example, in one embodiment (such as a video game), the hand of a first actor may be used to virtually hit a second actor. In this interaction, the first actor's gesture of 'hitting' is an interaction with the second actor where the second actor is treated as an interactive object. Upon the first actor making virtual contact with the second actor, an action is triggered such as the moving, deforming, or changing the color, of the interactive object (i.e., a change in the visual state) which is the second actor. For example, a gesture that can be used to interact with interactive objects includes punching, kicking, karate-chopping, pressing, tapping, grasping, twisting, stomping, jumping, lunging, pulling, pushing, lifting, dropping, throwing, eating, drinking, and the like.

Just as actors can interact with each other, so too can an object controlled by an actor interact with other objects (including other actors). By way of an example, the actor holds a toy sword (or toy light saber) which can interact with interactive objects on the output video. In some examples, the actor holds a virtual weapon (accomplished through application of gesture recognition and augmented reality approaches) which can interact with the interactive object, including other actors or other actor's swords (whether the sword is virtual or physical, and whether the actor is physically located in the same space or remote location). Non-limiting examples of actor-controlled objects include virtual weapons, such as hand-to-hand combat weapons, swords and light sabers and projectile weapons such as guns and snowballs. In an education or business application, such actor-controlled objects include a writing instrument (with visually recognizable features on one or both ends for enhanced tracking), a pointing device, and the like.

In some examples, the actor uses an item such as a remote-control device to trigger an action in the scene. Such remote-control devices include, but are not limited to, remote slide advancers, video gaming controllers, toy light sabers, toy guns, etc. In some examples, the actor uses speech or sound to trigger an action in the scene. Specifically, the actor can say "next slide" to trigger the action of changing the scene or triggering an action from one slide to the next in a presentation and, similarly, "previous slide" to trigger the action of changing the scene from one slide to the previous slide in a presentation.

Figure 12A:
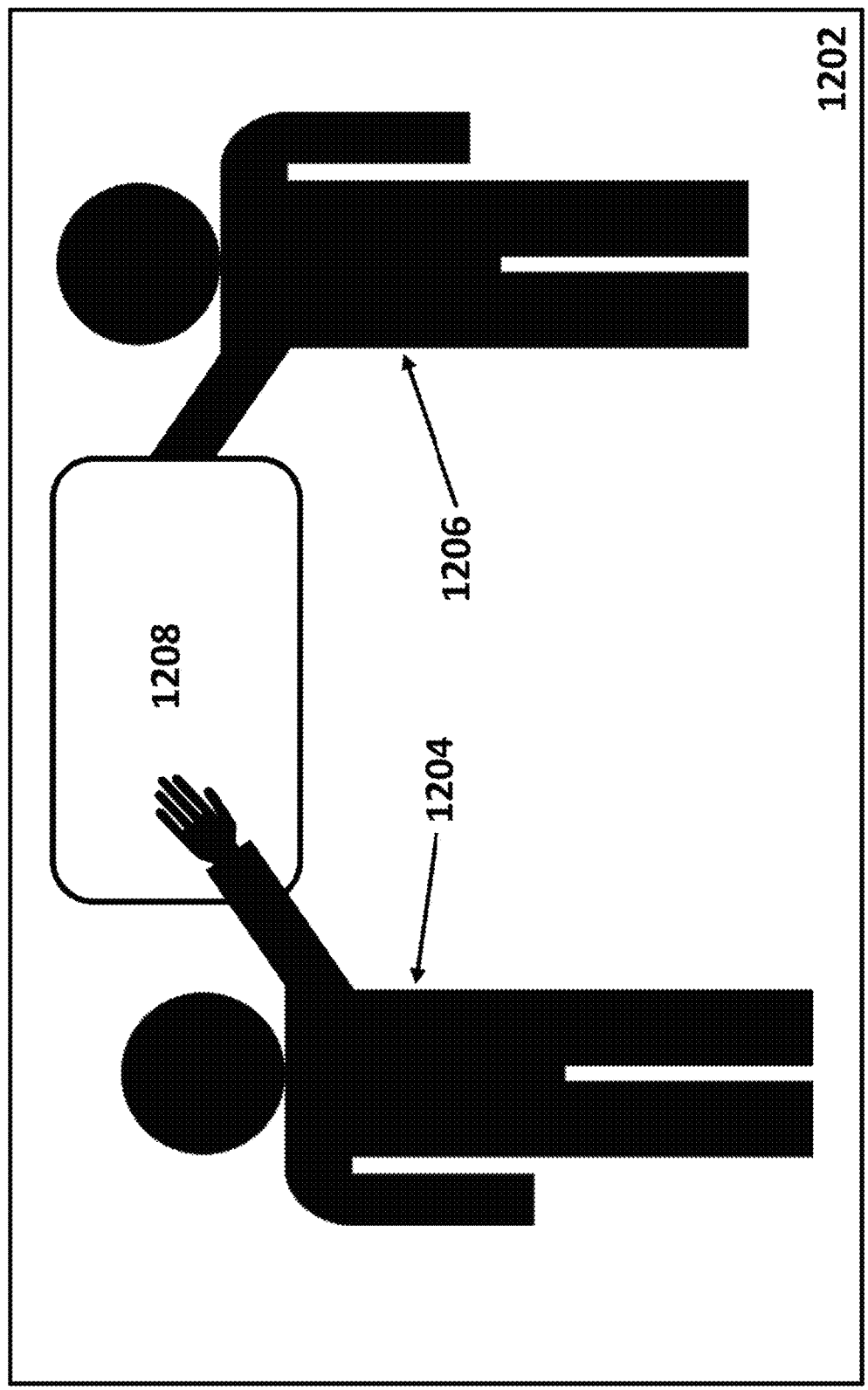
FIG. 12A and FIG. 12B illustrate an example implementation of multiple actors interacting with an interactive object, according to the system and method of the present disclosure.

As illustrated in FIG. 12A, two or more actors may interact with the same interactive object in a virtual space. In this scene of FIG. 12A, the two actors, the first actor 1204 and the second actor 1206 are visualized ahead of the background layer 1202. The scene in FIG. 12A presents a virtual interaction between the two actors 1204 1206 displayed in the output video or visualized in this multilayer scene. The interactions, in this example, are shown as both actors 1204 1206 making contact with or overlapping with the interactive object 1208. The action to be triggered by such an interaction is only triggered when the interaction is completed simultaneously by the two actors or completed by both of the actors 1204 1206. In this example, the layers of the multilayer scene include the background layer 1202 positioned behind all other layers, the second actor layer in front of the background layer, the interactive object layer positioned in front of the second actor layer, then the first actor layer positioned in front of the interactive object layer. As demonstrated, FIG. 12A illustrates total of four different layers in display including two actor layers.

In some examples, a plurality of actors can be included in the same actor layer. In some examples, a single actor layer can depict a plurality of actors when more than one actors are physically in the same space in front of the same imaging unit. Upon isolating their actor images, they are included in the same actor layer. In other examples, a single actor layer can depict a plurality of actors when the plurality of actors are physically apart in front of different imaging units. Upon isolating their actor images, the actor images are inserted into the same actor layer.

Figure 12B:
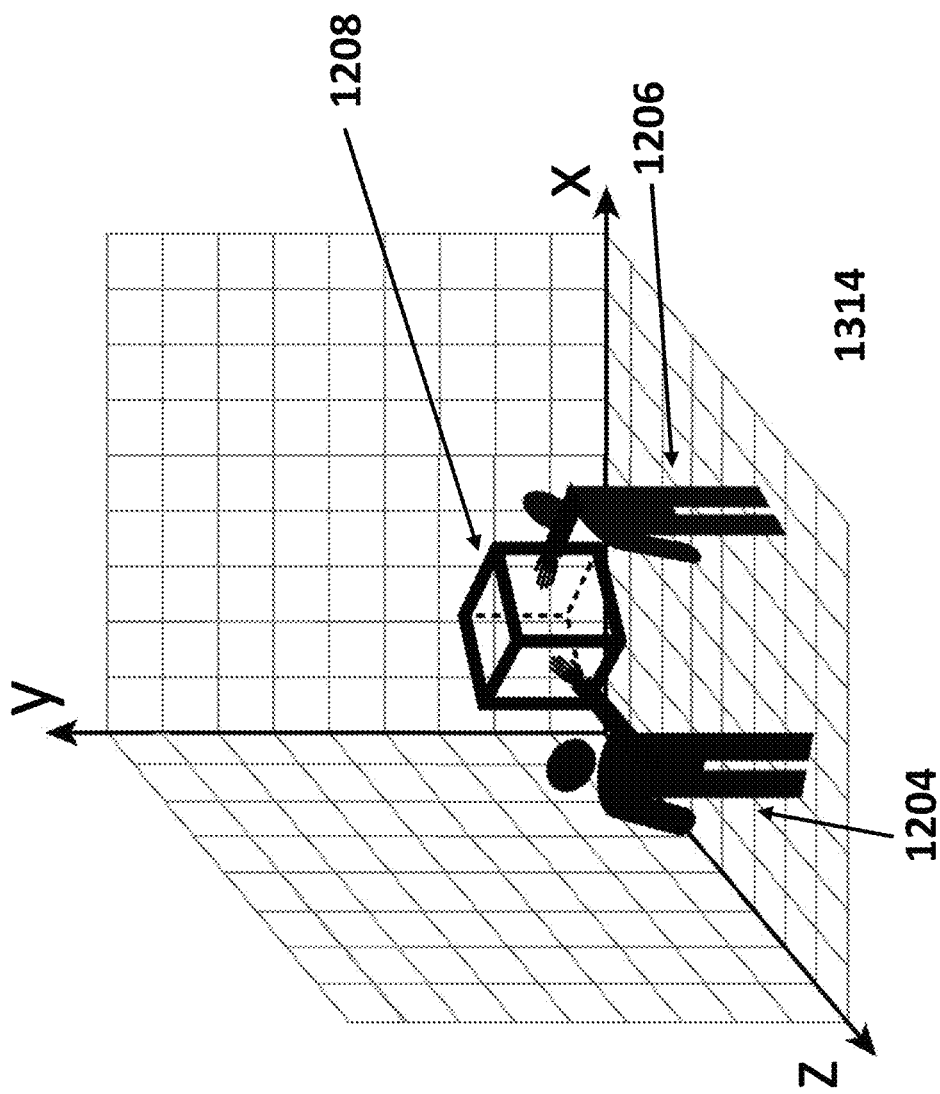

FIG. 12B is another visualization of the concept of the interactive object 1208. In this embodiment, the interactive object 1208 is placed in a three-dimensional scene 1314 and the multiple actors/user representations 1204 1206 are interacting with the interactive object 1208. The multiple users 1204 1206 are caused to interact with the interactive object 1208 by the actual users captured by the corresponding imaging units of the system.

Body Cutoffs & Extrapolation

Given the distance of the camera from the user/actor, it may happen that parts of the body of the user may extend beyond the boundaries of the camera view. For these cases, the "missing" or "cut off" body parts of the user will be artificially added into the representation of the user/actor included in the actor layer and/or virtual world.

Likewise, there are other cases where it may be desired to reflect only a portion of the physical user (as seen in the camera view) to the user's virtual representation while artificially "fill in" or "faking" the balance of the user's virtual representation.

For example, the user/actor may choose to operate the system while in one physical posture (such as a relaxed position like sitting or lying down), while the user's virtual representation may be desired to be in a different posture (such as standing, walking or running). In such a case, portions of the user's virtual representation (for example, upper body) may more directly reflect the user's physical body image and movements, while the other portions of the actor's virtual representation (for example, lower body) may be artificially represented in a state not reflecting the analogous portions of the actor's physical body.

Both the "body cut off" case as well as the "relaxed position" case as well other cases, may represent portions of the body differently than what appears in the camera image.

In one example, a body part (including but not limited to hand, head, legs, feet) of the user may extend beyond the boundary of the camera view. The system detects that when at least a portion of the body (including, but not limited to hand, head, legs, feet, entire lower body, etc.) is extending beyond the boundary of the camera view. One way in which to determine this includes determining that the body's shape or silhouette (as determined by human body segmentation) is making contact with the boundary of the camera image.

In one embodiment, an image of the user, the whole user or its individual body parts/portions, is stored in a memory. In some embodiments, an image of the user is captured as part of a body image capture process (such as the user being required to stand before the camera in a "T-pose" and possibly rotate) to capture at least a portion of their body with a camera. In other embodiments, the image of the user body is captured seamlessly during the process of the user using the system without need of an exclusive capture process.

Based on the captured image, the system creates and stores a representation of the body such that at least a portion of a representation may be utilized by the system as needed.

Figure 14:
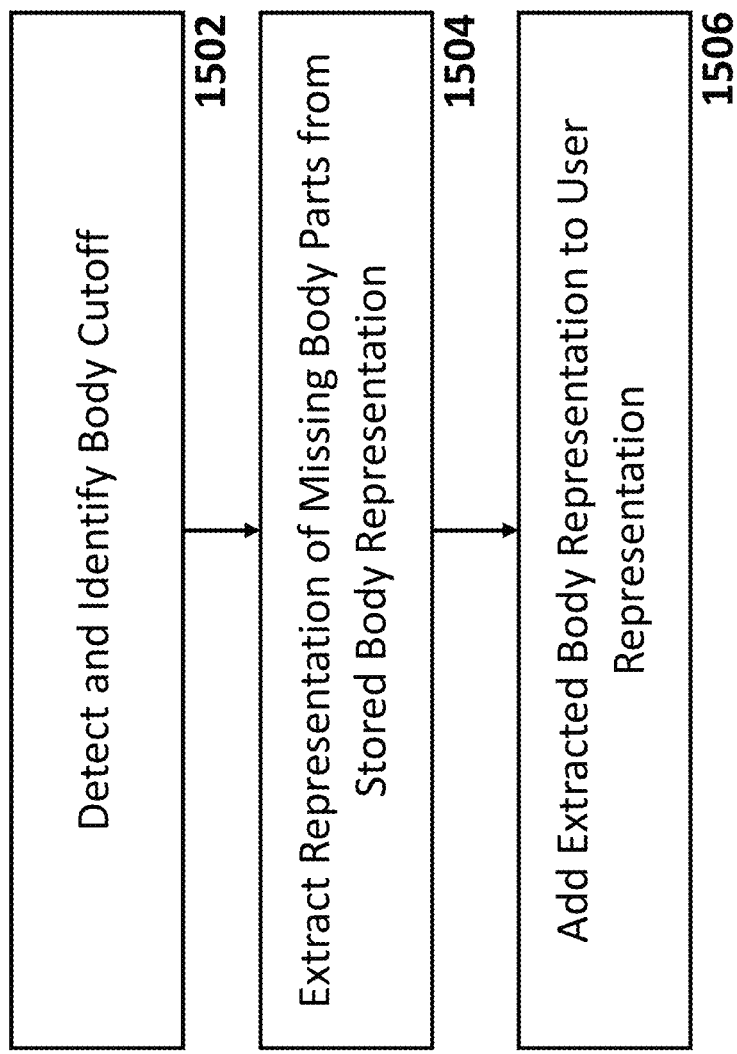
Figure 15:
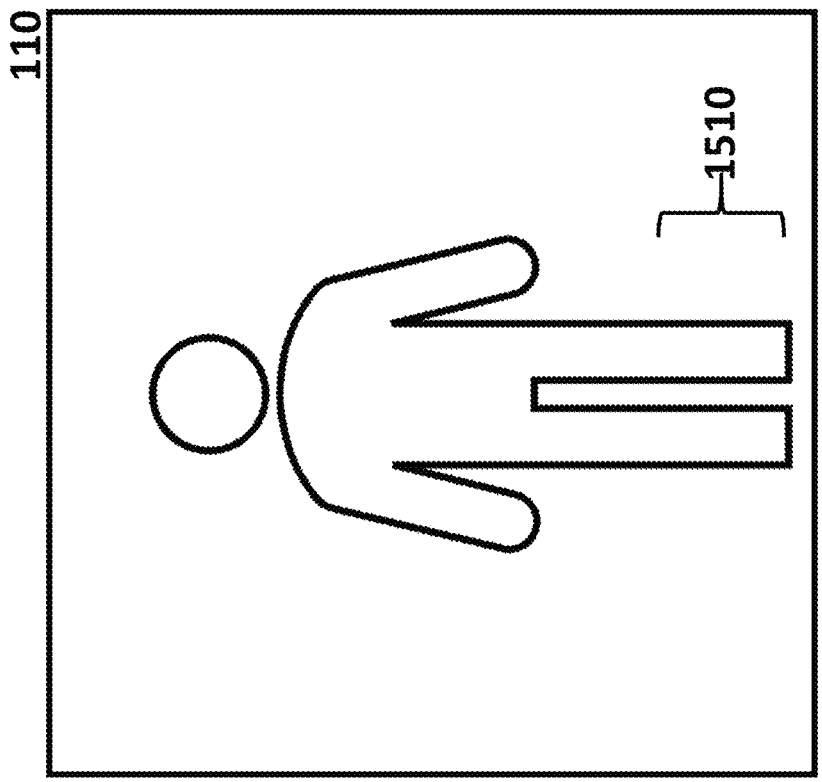
Figure 15:
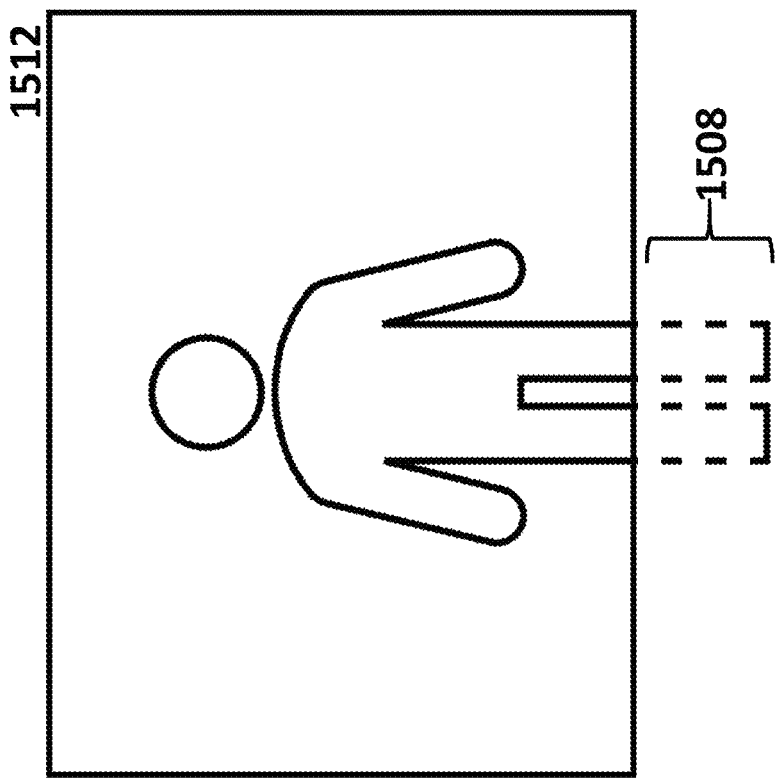

As shown in FIGS. 14 and 15, the system, in step 1502, detects or determines the occurrence of body cutoff and which body part is missing from the camera view 1512. The system in step 1504 then extracts a representation of the missing body part 1508 from a stored body representation as described above. In step 1506, the extracted representation of the missing body part 1508 is added or augmented to the representation of the user so that the user representation is shown as whole with the augmented body part 1510 and displayed on a display unit 110.

One illustrative example of how the above described system would be utilized is the following: In one embodiment, the user/actor may utilize the system using a selfie-camera of a mobile phone. Especially in a landscape or horizontal orientation, the user/actor may feel they have to stand so far back from the phone in order to see their full body that they will not be able to see themselves well enough on the relatively small screen of the mobile phone. Instead, in such a case, the user may temporarily step back far enough from the phone such that the system can capture and learn what the user's full body looks like. Then, the user moves closer to phone (and can even choose to sit or lie down) such that the camera can see their upper body but not their complete lower body. By utilizing the pre-stored images and representation of the user/actor's full body, the system is able to produces a full-body representation of the user/actor for the actor layer and/or virtual world. The image then shown on the screen can then shows the full body representation of the user. Likewise, any other users seeing a representation of the virtual world will see the full body representation of the user.

As explained above and reiterated below, the present disclosure includes, without limitation, the following example implementations.

Clause 1. A computer-implemented method for controlling a virtual representation of a user in a three-dimensional scene, the method comprising: receiving a two-dimensional video stream data of a user, using an imaging unit, wherein the two-dimensional video stream data captures the user at least partially; receiving a three-dimensional scene, wherein the three-dimensional scene includes data associated with at least one virtual object and its location within the three-dimensional scene; isolating a user representation of the user from the two-dimensional video stream data; identifying a location information of the user from the two-dimensional video stream, wherein the location information is identified based on the user's relative location to the imaging unit; adding the user representation to the three-dimensional scene by modifying data associated with a voxel comprising the three-dimensional scene, using the location information; and displaying the three-dimensional scene and the added user representation on a display unit, wherein the added user representation displayed on the display unit is controlled based on detecting changes to at least one of the user and the location information.

Clause 2. The method of clause 1 wherein the step of identifying a location information of the user includes extracting a depth information from the two-dimensional video stream.

Clause 3. The method of clause 2 wherein the step of extracting the depth information includes recognition of a depth cue in the two-dimensional video stream.

Clause 4. The method of clause 1 wherein the user representation includes an image of at least a portion of the user.

Clause 5. The method of clause 1 further comprising the steps of: detecting a body part missing from the user representation; extracting a representation of the missing body part from a data storage unit; and adding the extracted representation of the missing body part to the user representation.

Clause 6. The method of clause 1 further comprising the steps of:

detecting a person in the two-dimensional video stream data; comparing the detected person with an intended user; determining if the detected person is the intended user; and identifying the detected person as the user, in response to determining that the detected person is the intended user.

Clause 7. The method of clause 1 further comprising the step of updating the added user representation in response to detecting a gesture or a pose performed by the user, wherein the updating of the added user representation includes the added user representation performing a predefined action.

Clause 8. The method of clause 1 further comprising the step of identifying a pose information of the user from the two-dimensional video stream.

Clause 9. The method of clause 8 further comprising the step of updating the added user representation in the three-dimensional scene based on changes to at least one of the user, the location information, and the pose information.

Clause 10. The method of clause 9 wherein the changes include the user causing the added user representation to interact with the virtual object.

Clause 11. The method of clause 10 further comprising the step of updating the virtual object in response to the user causing the added user representation to interact with the virtual object.

Clause 12. The method of clause 11 wherein the updating of the virtual object includes causing the virtual object to perform a predefined action.

Clause 13. The method of clause 1 further comprising the step of updating the virtual object in response to the user causing the added user representation to display a gesture.

Clause 14. The method of clause 13 wherein the updating of the virtual object includes causing the virtual object to perform a predefined action upon detecting the gesture.

Clause 15. A computer-implemented method for controlling virtual representations of users in a three-dimensional scene, the method comprising: receiving a first two-dimensional video stream data of a first user, using a first imaging unit, wherein the first two-dimensional video stream data captures the first user at least partially; receiving a three-dimensional scene, wherein the three-dimensional scene includes data associated with at least one virtual object and its location within the three-dimensional scene; isolating a first user representation of the first user from the first two-dimensional video stream data; identifying a first location information of the first user from the first two-dimensional video stream, wherein the first location information is identified based on the first user's relative location to the first imaging unit; receiving a second two-dimensional video stream data of a second user, using a second imaging unit, wherein the second two-dimensional video stream data captures the second user at least partially; isolating a second user representation of the second user from the second two-dimensional video stream data; identifying a second location information of the second user from the second two-dimensional video stream, wherein the second location information is identified based on the second user's relative location to the second imaging unit; adding the first and second user representations to the three-dimensional scene by modifying data associated with voxels comprising the three-dimensional scene, wherein the data associated with the first user representation uses the first location information and the data associated with the second user representation uses the second location information; and displaying the three-dimensional scene, the added first user representation, and the added second user representation on a first display unit and a second display unit, wherein the first added user representation displayed on the first display unit is controlled based on detecting changes to at least one of the first user and the first location information, and the second added user representation displayed on the second display unit is controlled based on detecting changes to at least one of the second user and the second location information.

Clause 16. The method of clause 15 further comprising the step of updating the second added user representation in the three-dimensional scene based on changes to at least one of the second user and the second location information.

Clause 17. The method of clause 16 wherein the changes include the second user causing the added second user representation to interact with the added first user representation.

Clause 18. The method of clause 15 wherein the step of identifying location information of the first user and the second user includes extracting a depth information from the first two-dimensional video stream and the second two-dimensional video stream, respectively.

Clause 19. The method of clause 18 wherein the step of extracting the depth information includes recognition of a depth cue in on or more of the first two-dimensional video stream and the second two-dimensional video stream.

Clause 20. The method of clause 15 wherein the first user representation includes an image of at least a portion of the user.

Clause 21. The method of clause 15 further comprising the steps of: detecting a body part missing from the first or the second user representations; extracting a representation of the missing body part from a data storage unit; and adding the extracted representation of the missing body part to one or more of the first and the second user representations.

Clause 22. The method of clause 15 further comprising the steps of: detecting a person in the first two-dimensional video stream data; comparing the detected person with an intended user; determining if the detected person is the intended user; and identifying the detected person as the first user, in response to determining that the detected person is the intended user.

Clause 23. The method of clause 15 further comprising the step of updating the added first user representation in response to detecting a gesture or a pose performed by the first user, wherein the updating of the added first user representation includes the added first user representation performing a predefined action.

Clause 24. The method of clause 15 further comprising the step of updating the added second user representation in response to detecting a gesture or a pose performed by the second user, wherein the updating of the added second user representation includes the added second user representation performing a predefined action.

Clause 25. The method of clause 15 further comprising the step of identifying a first pose information of the first user from the first two-dimensional video stream, and a second pose information of the second user from the second two-dimensional video stream Clause 26. The method of clause 25 further comprising the step of updating the added first user representation in the three-dimensional scene based on changes to at least one of the first user, the first location information, and the first pose information, and updating the added second user representation in the three-dimensional scene based on changes to at least one of the second user, the second location information, and the second pose information.

Clause 27. The method of clause 26 wherein the changes include the first or the second users causing the corresponding added first or second user representations to interact with the virtual object.

Clause 28. The method of clause 27 further comprising the step of updating the virtual object in response to the first user and the second user causing the added first and the added second user representations to interact with the virtual object.

Clause 29. The method of clause 28 wherein the updating of the virtual object includes causing the virtual object to perform a predefined action.

Clause 30. The method of clause 15 further comprising the step of updating the virtual object in response to the first and the second users causing the corresponding added user representations to display a gesture.

Clause 31. The method of clause 30 wherein the updating of the virtual object includes causing the virtual object to perform a predefined action upon detecting the gesture.

Clause 32. A system for controlling a virtual representation of a user in a three-dimensional scene, comprising: an imaging unit capturing a two-dimensional video stream data of a user; a storage unit having a computer-readable program instruction stored therein; and a processor, in communication with the storage unit, configured to execute the computer-readable program instruction to cause the system to at least: receive the two-dimensional video stream data of the user from the imaging unit, wherein the two-dimensional video stream data captures the user at least partially; receive a three-dimensional scene, wherein the three-dimensional scene includes data associated with at least one virtual object and its location within the three-dimensional scene; isolate a user representation of the user from the two-dimensional video stream data; identify a location information of the user from the two-dimensional video stream, wherein the location information is identified based on the user's relative location to the imaging unit; add the user representation to the three-dimensional scene by modifying data associated with a voxel comprising the three-dimensional scene, using the location information and the pose information; and display the three-dimensional scene and the added user representation on a display unit, wherein the added user representation displayed on the display unit is controlled based on detecting changes to at least one of the user and the location information.

Clause 33. The system of clause 32 wherein the location information of the user includes a depth information extracted from the two-dimensional video stream.

Clause 34. The system of clause 33 wherein the extracting of the depth information includes recognition of a depth cue in the two-dimensional video stream.

Clause 35. The system of clause 32 wherein the user representation includes an image of at least a portion of the user.

Clause 36. The system of clause 32 wherein the processor is further configured to execute the computer-readable program instruction to cause the system to: detect a body part missing from the user representation; extract a representation of the missing body part from a data storage unit; and add the extracted representation of the missing body part to the user representation.

Clause 37. The system of clause 32 wherein the processor is further configured to execute the computer-readable program instruction to cause the system to: detect a person in the two-dimensional video stream data; compare the detected person with an intended user; determine if the detected person is the intended user; and identify the detected person as the user, in response to determining that the detected person is the intended user.

Clause 38. The system of clause 32 wherein the processor is further configured to execute the computer-readable program instruction to cause the system to update the added user representation in response to detecting a gesture or a pose performed by the user, wherein the updating of the added user representation includes the added user representation performing a predefined action.

Clause 39. The system of clause 32 wherein the processor is further configured to execute the computer-readable program instruction to cause the system to identify a pose information of the user from the two-dimensional video stream.

Clause 40. The system of clause 39 wherein the processor is further configured to execute the computer-readable program instruction to cause the system to update the added user representation in the three-dimensional scene based on changes to at least one of the user, the location information, and the pose information.

Clause 41. The system of clause 40 wherein the changes include the user causing the added user representation to interact with the virtual object.

Clause 42. The system of clause 41 wherein the processor is further configured to execute the computer-readable program instruction to cause the system to update the virtual object in response to the user causing the added user representation to interact with the virtual object.

Clause 43. The system of clause 42 wherein the updating of the virtual object includes causing the virtual object to perform a predefined action.

Clause 44. The system of clause 32 wherein the processor is further configured to execute the computer-readable program instruction to cause the system to update the virtual object in response to the user causing the added user representation to display a gesture.

Clause 45. The system of clause 44 wherein the updating of the virtual object includes causing the virtual object to perform a predefined action upon detecting the gesture.

While several variations of the present disclosure have been illustrated by way of example in particular description, it is apparent that further examples can be developed within the spirit and scope of the present disclosure, or the inventive concept thereof. Those skilled in the art will readily observe that numerous modifications, applications, variations, and alterations of the device and method may be made while retaining the teachings of the present disclosure. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. It will be appreciated that variants of the above-disclosed and other features and functions, or alternatives thereof, may be combined into many other systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for controlling virtual representations of users in a three-dimensional scene, the method comprising:
   receiving a first two-dimensional video stream data of a first user, using a first imaging unit, wherein the first two-dimensional video stream data captures the first user at least partially;
   receiving a three-dimensional scene, wherein the three-dimensional scene includes data associated with at least one virtual object and its location within the three-dimensional scene;
   isolating a first user representation of the first user from the first two-dimensional video stream data;
   identifying a first location information of the first user from the first two-dimensional video stream data, wherein the first location information is identified based on the first user's relative location to the first imaging unit;
   receiving a second two-dimensional video stream data of a second user, using a second imaging unit, wherein the second two-dimensional video stream data captures the second user at least partially;
   isolating a second user representation of the second user from the second two-dimensional video stream data;
   identifying a second location information of the second user from the second two-dimensional video stream data, wherein the second location information is identified based on the second user's relative location to the second imaging unit;
   adding the first and second user representations to the three-dimensional scene by modifying data associated with voxels comprising the three-dimensional scene, wherein the data associated with the first user representation uses the first location information and the data associated with the second user representation uses the second location information; and
   displaying the three-dimensional scene, the added first user representation, and the added second user representation on a first display unit and a second display unit, wherein the added first user representation displayed on the first display unit is controlled based on detecting changes to at least one of the first user and the first location information, and the added second user representation displayed on the second display unit is controlled based on detecting changes to at least one of the second user and the second location information.

2. The method of claim 1 further comprising a step of updating the added second user representation in the three-dimensional scene based on changes to at least one of the second user and the second location information.

3. The method of claim 2 wherein the changes include the second user causing the added second user representation to interact with the added first user representation.

4. The method of claim 1 wherein a step of identifying a first location information of the first user includes extracting depth information from the first two-dimensional video stream data.

5. The method of claim 4 wherein a step of extracting the depth information includes recognition of a depth cue in the first two-dimensional video stream data.

6. The method of claim 1 wherein a step of identifying a first location information of the first user includes extracting depth information using the first imaging unit, wherein the first imaging unit is a depth-sensing imaging unit.

7. The method of claim 1 wherein the first user representation includes an image of at least a portion of the first user.

8. The method of claim 1 further comprising steps of:
   detecting a body part missing from the first imaging unit's view of the first user;
   extracting a representation of the missing body part from a data storage unit; and
   adding the extracted representation of the missing body part to the first user representation.

9. The method of claim 1 further comprising steps of:
   detecting a person in the first two-dimensional video stream data;
   comparing the detected person with an intended user;
   determining if the detected person is the intended user; and
   identifying the detected person as the first user, in response to determining that the detected person is the intended user.

10. The method of claim 1 further comprising a step of updating the added first user representation in response to detecting a gesture or a pose performed by the first user, wherein the updating includes the added first user representation performing a predefined action.

11. The method of claim 1 further comprising a step of identifying a pose information of the first user from the first two-dimensional video stream data.

12. The method of claim 11 further comprising a step of updating the added first user representation in the three-dimensional scene based on changes to at least one of the first user, the first location information, and the pose information.

13. The method of claim 12 wherein the changes include the first user causing the added first user representation to interact with the virtual object.

14. The method of claim 13 further comprising a step of updating the virtual object in response to the first user causing the added first user representation to interact with the virtual object.

15. The method of claim 14 wherein the updating of the virtual object includes causing the virtual object to perform a predefined action.

16. The method of claim 1 further comprising a step of updating the virtual object in response to the first user causing the added first user representation to display a gesture.

17. The method of claim 16 wherein the updating of the virtual object includes causing the virtual object to perform a predefined action upon detecting the gesture.

18. A system for controlling a virtual representation of multiple users in a three-dimensional scene, comprising:
- a first imaging unit capturing a first two-dimensional video stream data of a first user;
- a second imaging unit capturing a second two-dimensional video stream data of a second user;
- a storage unit having a computer-readable program instruction stored therein; and
- a processor, in communication with the storage unit, configured to execute the computer-readable program instruction to cause the system to at least:
  - receive the first two-dimensional video stream data of the first user from the first imaging unit, wherein the first two-dimensional video stream data captures the first user at least partially;
  - receive the second two-dimensional video stream data of the second user from the second imaging unit, wherein the second two-dimensional video stream data captures the second user at least partially;
  - receive a three-dimensional scene, wherein the three-dimensional scene includes data associated with at least one virtual object and its location within the three-dimensional scene;
  - isolate a first user representation of the first user from the first two-dimensional video stream data;
  - isolate a second user representation of the second user from the second two-dimensional video stream data;
  - identify a first location information of the first user from the first two-dimensional video stream data, wherein the first location information is identified based on the first user's relative location to the first imaging unit;
  - identify a second location information of the second user from the second two-dimensional video stream data, wherein the second location information is identified based on the second user's relative location to the second imaging unit;
  - add the first and second user representations to the three-dimensional scene by modifying data associated with a voxel comprising the three-dimensional scene, wherein the data associated with the first user representation uses the first location information and the data associated with the second user representation uses the second location information; and
  - display the three-dimensional scene, the added first user representation, and the added second user representation on a first display unit and a second display unit, wherein the added first user representation displayed on the first display unit is controlled based on detecting changes to at least one of the first user and the first location information, and the added second user representation displayed on the second display unit is controlled based on detecting changes to at least one of the second user and the second location information.

19. The system of claim 18 wherein the first location information of the first user includes a depth information extracted from the first two-dimensional video stream data.

20. The system of claim 18 wherein the first user representation includes an image of at least a portion of the first user.

* * * * *